United States Patent
Douady et al.

(10) Patent No.: US 12,382,164 B2
(45) Date of Patent: *Aug. 5, 2025

(54) THREE-DIMENSIONAL NOISE REDUCTION

(71) Applicant: GoPro, Inc., San Mateo, CA (US)

(72) Inventors: Bruno César Douady, Orsay (FR); Michael Serge Andre Kraak, Cachan (FR); Guillaume Matthieu Guérin, Chatillon (FR); Thomas Nicolas Emmanuel Veit, Meudon (FR)

(73) Assignee: GoPro, Inc., San Mateo, CA (US)

(*) Notice: Subject to any disclaimer, the term of this patent is extended or adjusted under 35 U.S.C. 154(b) by 194 days.

This patent is subject to a terminal disclaimer.

(21) Appl. No.: 18/134,123

(22) Filed: Apr. 13, 2023

(65) Prior Publication Data

US 2023/0247281 A1  Aug. 3, 2023

Related U.S. Application Data

(60) Continuation of application No. 17/543,629, filed on Dec. 6, 2021, now Pat. No. 11,653,088, which is a
(Continued)

(51) Int. Cl.
*G06T 5/50* (2006.01)
*G06T 3/18* (2024.01)
(Continued)

(52) U.S. Cl.
CPC ............... *H04N 23/64* (2023.01); *G06T 3/18* (2024.01); *G06T 3/4038* (2013.01); *G06T 5/20* (2013.01);
(Continued)

(58) Field of Classification Search
CPC .... H04N 23/64; H04N 13/271; H04N 17/002; H04N 19/10; H04N 19/136;
(Continued)

(56) References Cited

U.S. PATENT DOCUMENTS 9,639,935 B1  5/2017  Douady-Pleven
9,691,133 B1  6/2017  Liu
(Continued)

FOREIGN PATENT DOCUMENTS

WO  2015172235 A1  11/2015

OTHER PUBLICATIONS

Form PCT/ISA/206 and Annex to Form PCT/ISA/206 Communication Relating to the Results of the Partial International Search for International Application No. PCT/US2017/034231 dated Sep. 13, 2017 (14 pgs).
(Continued)

*Primary Examiner* — Lin Ye
*Assistant Examiner* — Tuan H Le
(74) *Attorney, Agent, or Firm* — Young Basile Hanlon & MacFarlane, P.C.

(57) ABSTRACT

Systems and methods are disclosed for image signal processing. For example, methods may include receiving a current image of a sequence of images from an image sensor; combining the current image with a recirculated image to obtain a noise reduced image, where the recirculated image is based on one or more previous images of the sequence of images from the image sensor; determining a noise map for the noise reduced image, where the noise map is determined based on estimates of noise levels for pixels in the current image, a noise map for the recirculated image, and a set of mixing weights; recirculating the noise map with the noise reduced image to combine the noise reduced image with a next image of the sequence of images from the image sensor; and storing, displaying, or transmitting an output image that is based on the noise reduced image.

20 Claims, 26 Drawing Sheets

Related U.S. Application Data division of application No. 16/303,892, filed as application No. PCT/US2017/034231 on May 24, 2017, now Pat. No. 11,196,918, which is a continuation-in-part of application No. 15/399,269, filed on Jan. 5, 2017, now Pat. No. 10,404,926, and a continuation-in-part of application No. 15/358,495, filed on Nov. 22, 2016, now Pat. No. 10,499,085, and a continuation-in-part of application No. 15/268,038, filed on Sep. 16, 2016, now Pat. No. 9,639,935.

(60) Provisional application No. 62/341,580, filed on May 25, 2016, provisional application No. 62/341,415, filed on May 25, 2016.

(51) Int. Cl.

| | | |
|---|---|---|
| *G06T 3/4038* | (2024.01) | |
| *G06T 5/20* | (2006.01) | |
| *G06T 7/80* | (2017.01) | |
| *H04N 13/122* | (2018.01) | |
| *H04N 13/271* | (2018.01) | |
| *H04N 17/00* | (2006.01) | |
| *H04N 19/10* | (2014.01) | |
| *H04N 19/136* | (2014.01) | |
| *H04N 19/176* | (2014.01) | |
| *H04N 19/423* | (2014.01) | |
| *H04N 19/70* | (2014.01) | |
| *H04N 19/85* | (2014.01) | |
| *H04N 19/90* | (2014.01) | |
| *H04N 23/45* | (2023.01) | |
| *H04N 23/60* | (2023.01) | |
| *H04N 23/698* | (2023.01) | |
| *H04N 23/90* | (2023.01) | |
| *H04N 23/951* | (2023.01) | |
| *H04N 25/60* | (2023.01) | |
| *H04N 25/61* | (2023.01) | |
| *G06T 5/70* | (2024.01) | |
| *H04N 13/239* | (2018.01) | |

(52) U.S. Cl.
CPC .................. *G06T 5/50* (2013.01); *G06T 7/85* (2017.01); *H04N 13/271* (2018.05); *H04N 17/002* (2013.01); *H04N 19/10* (2014.11); *H04N 19/136* (2014.11); *H04N 19/176* (2014.11); *H04N 19/423* (2014.11); *H04N 19/70* (2014.11); *H04N 19/85* (2014.11); *H04N 19/90* (2014.11); *H04N 23/45* (2023.01); *H04N 23/698* (2023.01); *H04N 23/90* (2023.01); *H04N 23/951* (2023.01); *H04N 25/60* (2023.01); *H04N 25/61* (2023.01); *G06T 5/70* (2024.01); *G06T 2207/10016* (2013.01); *H04N 13/122* (2018.05); *H04N 13/239* (2018.05)

(58) Field of Classification Search
CPC .... H04N 19/176; H04N 19/423; H04N 19/70; H04N 19/85; H04N 19/90; H04N 23/45; H04N 23/698; H04N 23/90; H04N 25/61; H04N 13/122; H04N 13/239; H04N 2013/0088; H04N 13/243; H04N 19/46; H04N 19/527; H04N 19/53; H04N 19/59; H04N 23/951; H04N 25/587; H04N 25/60; H04N 19/436; H04N 19/117; H04N 19/139; H04N 19/14; H04N 23/741; H04N 23/81; H04N 19/597; H04N 1/58; H04N 1/60; G06T 3/18; G06T 3/4038; G06T 5/20; G06T 5/50; G06T 7/85; G06T 5/70; G06T 2207/10016; G06T 2207/20221; G06T 2207/20182; G06T 2207/20201; G06T 5/002; G06T 2207/10024

See application file for complete search history.

(56) References Cited

U.S. PATENT DOCUMENTS

| | | |
|---|---|---|
| 10,404,926 B2 | 9/2019 | Douady-Pleven |
| 10,499,085 B1 | 12/2019 | Douady-Pleven |
| 10,728,474 B2 | 7/2020 | Douady |
| 11,064,110 B2 | 7/2021 | Douady-Pleven |
| 11,196,918 B2 * | 12/2021 | Douady ............... H04N 25/61 |
| 2008/0240612 A1 | 10/2008 | Liang |
| 2009/0290641 A1 | 11/2009 | Crinon |
| 2010/0189179 A1 | 7/2010 | Gu |
| 2010/0322306 A1 | 12/2010 | Au |
| 2011/0033130 A1 | 2/2011 | Poon |
| 2012/0154545 A1 | 6/2012 | Choi |
| 2012/0288187 A1 | 11/2012 | Ichihashi |
| 2013/0021483 A1 | 1/2013 | Bennett |
| 2013/0051689 A1 | 2/2013 | Shimauchi |
| 2013/0051697 A1 | 2/2013 | Takahashi |
| 2013/0057733 A1 | 3/2013 | Borisov |
| 2013/0266057 A1 | 10/2013 | Kokaram |
| 2013/0314557 A1 | 11/2013 | Furukawa |
| 2014/0028876 A1 | 1/2014 | Mills |
| 2014/0152686 A1 | 6/2014 | Narasimha |
| 2014/0341287 A1 | 11/2014 | Mody |
| 2015/0016543 A1 | 1/2015 | Rapaka |
| 2015/0042848 A1 | 2/2015 | Furukawa |
| 2015/0049193 A1 | 2/2015 | Gupta |
| 2015/0228060 A1 | 8/2015 | Wang |
| 2015/0279006 A1 | 10/2015 | Choi |
| 2015/0302561 A1 | 10/2015 | Pekkucuksen |
| 2015/0317781 A1 | 11/2015 | Napier |
| 2016/0037061 A1 | 2/2016 | Lim |
| 2016/0253789 A1 | 9/2016 | Chen |
| 2016/0307346 A1 | 10/2016 | Staudenmaier |
| 2017/0084007 A1 | 3/2017 | Rakhshanfar |
| 2017/0111652 A1 | 4/2017 | Davies |
| 2017/0287184 A1 | 10/2017 | Pettersson |
| 2017/0347044 A1 | 11/2017 | Douady-Pleven |
| 2019/0297283 A1 | 9/2019 | Douady |
| 2020/0020087 A1 | 1/2020 | Douady-Pleven |
| 2020/0267339 A1 | 8/2020 | Douady-Pleven |
| 2022/0256076 A1 | 8/2022 | Douady |

OTHER PUBLICATIONS

PCT International Preliminary Report and Written Opinion for PCT/US2017/034231 dated Nov. 27, 2018, 11 pages.
PCT International Preliminary Report and Writtten Opinion for PCT/US2017/034422, Nov. 27, 2018, 10 pages.
PCT International Search Report and Written Opinion for PCT/US16/31076, Aug. 8, 2016, 19 Pages.
PCT International Search Report and Written Opinion for PCT/US2017/034231 dated Nov. 7, 2017, 19 pages.
Pesquet-Popescu et al., "Motion Estimation Techniques," Telecom Paris Tech, 2016, https://pdfs.semanticscholar.org/98ca/f8325abb40aa6bbddd0e7f5d3a6c366d03e6.pdf, 76 pages.

* cited by examiner

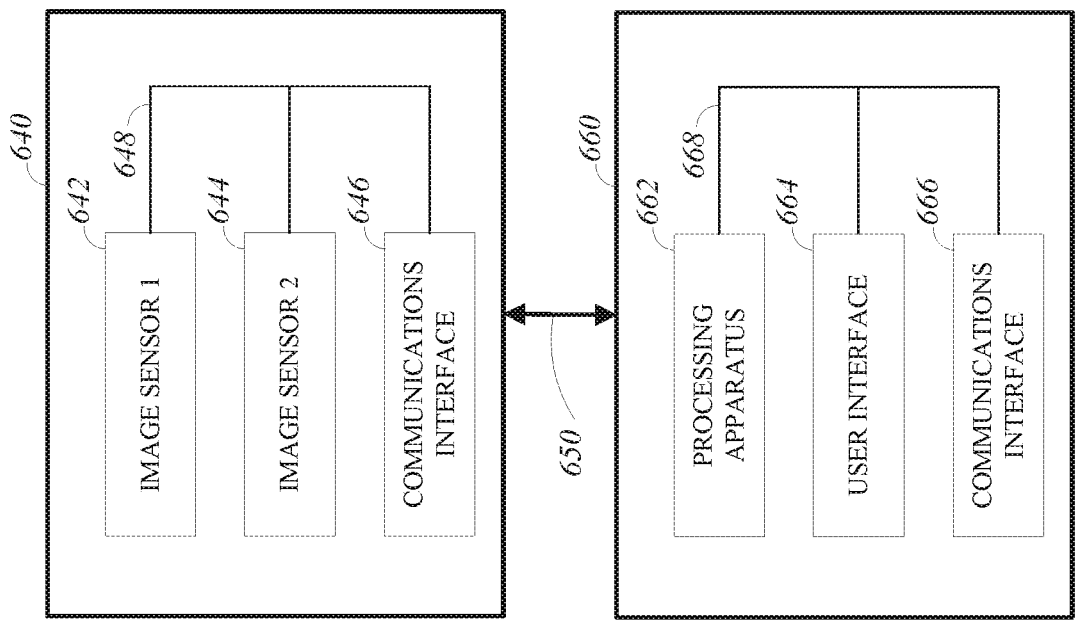
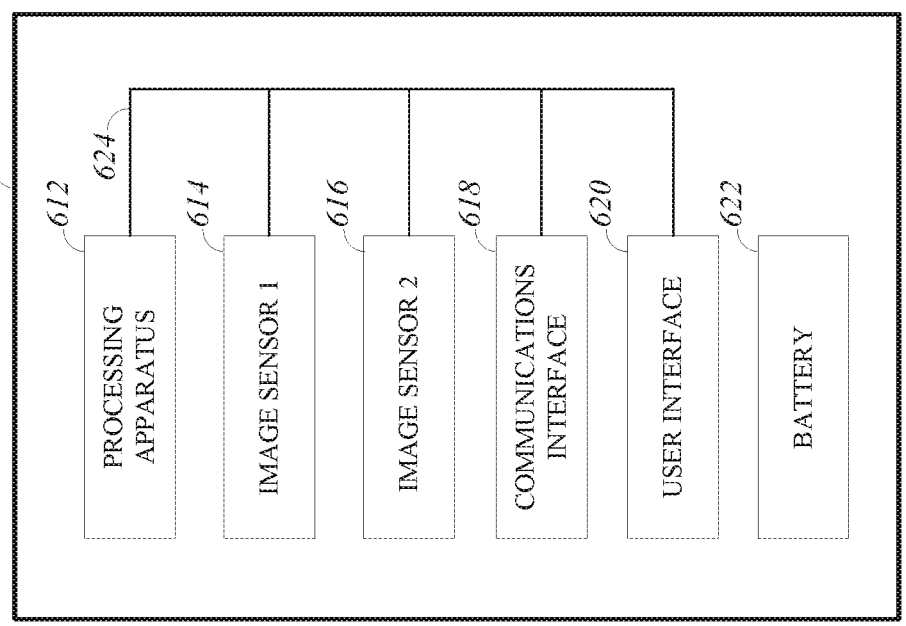
FIG. 6B
FIG. 6A

1400

| $P_{0,0}$ | $P_{0,1}$ | $P_{0,2}$ | $P_{0,...}$ | $P_{0,...}$ | $P_{0,61}$ | $P_{0,62}$ | $P_{0,63}$ |
|---|---|---|---|---|---|---|---|
| $P_{1,0}$ | $P_{1,1}$ | $P_{1,2}$ | $P_{1,...}$ | $P_{1,...}$ | $P_{1,61}$ | $P_{1,62}$ | $P_{1,63}$ |
| $P_{2,0}$ | $P_{2,1}$ | $P_{2,2}$ | $P_{2,...}$ | $P_{2,...}$ | $P_{2,61}$ | $P_{2,62}$ | $P_{2,63}$ |
| $P_{...,0}$ | $P_{...,1}$ | $P_{...,2}$ | $P_{...,...}$ | $P_{...,...}$ | $P_{...,61}$ | $P_{...,62}$ | $P_{...,63}$ |
| $P_{...,0}$ | $P_{...,1}$ | $P_{...,2}$ | $P_{...,...}$ | $P_{...,...}$ | $P_{...,61}$ | $P_{...,62}$ | $P_{...,63}$ |
| $P_{61,0}$ | $P_{61,1}$ | $P_{61,2}$ | $P_{61,...}$ | $P_{61,...}$ | $P_{61,61}$ | $P_{61,62}$ | $P_{61,63}$ |
| $P_{62,0}$ | $P_{62,1}$ | $P_{62,2}$ | $P_{62,...}$ | $P_{62,...}$ | $P_{62,61}$ | $P_{62,62}$ | $P_{62,63}$ |
| $P_{63,0}$ | $P_{63,1}$ | $P_{63,2}$ | $P_{63,...}$ | $P_{63,...}$ | $P_{63,61}$ | $P_{63,62}$ | $P_{63,63}$ |

1410

| $P_{0,0}$ | $P_{0,1}$ | $P_{0,2}$ | $P_{0,...}$ | $P_{0,29}$ | $P_{0,30}$ | $P_{0,31}$ |
|---|---|---|---|---|---|---|
| $P_{1,0}$ | $P_{1,1}$ | $P_{1,2}$ | $P_{1,...}$ | $P_{1,29}$ | $P_{1,30}$ | $P_{1,31}$ |
| $P_{2,0}$ | $P_{2,1}$ | $P_{2,2}$ | $P_{2,...}$ | $P_{2,29}$ | $P_{2,30}$ | $P_{2,31}$ |
| $P_{...,0}$ | $P_{...,1}$ | $P_{...,2}$ | $P_{...,...}$ | $P_{...,29}$ | $P_{...,30}$ | $P_{...,31}$ |
| $P_{29,0}$ | $P_{29,1}$ | $P_{29,2}$ | $P_{29,...}$ | $P_{29,29}$ | $P_{29,30}$ | $P_{29,31}$ |
| $P_{30,0}$ | $P_{30,1}$ | $P_{30,2}$ | $P_{30,...}$ | $P_{30,29}$ | $P_{30,30}$ | $P_{30,31}$ |
| $P_{31,0}$ | $P_{31,1}$ | $P_{31,2}$ | $P_{31,...}$ | $P_{31,29}$ | $P_{31,30}$ | $P_{31,31}$ |

| $P_{0,0}$ | $P_{0,1}$ | $P_{0,...}$ | $P_{0,...}$ | $P_{0,14}$ | $P_{0,15}$ |
|---|---|---|---|---|---|
| $P_{1,0}$ | $P_{1,1}$ | $P_{1,...}$ | $P_{1,...}$ | $P_{1,14}$ | $P_{1,15}$ |
| $P_{...,0}$ | $P_{...,1}$ | $P_{...,...}$ | $P_{...,...}$ | $P_{...,14}$ | $P_{...,15}$ |
| $P_{...,0}$ | $P_{...,1}$ | $P_{...,...}$ | $P_{...,...}$ | $P_{...,14}$ | $P_{...,15}$ |
| $P_{14,0}$ | $P_{14,1}$ | $P_{14,...}$ | $P_{14,...}$ | $P_{14,14}$ | $P_{14,15}$ |
| $P_{15,0}$ | $P_{15,1}$ | $P_{15,...}$ | $P_{15,...}$ | $P_{15,14}$ | $P_{15,15}$ |

1510

| $P_{0,0}$ | $P_{0,1}$ | $P_{0,...}$ | $P_{0,6}$ | $P_{0,7}$ |
|---|---|---|---|---|
| $P_{1,0}$ | $P_{1,1}$ | $P_{1,...}$ | $P_{1,6}$ | $P_{1,7}$ |
| $P_{...,0}$ | $P_{...,1}$ | $P_{...,...}$ | $P_{...,6}$ | $P_{...,7}$ |
| $P_{6,0}$ | $P_{6,1}$ | $P_{6,...}$ | $P_{6,6}$ | $P_{6,7}$ |
| $P_{7,0}$ | $P_{7,1}$ | $P_{7,...}$ | $P_{7,6}$ | $P_{7,7}$ |

FIG. 15

THREE-DIMENSIONAL NOISE REDUCTION

CROSS-REFERENCE TO RELATED APPLICATION(S)

This application claims the benefit of U.S. Provisional Application No. 62/341,580, filed on May 25, 2016, which is incorporated herein by reference in its entirety. This application claims the benefit of U.S. Provisional Application No. 62/341,415, filed on May 25, 2016, which is incorporated herein by reference in its entirety. This application claims the benefit of U.S. patent application Ser. No. 15/268,038, filed on Sep. 16, 2016, now U.S. Pat. No. 9,639,935, which is incorporated herein by reference in its entirety. This application claims the benefit of U.S. patent application Ser. No. 15/358,495, filed on Nov. 22, 2016, now U.S. Pat. No. 10,499,085, which is incorporated herein by reference in its entirety. This application claims the benefit of U.S. patent application Ser. No. 15/399,269, filed on Jan. 5, 2017, now U.S. Pat. No. 10,404,926, which is incorporated herein by reference in its entirety. This application is a continuation of U.S. patent application Ser. No. 17/543,629, filed Dec. 6, 2021, which is a divisional of U.S. patent application Ser. No. 16/303,892, filed on Nov. 21, 2018, now U.S. Pat. No. 11,196,918, which is a national phase under 35 U.S.C. § 371 of PCT Application No. PCT/US2017/034231, filed on May 24, 2017, which are incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure describes, inter alia, apparatus and methods for digital image and video processing.

In a first aspect, the subject matter described in this specification can be embodied in systems that include an image sensor configured to capture video and a processing apparatus that is configured to: receive a current frame of video from the image sensor; combine the current frame with a recirculated frame to obtain a noise reduced frame, where the recirculated frame is based on one or more previous frames of video from the image sensor, and in which the current frame is combined with the recirculated frame using a set of mixing weights for respective image portions of the recirculated frame; determine a noise map for the noise reduced frame, where the noise map is determined based on estimates of noise levels for pixels in the current frame, a noise map for the recirculated frame, and the set of mixing weights; recirculate the noise map with the noise reduced frame to combine the noise reduced frame with a next frame of video from the image sensor; and store, display, or transmit an output video that is based on the noise reduced frame.

In a second aspect, the subject matter described in this specification can be embodied in methods that include receiving a current image of a sequence of images from an image sensor; combining the current image with a recirculated image to obtain a noise reduced image, where the recirculated image is based on one or more previous images of the sequence of images from the image sensor, and in which the current image is combined with the recirculated image using a set of mixing weights for respective image portions of the recirculated image; determining a noise map for the noise reduced image, where the noise map is determined based on estimates of noise levels for pixels in the current image, a noise map for the recirculated image, and the set of mixing weights; recirculating the noise map with the noise reduced image to combine the noise reduced image with a next image of the sequence of images from the image sensor; and storing, displaying, or transmitting an output image that is based on the noise reduced image.

In a third aspect, the subject matter described in this specification can be embodied in systems that include an image sensor configured to capture image data using a plurality of selectable exposure times; and a processing apparatus that is configured to: receive a first image from the image sensor, where the first image is captured with a first exposure time; receive a second image from the image sensor, where the second image is captured with a second exposure time that is less than the first exposure time; determine a high dynamic range image based on the first image in a raw format and the second image in a raw format, in which an image portion of the high dynamic range image is based on a corresponding image portion of the second image when a pixel of a corresponding image portion of the first image is saturated; and store, display, or transmit an output image that is based on the high dynamic range image.

In a fourth aspect, the subject matter described in this specification can be embodied in a non-transitory computer-readable storage medium storing executable instructions that, when executed by a processor, facilitate performance of operations, including: obtaining, by an image signal processor, a target image; obtaining, by the image signal processor, a reference image; obtaining motion compensation information indicating motion identified between the reference image and the target image, wherein obtaining the motion compensation information includes obtaining local motion compensation information and obtaining global motion compensation information; obtaining a processed image by updating the target image based on the motion compensation information; and outputting the processed image.

In a fifth aspect, the subject matter described in this specification can be embodied in methods that include: obtaining, by an image signal processor, a target image; obtaining, by the image signal processor, a reference image; obtaining motion compensation information indicating motion identified between the reference image and the target image, wherein obtaining the motion compensation information includes obtaining local motion compensation information and obtaining global motion compensation information; obtaining a processed image by updating the target image based on the motion compensation information; and outputting the processed image.

In a sixth aspect, the subject matter described in this specification can be embodied in an image capture apparatus including one or more image sensors configured to capture input video, and an image signal processor configured to: obtain, by an image signal processor, a target image; obtain, by the image signal processor, a reference image; obtain motion compensation information indicating motion identified between the reference image and the target image, wherein obtaining the motion compensation information includes obtaining local motion compensation information and obtaining global motion compensation information; obtain a processed image by updating the target image based on the motion compensation information; and output the processed image.

In a seventh aspect, the subject matter described in this specification can be embodied in methods that include receiving a current frame of video from an image sensor; combining the current frame with a recirculated frame to obtain a noise reduced frame, where the recirculated frame is based on one or more previous frames of video from the image sensor, and in which the current frame is combined with the recirculated frame using a set of mixing weights for respective image portions of the recirculated frame; determining a noise map for the noise reduced frame, where the noise map is determined based on estimates of noise levels for pixels in the current frame, a noise map for the recirculated frame, and the set of mixing weights; recirculating the noise map with the noise reduced frame to combine the noise reduced frame with a next frame of video from the image sensor; and storing, displaying, or transmitting an output video that is based on the noise reduced frame.

In a eight aspect, the subject matter described in this specification can be embodied in systems that include an image sensor configured to capture a sequence of images and a processing apparatus that is configured to: receive a current image of the sequence of images from the image sensor; combine the current image with a recirculated image to obtain a noise reduced image, where the recirculated image is based on one or more previous images of the sequence of images from the image sensor, and in which the current image is combined with the recirculated image using a set of mixing weights for respective image portions of the recirculated image; determine a noise map for the noise reduced image, where the noise map is determined based on estimates of noise levels for pixels in the current image, a noise map for the recirculated image, and the set of mixing weights; recirculate the noise map with the noise reduced image to combine the noise reduced image with a next image of the sequence of images from the image sensor; and store, display, or transmit an output image that is based on the noise reduced image.

In a ninth aspect, the subject matter described in this specification can be embodied in a non-transitory computer-readable storage medium storing executable instructions that, when executed by a processor, facilitate performance of operations, including: receiving a current frame of video from an image sensor; combining the current frame with a recirculated frame to obtain a noise reduced frame, where the recirculated frame is based on one or more previous frames of video from the image sensor, and in which the current frame is combined with the recirculated frame using a set of mixing weights for respective image portions of the recirculated frame; determining a noise map for the noise reduced frame, where the noise map is determined based on estimates of noise levels for pixels in the current frame, a noise map for the recirculated frame, and the set of mixing weights; recirculating the noise map with the noise reduced frame to combine the noise reduced frame with a next frame of video from the image sensor; and storing, displaying, or transmitting an output video that is based on the noise reduced frame.

In a tenth aspect, the subject matter described in this specification can be embodied in a non-transitory computer-readable storage medium storing executable instructions that, when executed by a processor, facilitate performance of operations, including: receiving a current image of a sequence of images from an image sensor; combining the current image with a recirculated image to obtain a noise reduced image, where the recirculated image is based on one or more previous images of the sequence of images from the image sensor, and in which the current image is combined with the recirculated image using a set of mixing weights for respective image portions of the recirculated image; determining a noise map for the noise reduced image, where the noise map is determined based on estimates of noise levels for pixels in the current image, a noise map for the recirculated image, and the set of mixing weights; recirculating the noise map with the noise reduced image to combine the noise reduced image with a next image of the sequence of images from the image sensor; and storing, displaying, or transmitting an output image that is based on the noise reduced image.

In an eleventh aspect, the subject matter described in this specification can be embodied in a non-transitory computer-readable storage medium storing executable instructions that, when executed by a processor, facilitate performance of operations, including: receiving a first image from an image sensor, where the first image is captured with a first exposure time; receiving a second image from the image sensor, where the second image is captured with a second exposure time that is less than the first exposure time; determining a high dynamic range image based on the first image in a raw format and the second image in a raw format, in which an image portion of the high dynamic range image is based on a corresponding image portion of the second image when a pixel of a corresponding image portion of the first image is saturated; and storing, displaying, or transmitting an output image that is based on the high dynamic range image.

In a twelfth aspect, the subject matter described in this specification can be embodied in methods that include: receiving a first image from an image sensor, where the first image is captured with a first exposure time; receiving a second image from the image sensor, where the second image is captured with a second exposure time that is less than the first exposure time; determining a high dynamic range image based on the first image in a raw format and the second image in a raw format, in which an image portion of the high dynamic range image is based on a corresponding image portion of the second image when a pixel of a corresponding image portion of the first image is saturated; and storing, displaying, or transmitting an output image that is based on the high dynamic range image.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 6A is a block diagram of an example of a system configured for image capture.

FIG. 6B is a block diagram of an example of a system configured for image capture.

FIG. 14 is a diagram of an example of a target image and an example of a corresponding one-half resolution downscaled image.

FIG. 15 is a diagram of an example of a one-quarter resolution downscaled image and an example of a one-eighth resolution downscaled image.

Figure 1:
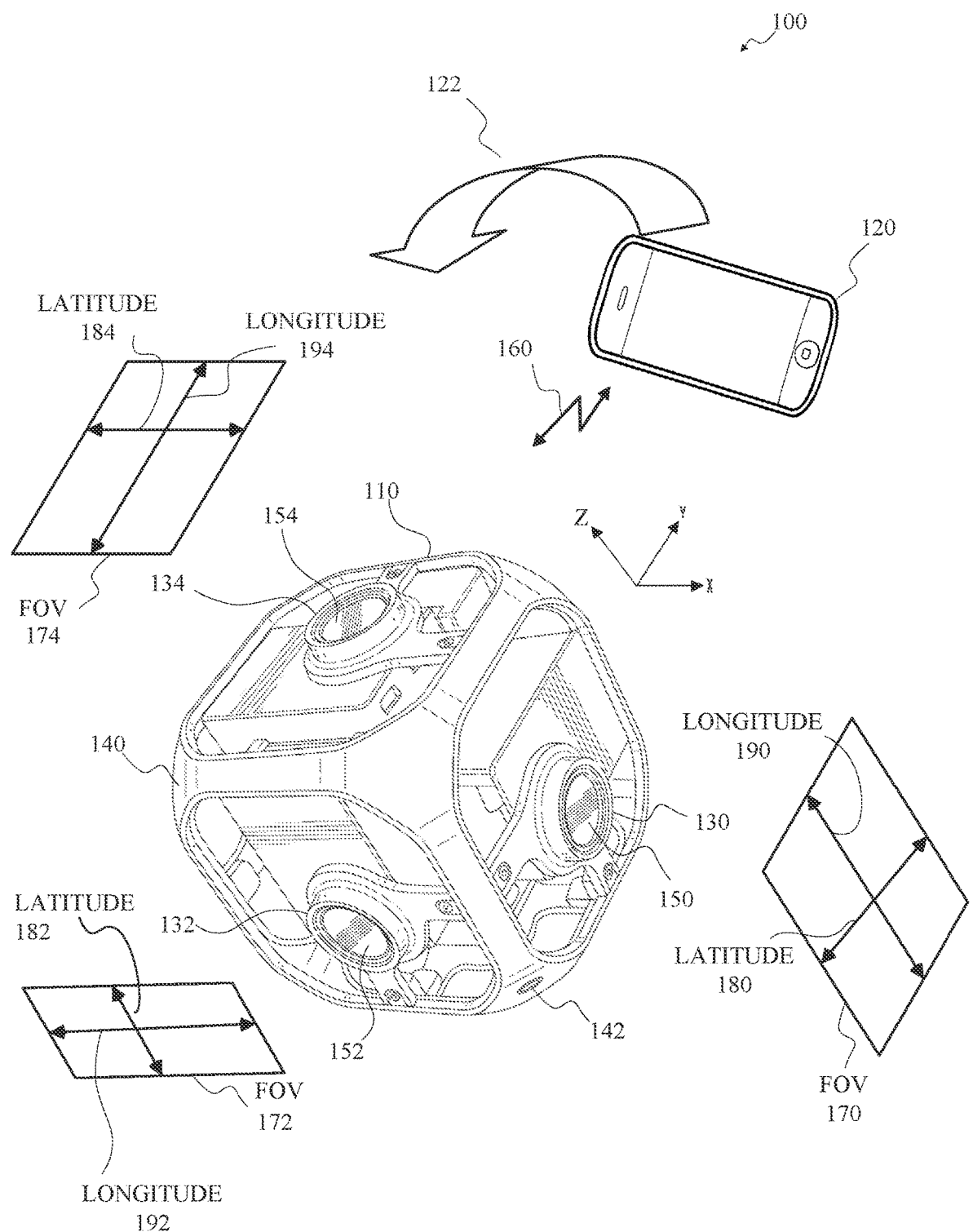
FIG. 1 is a diagram of an example of an image capture system for content capture in accordance with implementations of this disclosure.

All figures disclosed herein are © Copyright 2023 GoPro Inc. All rights reserved.

DETAILED DESCRIPTION

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more sensors and may process the image signal to generate an image, picture, or frame. The generated images may be stored, such as in a memory of an image e capture device, and/or sent to an encoder for encoding, which may include compression.

Three-dimensional noise reduction processing may be implemented to reduce noise levels (e.g., standard deviation, variance, or signal-to-noise-ratio) in pixel values in a sequence of captured images (e.g., frames of video) and improve the quality of the captured images. Three-dimensional noise reduction processing may include temporal noise reduction processing, which combines (e.g., using weighted averages) pixel values for an incoming current image with pixel values for corresponding pixels of a recirculated image that may be based on (e.g., via recursive processing of incoming current images in the sequence of images) one or more previous images in the sequence of images. Whether and/or how significantly an image portion (e.g., a pixel or block of pixels) of the recirculated image is combined with the current image may be determined (e.g., by determining mixing weights for respective image portions) based on an assessment as to how well the image portion corresponds to an image portion of the current image at the same spatial location. For example, estimates of the noise level for the pixel value(s) in the image portion of the recirculated image and/or estimates of the noise level for the pixel value(s) in the image portion of the current image may be used to determine a mixing weight (e.g., set to zero if the image portion is not used or to a positive number less than one if the image portion is used for temporal noise reduction) for the respective image portion of the recirculated image. In some implementations, the estimates of noise level for image portions the recirculated image are stored in a noise map that includes locations for the respective image portions of the recirculated image. A noise map for a noise reduced image (e.g., an image resulting from combination of the current image with the recirculated image) may be determined based on the estimates of noise levels for the current image, estimates of noise level for the recirculated image (e.g., from a previous noise map), and a set of mixing weights that is used to determine the noise reduced image. The resulting noise map may be recirculated (e.g., fed back) with noise reduced image for combination with a next current image in the sequence of the images. Having access to image portion (e.g., pixel or block of pixel) resolution estimates of noise for the recirculated image may facilitate improved combination with incoming current images to reduce noise levels and improve image quality in the captured images.

High dynamic range processing may consist of capturing several images of the same scene (e.g., in quick succession or partially overlapping in time) with different exposure times and then fusing these images so that dark parts of the image can be taken from the image with longest exposure time (for which a noise level is smallest) and bright parts of the image can be taken from the image with a shorter exposure time (e.g., where the longer exposure time image has pixel values that are saturated). In some implementations, more than images with different exposure time are captured, and parts of the images with intermediate brightness are taken from intermediate images (e.g., the image which has the longest exposure time while not exhibiting pixel value saturation). For example, high dynamic range processing may include a fusion algorithm taking N images as input and providing a single image at the output. In some implementations, image portions of constituent images are combined to form a high dynamic range image using a blending ratio map that specifies which image(s) individual image portions (e.g., pixels or blocks of pixels) will be based on. For example, image portions from multiple (e.g., two) constituent images may be blended (e.g., using a respective positive blending ratio less than one) to determine a corresponding image portion of the high dynamic range image. For example, a positive blending ratio less than one may be determined when a pixel value for a respective image portion is in a range near a saturation level. For example, a low-pass spatial filter may be applied to a blending ration map to smooth a combination of the constituent image.

High dynamic range processing may be performed (e.g., by an image signal processor or before passing the captured images to an image signal processor) in raw domain—instead of performing this processing in the YUV domain. Some advantages of performing the high dynamic range processing in the raw domain (early in an image signal processing pipeline) may include: (1) Only a high dynamic range image, rather than all N of the constituent images captured with different exposure times, may be processed by the later stages of an image processing pipeline (e.g., an image signal processor as the image signal processor processes the resulting image after high dynamic range fusion). (2) This may result in higher performance and lower power consumption, despite the fact that the later stages of a pipeline (e.g., an image signal processor) must use a wider dynamic (e.g., downstream processing may be carried out on 16 bits instead of 14). For example, processing a single 16 bit image may consume less processing resources (e.g., processor cycles and memory) than two 14 bits images. (3) High dynamic range image fusion may be performed in linear space, where quantization may have less consequences than in the YUV domain. (4) Tone mapping is simplified as it is done after an histogram computation of the image. Having access to the histogram with the full dynamic improves the quality of tone mapping.

High dynamic range processing may include spatial regularization, and thus noise levels for image portions may not be a pure function of the pixel value. This may complicate noise reduction processing (e.g., temporal noise reduction processing and/or three-dimensional noise processing) that depends on noise levels for pixels of incoming current images. To accommodate noise reduction processing occurring later in an image processing pipeline, estimates of noise level for respective image portions (e.g., pixels or Bayer blocks of 4 pixels), which are used by a noise reduction module to filter out noise, may be determined and stored in an input noise map for the high dynamic range image that may be passed into a noise reduction module with a corresponding current high dynamic range image. In some implementations, determining an input noise map for the high dynamic range image has small (e.g., marginal) impact on the consumption of image processing resource, and thus the savings due to downstream processing for a single high dynamic ranges images is substantially preserved jeopardized.

Motion compensation may be applied to a reference image to better align image portions (e.g., pixels or blocks of pixels) with corresponding image portions of a target image. For example, a target image may be a current image in a sequence of images that is subject to temporal noise reduction processing, and the reference image may be a recirculated image based on one or more previous images in the sequence of images. For example, a target image may be a constituent image of a high dynamic range image captured with a long exposure time, and the reference image may be a corresponding constituent image that was captured with a short exposure time. In some implementations, a local motion compensation transform is applied to a reference image to determine a first candidate image and a global motion compensation transform is applied to the reference image to determine a second candidate image. Quality metrics that may measure the correspondence of image portions in the respective candidate images with the target image may then be determined and the local motion compensation transformation or the global motion compensation transformation may be selected for use with the reference image. In some implementations, local motion estimation to obtain local motion information (e.g., local motion vectors) includes a multi-scale analysis may be used to iteratively narrow the scope of a block matching search for corresponding blocks in a target image.

Motion compensation may be applied to a recirculated image to increase hit rate (e.g., a percentage of image portions of a recirculated image that are used for temporal noise reduction) temporal noise reduction algorithm and improve image quality of the captured images. In some implementations, recirculating an image for temporal noise reduction processing includes applying motion compensation (e.g., local motion compensation and/or global motion compensation) to the recirculated image to better align image portions of the recirculated image with corresponding image portions of a next current image with which it will be combined for temporal noise reduction. A motion compensation transformation applied to a recirculated image may also be applied to a noise map for the recirculated image in order to preserve the correspondence between pixel values in the recirculated image and estimates of noise level in the noise map.

In some implementations, multiple image sensors with overlapping fields are used to capture images that are stitched together to obtain a composite image that represents the combined field of view for the multiple image sensors. When writing an overlapping portion of a processed image to memory, one of the overlapping processed image portions may be maintained in an internal memory buffer of an image signal processor while a corresponding overlapping processed image portion for another image sensor is read from memory, combined (e.g., via a blending operation) with the overlapping processed image portion in the buffer, and the combined processed image portion is written back to memory. This architecture for an image processing pipeline for stitching may reduce memory bandwidth usage and improve performance of an image signal processor.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
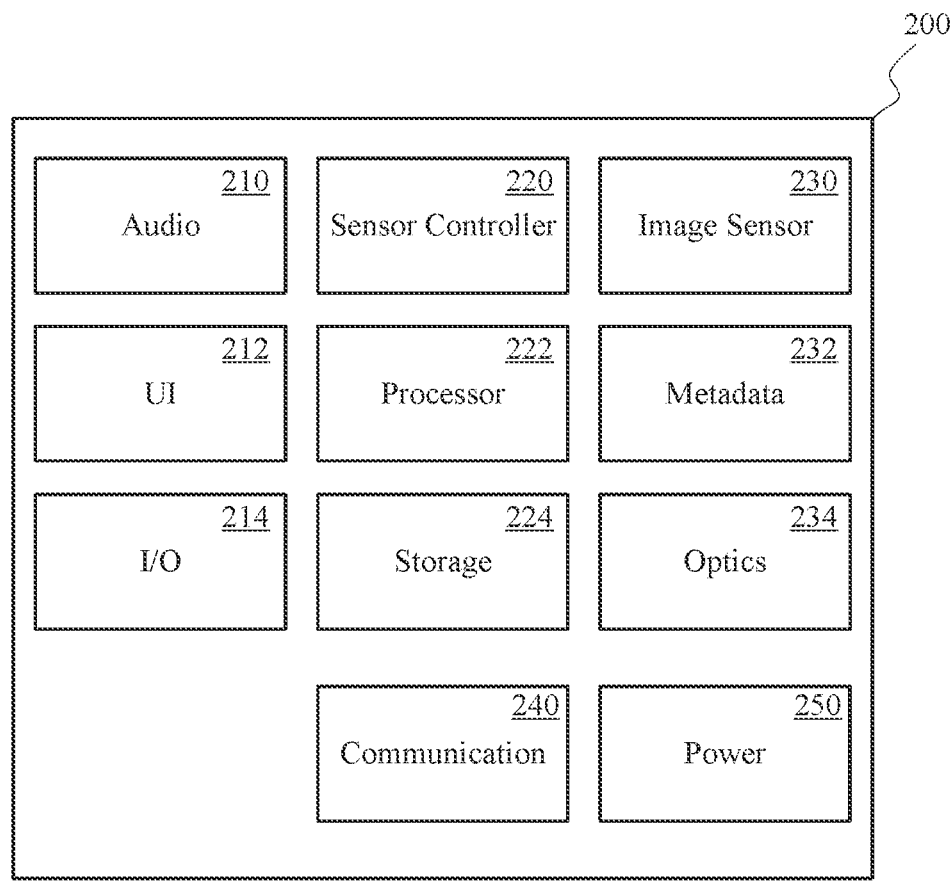
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (e.g., buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an IMU, which may include one or more accelerometers and/or gyroscopes, a magnetometer, a compass, a GPS sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a GPS sensor that may provide GPS coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture device 200 and a remote device (e.g., the user interface device 120 in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution (e.g., battery, solar cell, inductive (contactless) power source, rectification, and/or other power supply) may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3:
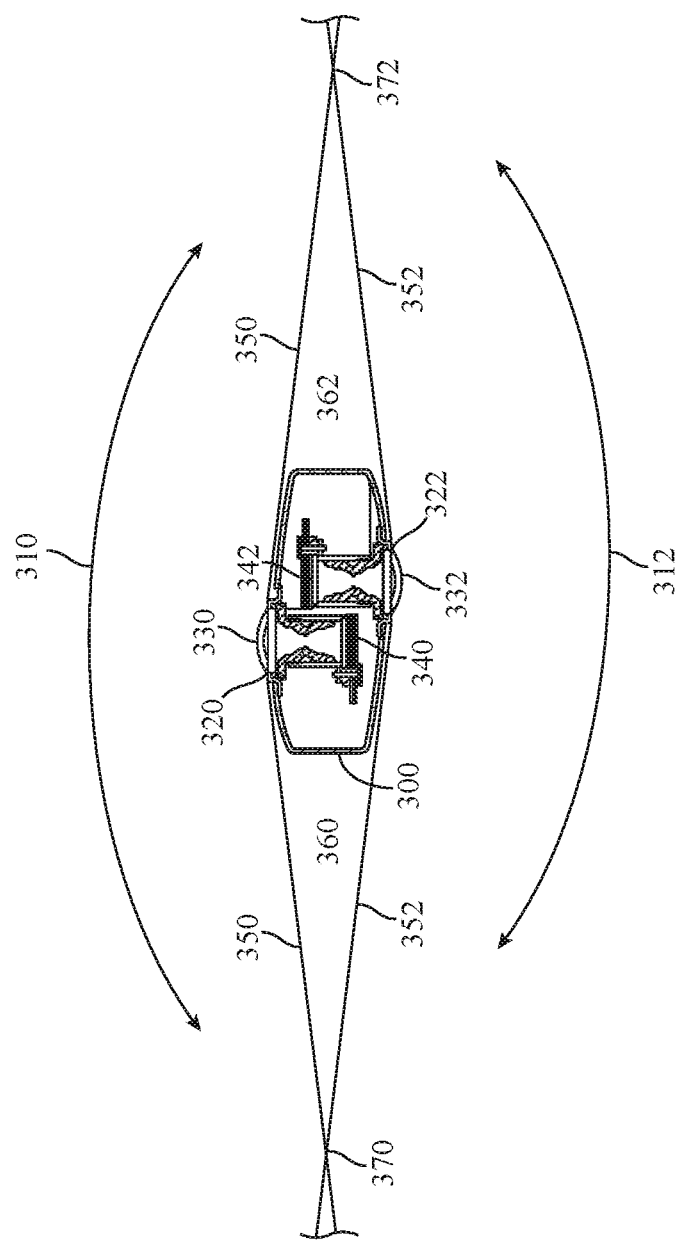
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the respective image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses (e.g., lenses aligned along the same axis), the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitching boundary may be matched accurately to minimize boundary discontinuities.

Figure 4:
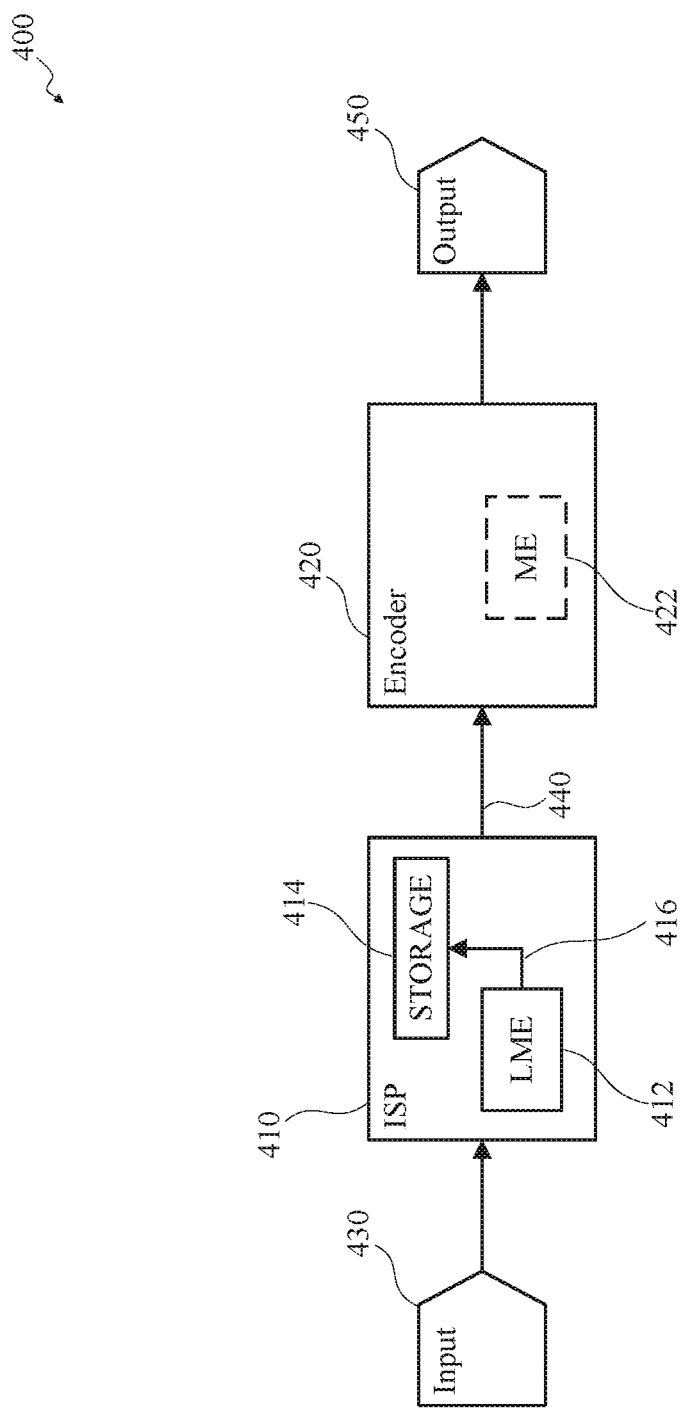
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as 24, 30, or 60 frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks (e.g., having 4×4, 16×16, 64×64, and/or other dimensions). In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors (e.g., an x component and y component of motion) at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include electronic storage 414, such as memory (e.g., random access memory (RAM), flash, or other types of memory). The electronic storage 414 may store local motion estimation information 416 determined by the local motion estimation unit 412 for one or more frames. The local motion estimation information 416 and associated image or images may be passed as output 440 to the encoder 420. In some implementations, the electronic storage 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image of output 440 of the image signal processor 410. In some implementations, the encoder 420 may encode the image of output 440 of the image signal processor 410 using motion information generated by the motion estimation unit 422 of the encoder 420, the local motion estimation information 416 generated by the local motion estimation unit 412 of the image signal processor 410, or a combination thereof. For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image of output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the image signal processor 410 for motion compensation processing.

Figure 5:
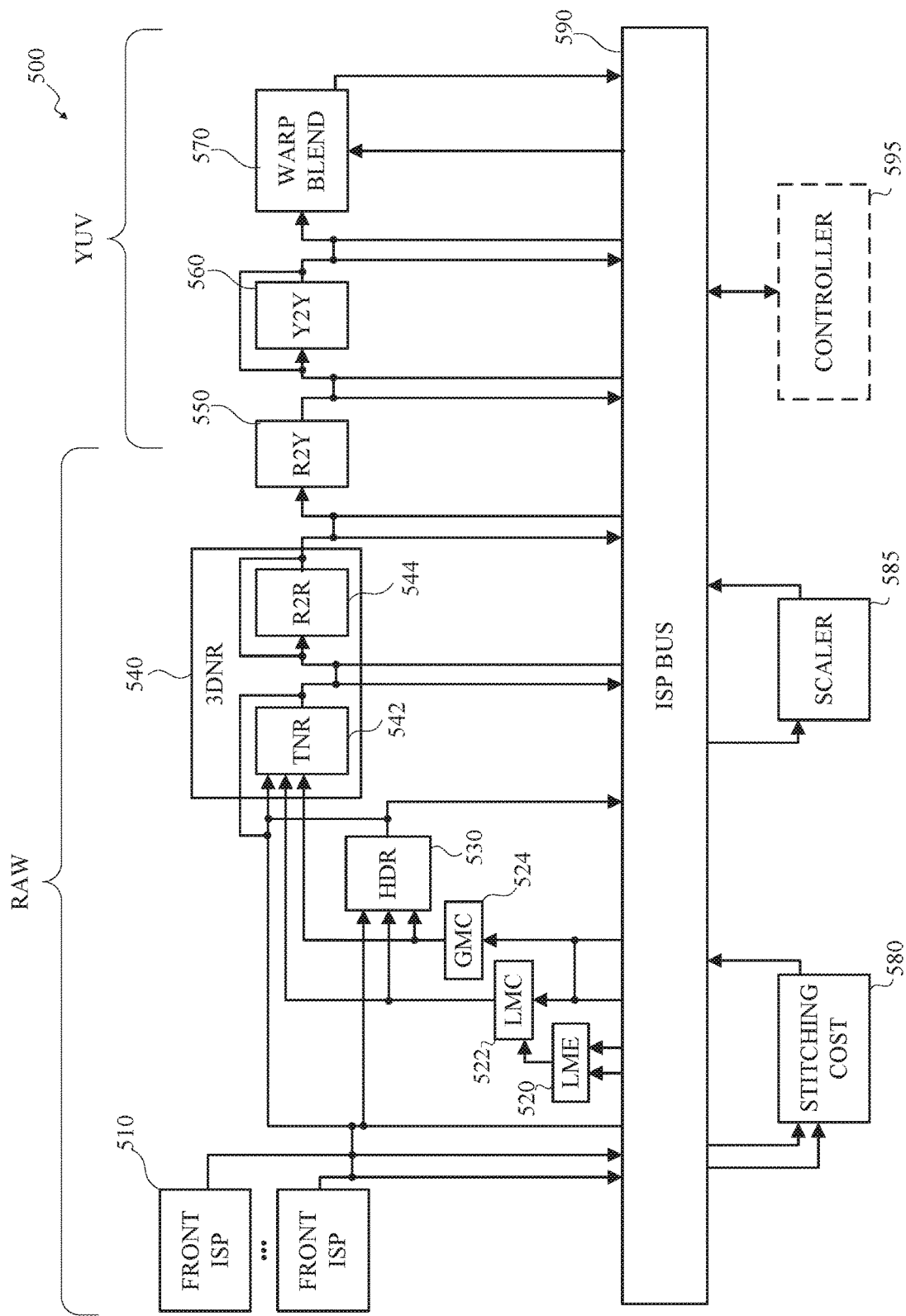
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processor bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processor bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with each image capture device.

The local motion estimation unit 520 may receive a target image (e.g., a target frame of video) and a reference image (e.g., a reference frame of video) and determine motion information (e.g., a set of motion vectors) that may be used to determine a transformation that may be applied to the reference image to better align image portions (e.g., pixels or blocks of pixels) of the reference image with corresponding image portions of the target image.

The local motion estimation unit 520 may receive, or otherwise access, a target image, or one or more portions thereof, which may be a current input frame, such as via the image signal processor bus 590. In some implementations, the local motion estimation unit 520 may receive the target image, at a downscaled, or reduced, resolution. In some implementations, such as implementations implementing high dynamic range image processing, the target image may be a long exposure input frame.

The local motion estimation unit 520 may receive, or otherwise access, a reference image, or one or more portions thereof, such as via the image signal processor bus 590. In some implementations, such as implementations including temporal noise reduction, the reference image may be a recirculated frame that has been generated based on one or more previous frames of video from an image sensor. For example, the reference image may be a recirculated frame from the three-dimensional noise reduction unit 540. In some implementations, such as implementations including high dynamic range image processing, the reference image may be a short exposure input frame corresponding to the long exposure input frame that will be combined with the long exposure input frame to obtain a high dynamic range frame.

In some implementations, the local motion estimation unit 520 may receive, or otherwise access, previously generated motion information, such as previously generated motion vectors for the target image or motion information for a previously processed frame.

The local motion estimation unit 520 may determine motion information, such as motion vectors, representing motion between the reference image and the target image, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, a reference image, or one or more portions thereof, such as via the image signal processor bus 590. In some implementations, such as implementations implementing temporal noise reduction processing, the reference image may be a recirculated frame (e.g., from the three-dimensional noise reduction unit 540). In some implementations, such as implementations implementing high dynamic range image processing, the reference image may be the short exposure input frame, where a corresponding long exposure frame has been used as the target image. In some implementations, such as implementations implementing high dynamic range image processing, the reference image may be a long exposure input frame, where a corresponding short exposure frame has been used as the target image.

The local motion compensation unit 522 may receive, or otherwise access, motion information, such as motion vectors, associated with the reference image. For example, the local motion compensation unit 522 may receive the motion vectors from the local motion estimation unit 520.

The local motion compensation unit 522 may generate or obtain a prediction image (e.g., a prediction frame), or a portion thereof, such as a prediction block, which may be a prediction of the target image, or a portion thereof, such as a target block of the target image, based on the reference image, or a portion thereof, and the local motion information. For example, a prediction image may be obtained by applying a transformation, which is based on the local motion information, to the reference image (e.g., a recirculated frame or a short exposure frame). The local motion compensation unit 522 may output a local motion prediction image, or one or more portions thereof, which may be referred to herein as a local motion compensated image (e.g., a local motion compensated frame of video).

The global motion compensation unit 524 may receive, or otherwise access, the reference image, or one or more portions thereof, such as via the image signal processor bus 590. In some implementations, such as implementations implementing temporal noise reduction processing, the reference image may be a recirculated frame (e.g., from the three-dimensional noise reduction unit 540). In some implementations, such as implementations implementing high dynamic range image processing, the reference image may be a short exposure input frame, where a corresponding long exposure input frame has been used as the target image. In some implementations, such as implementations implementing high dynamic range image processing, the reference image may be a long exposure input frame, where a corresponding short exposure input frame has been used as the target image.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to a time period between capture of the reference image and capture of the target image. The global motion information may indicate a non-translational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus.

The global motion compensation unit 524 may generate or obtain a prediction image (e.g., a prediction frame of video), or a portion thereof, such as a prediction block, which may be a prediction of the target image, or a portion thereof, such as a target block of the target image, based on the reference image, or a portion thereof, and the global motion information. For example, a prediction image may be obtained by applying a transformation, which is based on the global motion information, to the reference image (e.g., a recirculated frame or a short exposure frame). The global motion compensation unit 524 may output a global motion prediction image, or one or more portions thereof, which may be referred to herein as a global motion compensated image (e.g., a global motion compensated frame of video).

The high dynamic range unit 530 may receive, or otherwise access, (e.g., from the front image signal processor 510) multiple images of a scene that have been captured with different exposure times. The high dynamic range unit 530 may combine the images captured with different exposure times to obtain a high dynamic range image. For example, the high dynamic range unit 530 may combine two images, a long exposure image and a short exposure image, to obtain a high dynamic range image. For example, image portions (e.g., pixels or blocks of pixels) of the high dynamic range image may be determined based on corresponding image portions the short exposure image where the respective image portions of the long exposure image have saturated pixel values and may otherwise determine image portions of the high dynamic range based on corresponding image portions the long exposure image. In some implementations, motion compensation (e.g., local motion compensation by the local motion compensation unit 522 and/or global motion compensation by the global motion compensation unit 524) may be applied to either the long exposure image or the short exposure image to better align pixels corresponding to objects appearing in the field of view of the two input images. For example, the high dynamic range unit 530 may combine a long exposure image with a motion compensated short exposure image. For example, the high dynamic range unit 530 may combine a short exposure image with a motion compensated long exposure image. The high dynamic range unit 530 may receive, or otherwise access, the local motion prediction image, or a portion thereof, from the local motion compensation unit 522. The high dynamic range unit 530 may receive, or otherwise access, the global motion prediction image, or a portion thereof, from the global motion compensation unit 524.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, a local motion prediction frame from the local motion compensation unit 522. The temporal noise reduction unit 542 may receive, or otherwise access, the global motion prediction frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image from a sequence of images (e.g., a current frame from a video) with a recirculated image that is based on one or more previous images from the sequence of images to obtain a noise reduced image. Details of this combination (e.g., mixing weights for respective image portions) may be determined based on noise level information (e.g., a noise map) for the recirculated image.

The temporal noise reduction unit 542 may generate output including a pixel value and associated noise variance for the pixel value for one or more pixels of the noise reduced image (e.g., the noise reduced frame).

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing each pixel in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processor bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processor bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

FIG. 6A is a block diagram of an example of a system 600 configured for image capture and stitching. The system 600 includes an image capture device 610 (e.g., a camera or a drone) that includes a processing apparatus 612 that is configured to receive a first image from a first image sensor 614 and receive a second image from a second image sensor 616. The processing apparatus 612 may be configured to perform image signal processing (e.g., filtering, stitching, and/or encoding) to generated composite images based on image data from the image sensors 614 and 616. The image capture device 610 includes a communications interface 618 for transferring images to other devices. The image capture device 610 includes a user interface 620, which may allow a user to control image capture functions and/or view images. The image capture device 610 includes a battery 622 for powering the image capture device 610. The components of the image capture device 610 may communicate with each other via a bus 624. The system 600 may be used to implement techniques described in this disclosure, such as the technique 900 of FIG. 9 and/or the technique 1100 of FIG. 11.

The processing apparatus 612 may include one or more processors having single or multiple processing cores. The processing apparatus 612 may include memory, such as random access memory device (RAM), flash memory, or any other suitable type of storage device such as a non-transitory computer readable memory. The memory of the processing apparatus 612 may include executable instructions and data that can be accessed by one or more processors of the processing apparatus 612. For example, the processing apparatus 612 may include one or more DRAM modules such as double data rate synchronous dynamic random-access memory (DDR SDRAM). In some implementations, the processing apparatus 612 may include a digital signal processor (DSP). In some implementations, the processing apparatus 612 may include an application specific integrated circuit (ASIC). For example, the processing apparatus 612 may include a custom image signal processor.

The first image sensor 614 and the second image sensor 616 are configured to detect light of a certain spectrum (e.g., the visible spectrum or the infrared spectrum) and convey information constituting an image as electrical signals (e.g., analog or digital signals). For example, the image sensors 614 and 616 may include charge-coupled devices (CCD) or active pixel sensors in complementary metal-oxide-semiconductor (CMOS). The image sensors 614 and 616 may detect light incident through respective lens (e.g., a fisheye lens). In some implementations, the image sensors 614 and 616 include digital to analog converters. In some implementations, the image sensors 614 and 616 are held in a fixed orientation with respective fields of view that overlap. For example, the image sensors 614 and 616 may be configured to capture image data using a plurality of selectable exposure times.

The image capture device 610 may include the communications interface 618, which may enable communications with a personal computing device (e.g., a smartphone, a tablet, a laptop computer, or a desktop computer). For example, the communications interface 618 may be used to receive commands controlling image capture and processing in the image capture device 610. For example, the communications interface 618 may be used to transfer image data to a personal computing device. For example, the communications interface 618 may include a wired interface, such as a high-definition multimedia interface (HDMI), a universal serial bus (USB) interface, or a FireWire interface. For example, the communications interface 618 may include a wireless interface, such as a Bluetooth interface, a ZigBee interface, and/or a Wi-Fi interface.

The image capture device 610 may include the user interface 620. For example, the user interface 620 may include an LCD display for presenting images and/or messages to a user. For example, the user interface 620 may include a button or switch enabling a person to manually turn the image capture device 610 on and off. For example, the user interface 620 may include a shutter button for snapping pictures.

The image capture device 610 may include the battery 622 that powers the image capture device 610 and/or its peripherals. For example, the battery 622 may be charged wirelessly or through a micro-USB interface.

FIG. 6B is a block diagram of an example of a system 630 configured for image capture and stitching. The system 630 includes an image capture device 640 that communicates via a communications link 650 with a personal computing device 660. The image capture device 640 includes a first image sensor 642 and a second image sensor 644 that are configured to capture respective images. The image capture device 640 includes a communications interface 646 configured to transfer images via the communication link 650 to the personal computing device 660. The personal computing device 660 includes a processing apparatus 662, a user interface 664, and a communications interface 666. The processing apparatus 662 is configured to receive, using the communications interface 666, a first image from the first image sensor 642, and receive a second image from the second image sensor 644. The processing apparatus 662 may be configured to perform image signal processing (e.g., filtering, stitching, and/or encoding) to generated composite images based on image data from the image sensors 642 and 644. The system 630 may be used to implement techniques described in this disclosure, such as the technique 900 of FIG. 9 and/or the technique 1100 of FIG. 11.

The first image sensor 642 and the second image sensor 644 are configured to detect light of a certain spectrum (e.g., the visible spectrum or the infrared spectrum) and convey information constituting an image as electrical signals (e.g., analog or digital signals). For example, the image sensors 642 and 644 may include charge-coupled devices (CCD) or active pixel sensors in complementary metal-oxide-semiconductor (CMOS). The image sensors 642 and 644 may detect light incident through respective lens (e.g., a fisheye lens). In some implementations, the image sensors 642 and 644 include digital to analog converters. In some implementations, the image sensors 642 and 644 are held in a fixed relative orientation with respective fields of view that overlap. For example, the image sensors 642 and 644 may be configured to capture image data using a plurality of selectable exposure times. Image signals from the image sensors 642 and 644 may be passed to other components of the image capture device 640 via a bus 648.

The communications link 650 may be wired communications link or a wireless communications link. The communications interface 646 and the communications interface 666 may enable communications over the communications link 650. For example, the communications interface 646 and the communications interface 666 may include a high-definition multimedia interface (HDMI), a universal serial bus (USB) interface, a FireWire interface, a Bluetooth interface, a ZigBee interface, and/or a Wi-Fi interface. For example, the communications interface 646 and the communications interface 666 may be used to transfer image data from the image capture device 640 to the personal computing device 660 for image signal processing (e.g., filtering, stitching, and/or encoding) to generated composite images based on image data from the image sensors 642 and 644.

The processing apparatus 662 may include one or more processors having single or multiple processing cores. The processing apparatus 662 may include memory, such as random access memory device (RAM), flash memory, or any other suitable type of storage device such as a non-transitory computer readable memory. The memory of the processing apparatus 662 may include executable instructions and data that can be accessed by one or more processors of the processing apparatus 662. For example, the processing apparatus 662 may include one or more DRAM modules such as double data rate synchronous dynamic random-access memory (DDR SDRAM). In some implementations, the processing apparatus 662 may include a digital signal processor (DSP). In some implementations, the processing apparatus 662 may include an application specific integrated circuit (ASIC). For example, the processing apparatus 662 may include a custom image signal processor. The processing apparatus 662 may exchange data (e.g., image data) with other components of the personal computing device 660 via the bus 668.

The personal computing device 660 may include the user interface 664. For example, the user interface 664 may include a touchscreen display for presenting images and/or messages to a user and receiving commands from a user. For example, the user interface 664 may include a button or switch enabling a person to manually turn the personal computing device 660 on and off. In some implementations, commands (e.g., start recording video, stop recording video, or snap photograph) received via the user interface 664 may be passed on to the image capture device 640 via the communications link 650.

Figure 7:
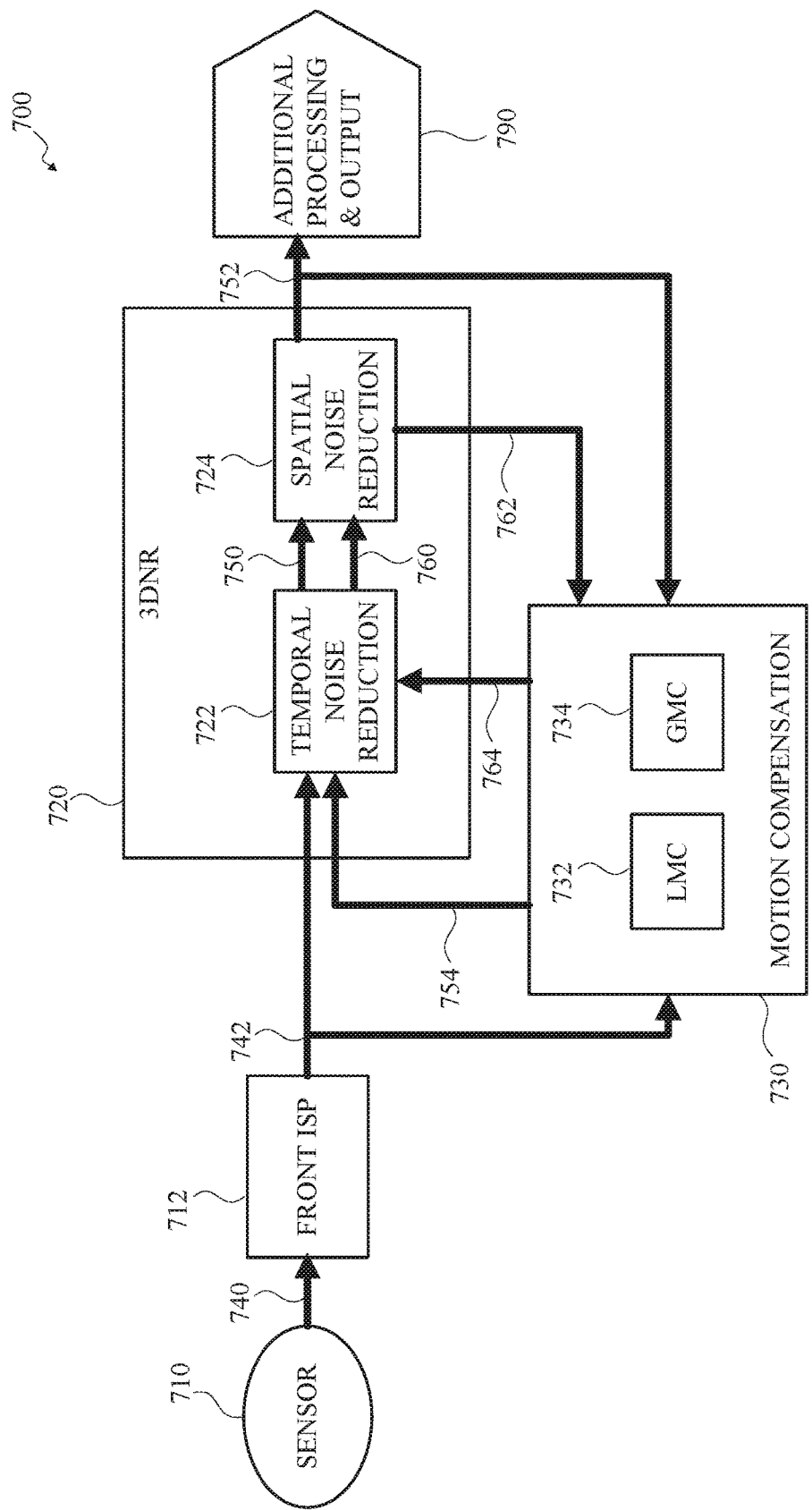
FIG. 7 is a block diagram of an example of an image processing pipeline for capturing images and reducing noise in the images.

FIG. 7 is a block diagram of an example of an image processing pipeline 700 for capturing images and reducing noise in the images. The image processing pipeline 700 includes an image sensor 710 configured to capture images (e.g., frames of video); a front ISP 712 configured for initial processing of captured images; a three-dimensional noise reduction module 720, which includes a temporal noise reduction module 722 and a spatial noise reduction module 724, that combines corresponding nearby pixels in space and time (e.g., within a two dimensional image and between images in a sequence of images) to reduce noise in the pixel values; a motion compensation module 730, which includes a local motion compensation module 732 and a global motion compensation module 734, that may apply transformations to recirculated images from the three-dimensional noise reduction module 720 to better align pixels in a recirculated images with corresponding pixels in a current image from the front ISP 712 to improve pixel hit rates for noise reduction operations applied in the three-dimensional noise reduction module 720; and modules 790 for additional processing and outputting images based on the noise reduced images 752 from the three-dimensional noise reduction module 720. For example, the image processing pipeline 700 may be included in the image capture device 610 of FIG. 6A. For example, the image processing pipeline 700 may be included in the system 630 of FIG. 6B. In some implementations, the image processing pipeline 700 may be included in an image capture apparatus, such as the image capture apparatus 110 shown in FIG. 1 or the image capture apparatus 300 shown in FIG. 3.

The image processing pipeline 700 includes the image sensor 710. The input image signal 740 from the image sensor 710 is passed to the front ISP 712 for initial processing. For example, the front ISP 712 may be similar to front image signal processor 510 of FIG. 5 and implement some or all of that component's functions. The front image signal processor 712 may process the input image signal 740 to generate a current image 742 in a sequence of images (e.g., a current frame from a video) captured using the image sensor 710. In some implementations, the front ISP 712 may determine one or more low resolution images based on the current image 742. The low resolution image(s) (not shown) may be output along with the current image 742 and passed to other modules (e.g., the motion compensation module 730) that may use the low resolution copies of the current image 742. Having a low resolution image included along with the current image 742 may facilitate efficient performance of downstream functions in the image processing pipeline 700.

The three-dimensional noise reduction module 720 is configured to combine the current image 742 (e.g., a current frame of a captured video) with a recirculated image 754 (e.g., a recirculated frame of video) to obtain a noise reduced image 752 (e.g., a noise reduced frame of video), where the recirculated image 754 is based on one or more previous images of a sequence of images (e.g., previous frames of video) from the image sensor 710. The three-dimensional noise reduction module 720 includes a temporal noise reduction module 722 that recursively combines the current image with the recirculated image to obtain a temporal noise reduced image 750. The temporal noise reduction module 722 may combine the current image 742 with the recirculated image 754 using a set of mixing weights for respective image portions (e.g., pixels or blocks of pixels) of the recirculated image 754. For example, an image portion of the temporal noise reduced image 750 may be determined as the weighted sum:

$$NR\_n = w\_n * R\_n + (1 - w\_n) * C\_n \qquad \text{[Equation 1]}$$

where $NR\_n$ is an nth image portion of the temporal noise reduced image 750, $w\_n$ is a mixing weight for an nth image portion of the recirculated image 754, R_n is the nth image portion of the recirculated image 754, and C_n is the nth image portion of the current image 742. The mixing weights for a recirculated image 754 may be determined based on a noise map 764 for the recirculated image 754. The noise map 764 may include estimates of noise levels (e.g., a variance or a standard deviation) for respective image portions (e.g., pixels or blocks of pixels) of the recirculated image 754. The mixing weights may also be determined based on estimates of the noise levels for pixels in the current image 742. For example, the estimates of the noise levels for the current image may be based on a noise model for elements of the image sensor 710. For example, the estimates of the noise levels for the current image may depend on an exposure time used by the image sensor 710 to capture the current image 742. In some implementations, a noise model varies with the color channel (e.g., estimates of noise level for red pixels are set to a first value, estimates of noise level for green pixels are set to a second value, and estimates of noise level for blue pixels are set to a third value).

In some implementations, the input signal may be scaled such that the noise level for pixels in the current image is chosen to be a consistent level (e.g., one). For example, the mixing weights may be determined using a Guassian model as:

$$w\_n = a/(1+a) \quad \text{[Equation 1.1]}$$

$$a = \exp(-((R\_n - C\_n)/(1+SR\_n))^2)/SR\_n^2 \quad \text{[Equation 1.2]}$$

where w_n is a mixing weight for an nth image portion of the recirculated image 754, R_n is the nth image portion of the recirculated image 754, C_n is the nth image portion of the current image 742, and SR_n is an estimate of noise level (e.g., a standard deviation) for the nth image portion of the recirculated image 754 (e.g., from the noise map 764).

The temporal noise reduction module 722 may also determine a noise map 760 for the temporal noise reduced image 750. In some implementations, the noise map 760 may be determined based on the estimates of noise level for pixels in the current image 742, the noise map 764 for the recirculated image 754, and the set of mixing weights used to determine the temporal noise reduced image 750. For example, a portion of the noise map 760 may be determined as:

$$SNR\_n = \text{sqrt}(w\_n^2 * SR\_n^2 + (1-w\_n)^2 * SC\_n^2) \quad \text{[Equation 2]}$$

where SNR_n is an estimate of noise level (e.g., a standard deviation) for an nth image portion of the temporal noise reduced image 750, w_n is a mixing weight for an nth image portion of the recirculated image 754, SR_n is an estimate of noise level (e.g., a standard deviation) for the nth image portion of the recirculated image 754 (e.g., from the noise map 764), and SC_n is an estimate of noise level (e.g., a standard deviation) for the nth image portion of the current image 742.

The spatial noise reduction module 724 may apply spatial noise reduction filtering to the temporal noise reduced image 750 in order to obtain the noise reduced image 752. The spatial noise reduction module 724 may also determine a noise map 762 for the noise reduced image 752 based on the noise map 760 and a filter applied to the temporal noise reduced image 750 by the spatial noise reduction module 724.

The noise reduced image 752 may be recirculated through the motion compensation module 730, which may apply a motion compensation transformation to the noise reduced image 752 to obtain a next recirculated image 754. A motion compensation transformation may be applied to better align pixels of the next recirculated image 754 with corresponding pixels of a next current image 742 to be input to the three-dimensional noise reduction module 720. The local motion compensation module 732 may apply a local motion compensation transformation to obtain a first candidate recirculated image. The global motion compensation module 734 may apply a global motion compensation transformation to obtain a second candidate recirculated image. In some implementations, quality metrics for the candidate recirculated images may be determined and compared to select a candidate recirculated image as the next recirculated image 754. A motion compensation transformation (e.g., the local motion compensation transformation, the global motion compensation transformation, or an identity transformation) used to generate the next recirculated image 754 may be used to determine the next noise map 764 for the next recirculated image 754 based on the noise map 762 for the noise reduced image 752. For example, the motion compensation transformation may be applied to the noise map 762 to obtain the noise map 764.

The noise reduced image 752 is also passed to the modules 790 that may implement addition image processing and output an image based on the noise reduced image 752. For example, the modules 790 may implement a demosaicing operation to map from a raw format to a YUV domain format (e.g., as described in relation to the raw to YUV unit 550); a tone mapping operation (e.g., as described in relation to the YUV to YUV unit 560), which may include a local tone mapping and/or a global tone mapping; a warp transformation (e.g., as described in relation to the warp and blend unit 570), which may correct distortions such as lens distortion and electronic rolling shutter distortion and/or stitch images from the image sensor 710 with images from one or more other image sensors of an image capture apparatus (e.g., the image capture apparatus 110 or the image capture apparatus 300); and/or an encoding operation to compress and encode an image (e.g., a frame of a video) based on the noise reduced image 752.

In some implementations (not shown), the three-dimensional noise reduction module 720 may apply spatial noise reduction to current images 742 from the image sensor 710 before applying recursive temporal noise reduction based on recirculated images 754 to obtain the noise reduced images 752, i.e., the order of spatial and temporal noise reduction processing may be reversed. In this case, noise estimates for pixels of the current images may be updated based on a filter applied for spatial noise reduction to determine a noise map for a resulting spatial noise reduced image. The noise map 762 for the noise reduced image 752 may then be determined based on the noise map for the resulting spatial noise reduced image, the noise map 764, and a set of mixing weights used to combine a recirculated image 754 with the spatial noise reduced image.

Figure 8:
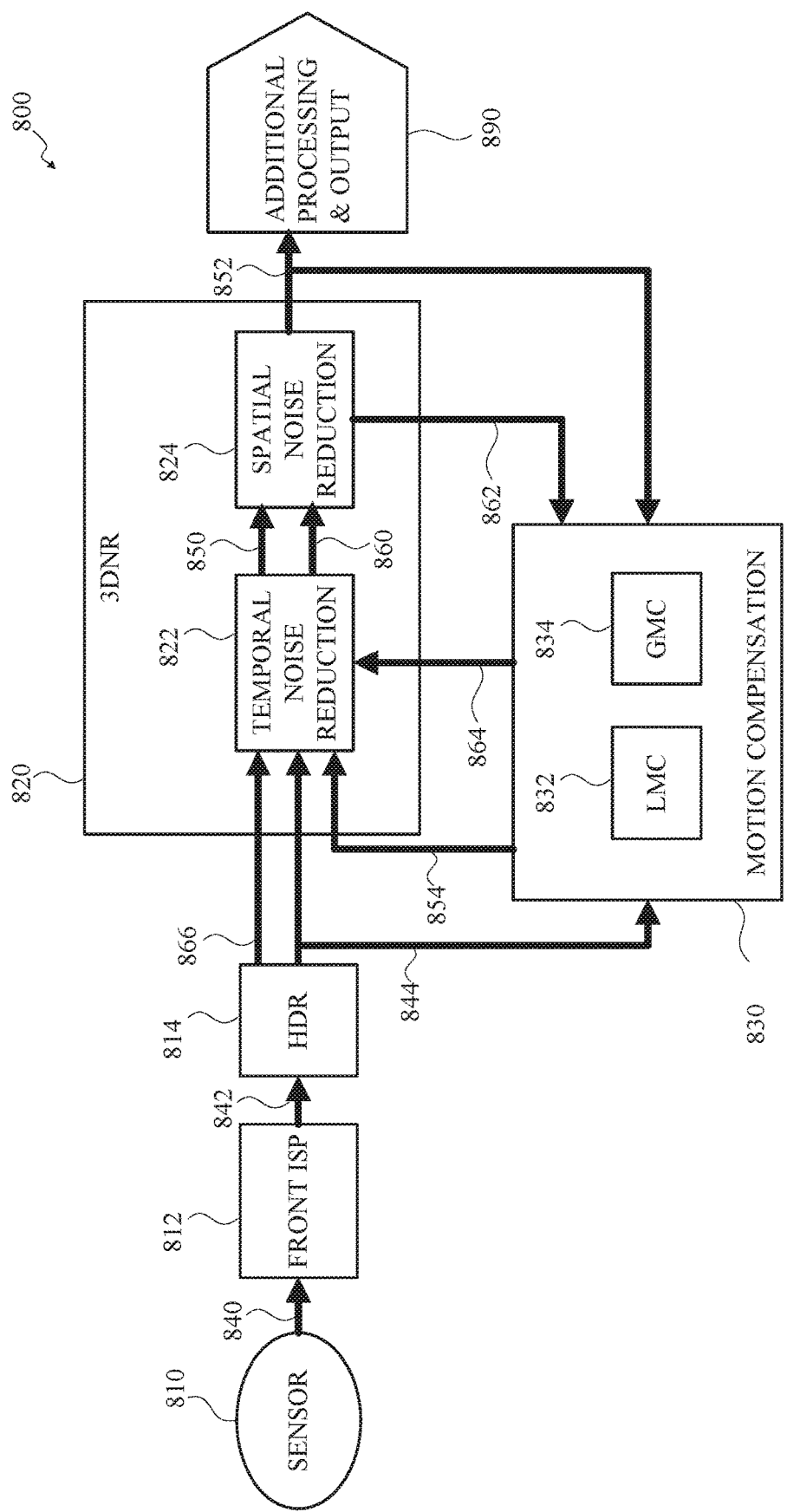
FIG. 8 is a block diagram of an example of an image processing pipeline for capturing images with high dynamic range and reducing noise in the high dynamic range images.

FIG. 8 is a block diagram of an example of an image processing pipeline 800 for capturing images with high dynamic range and reducing noise in the high dynamic range images. The image processing pipeline 800 includes an image sensor 810 configured to capture images (e.g., frames of video); a front ISP 812 configured for initial processing of captured images; a high dynamic range module 814 that combines images captured with different exposure times by the image sensor 810 to obtain an image with a higher dynamic range than the constituent images; a three-dimensional noise reduction module 820, which includes a temporal noise reduction module 822 and a spatial noise reduction module 824, that combines corresponding nearby pixels in space and time (e.g., within a two dimensional image and between images in a sequence of images) to reduce noise in the pixel values; a motion compensation module 830, which includes a local motion compensation module 832 and a global motion compensation module 834, that may apply transformations to recirculated images from the three-dimensional noise reduction module 820 to better align pixels in a recirculated images with corresponding pixels in a current image from the front ISP 812 to improve pixel hit rates for noise reduction operations applied in the three-dimensional noise reduction module 820; and modules 890 for additional processing and outputting images based on the noise reduced images 852 from the three-dimensional noise reduction module 820. For example, the image processing pipeline 800 may be included in the image capture device 610 of FIG. 6A. For example, the image processing pipeline 800 may be included in the system 630 of FIG. 6B. In some implementations, the image processing pipeline 800 may be included in an image capture apparatus, such as the image capture apparatus 110 shown in FIG. 1 or the image capture apparatus 300 shown in FIG. 3.

The image processing pipeline 800 includes the image sensor 810. The input image signal 840 from the image sensor 810 is passed to the front ISP 812 for initial processing. For example, the front ISP 812 may be similar to front ISP 510 of FIG. 5 and implement some or all of that component's functions. The front ISP 812 may process the input image signal 840 to generate partially processed images 842 in a sequence of images (e.g., a frames from a video) captured using the image sensor 810 using multiple (e.g., two) different exposure times. For example, the image sensor 810 may be configured to capture image data using a plurality of selectable exposure times. For example the images in a sequence of images captured by the image sensor 810 may alternate between using a short exposure time and a long exposure time.

Partially processed images 842 captured with different exposure times may be combined in the high dynamic range module 814 to obtain a high dynamic range images 844. For example, image portions (e.g., pixels or blocks of pixels) of a high dynamic range image 844 may be determined based on a corresponding image portion of a constituent partially processed image 842 with the longest available exposure time that does not have a pixel value that is saturated. The high dynamic range images 844 may include image portions captured with multiple different exposure times. Since noise levels for pixels can depend on exposure time, the high dynamic range images 844 may have different estimates of noise levels in different image portions that vary dynamically between successive high dynamic range images 844 based on the brightness patterns in a captured scene. The high dynamic range module 814 may also determine a noise map 866 for a high dynamic range image 844, where the noise map 866 is determined based on the particular combination of image components from the constituent partially processed images 842 used to determine the high dynamic range image 844 and estimates of noise level (e.g., depending on the different exposure times and/or color channels) for pixels of those constituent partially processed images 842. For example, operations of the technique 1100 of FIG. 11 may be implemented by the high dynamic range module 814 to determine 1120 the high dynamic range image 844 and to determine 1124 a corresponding noise map 866.

The three-dimensional noise reduction module 820 is configured to combine the high dynamic range image 844 (e.g., a current frame of a captured video) with a recirculated image 854 (e.g., a recirculated frame of video) to obtain a noise reduced image 852 (e.g., a noise reduced frame of video), where the recirculated image 854 is based on one or more previous images of a sequence of images (e.g., previous frames of video) from the image sensor 810. The three-dimensional noise reduction module 820 includes a temporal noise reduction module 822 that recursively combines the high dynamic range image 844 with the recirculated image to obtain a temporal noise reduced image 850. The temporal noise reduction module 822 may combine the high dynamic range image 844 with the recirculated image 854 using a set of mixing weights for respective image portions (e.g., pixels or blocks of pixels) of the recirculated image 854. For example, an image portion of the temporal noise reduced image 850 may be determined as the weighted sum:

$$NR\_n = w\_n * R\_n + (1-w\_n) * HDR\_n \quad \text{[Equation 3]}$$

where NR_n is an nth image portion of the temporal noise reduced image 850, w_n is a mixing weight for an nth image portion of the recirculated image 854, R_n is the nth image portion of the recirculated image 854, and HDR_n is the nth image portion of the high dynamic range image 844. The mixing weights for a recirculated image 854 may be determined based on a noise map 864 for the recirculated image 854. The noise map 864 may include estimates of noise levels (e.g., a variance or a standard deviation) for respective image portions (e.g., pixels of blocks of pixels) of the recirculated image 854. The mixing weights may also be determined based on the noise map 866 for the high dynamic range image 844.

The temporal noise reduction module 822 may also determine a noise map 860 for the temporal noise reduced image 850. In some implementations, the noise map 860 may be determined based on the noise map 866 for the high dynamic range image 844, the noise map 864 for the recirculated image 854, and the set of mixing weights used to determine the temporal noise reduced image 850. For example, a portion of the noise map 860 may be determined as:

$$SNR\_n = \text{sqrt}(w\_n^2 * SR\_n^2 + (1-w\_n)^2 * SHDR\_n^2) \quad \text{[Equation 4]}$$

where SNR_n is an estimate of noise level (e.g., a standard deviation) for an nth image portion of the temporal noise reduced image 850, w_n is a mixing weight for an nth image portion of the recirculated image 854, SR_n is an estimate of noise level (e.g., a standard deviation) for the nth image portion of the recirculated image 854 (e.g., from the noise map 864), and SHDR_n is an estimate of noise level (e.g., a standard deviation) for the nth image portion of the high dynamic range image 844.

The spatial noise reduction module 824 may apply spatial noise reduction filtering to the temporal noise reduced image 850 in order to obtain the noise reduced image 852. The noise reduced image 852 may be determined based on the noise map 860. For example, filter coefficients or mixing weights for combining image pixels of the noise reduced image 850 to obtain pixels of the noise reduced image 852 may be determined based on the noise map 860. The spatial noise reduction module 824 may also determine a noise map 862 for the noise reduced image 852 based on the noise map 860 and a filter applied to the temporal noise reduced image 850 by the spatial noise reduction module 824.

The noise reduced image 852 may be recirculated through the motion compensation module 830, which may apply a motion compensation transformation to the noise reduced image 852 to obtain a next recirculated image 854. A motion compensation transformation may be applied to better align pixels of a recirculated image 854 with corresponding pixels of a next high dynamic range image 844 to be input to the three-dimensional noise reduction module 820. The local motion compensation module 832 may apply a local motion compensation transformation to obtain a first candidate recirculated image. The global motion compensation module 834 may apply a global motion compensation transformation to obtain a second candidate recirculated image. In some implementations, quality metrics for the candidate recirculated images may be determined and compared to select a candidate recirculated image as the next recirculated image 854. A motion compensation transformation (e.g., the local motion compensation transformation, the global motion compensation transformation, or an identity transformation) used to generate the next recirculated image 854 may be used to determine the next noise map 864 for the next recirculated image 854 based on the noise map 862 for the noise reduced image 852. For example, the motion compensation transformation may be applied to the noise map 862 to obtain the noise map 864.

The noise reduced image 852 is also passed to the modules 890 that may implement addition image processing and output an image based on the noise reduced image 852. For example, the modules 890 may implement a demosaicing operation to map from a raw format to a YUV domain format (e.g., as described in relation to the raw to YUV unit 550); a tone mapping operation (e.g., as described in relation to the YUV to YUV unit 560), which may include a local tone mapping and/or a global tone mapping; a warp transformation (e.g., as described in relation to the warp and blend unit 570), which may correct distortions such as lens distortion and electronic rolling shutter distortion and/or stitch images from the image sensor 810 with images from one or more other image sensors of an image capture apparatus (e.g., the image capture apparatus 110 or the image capture apparatus 300); and/or an encoding operation to compress and encode an image (e.g., a frame of a video) based on the noise reduced image 852.

Figure 9:
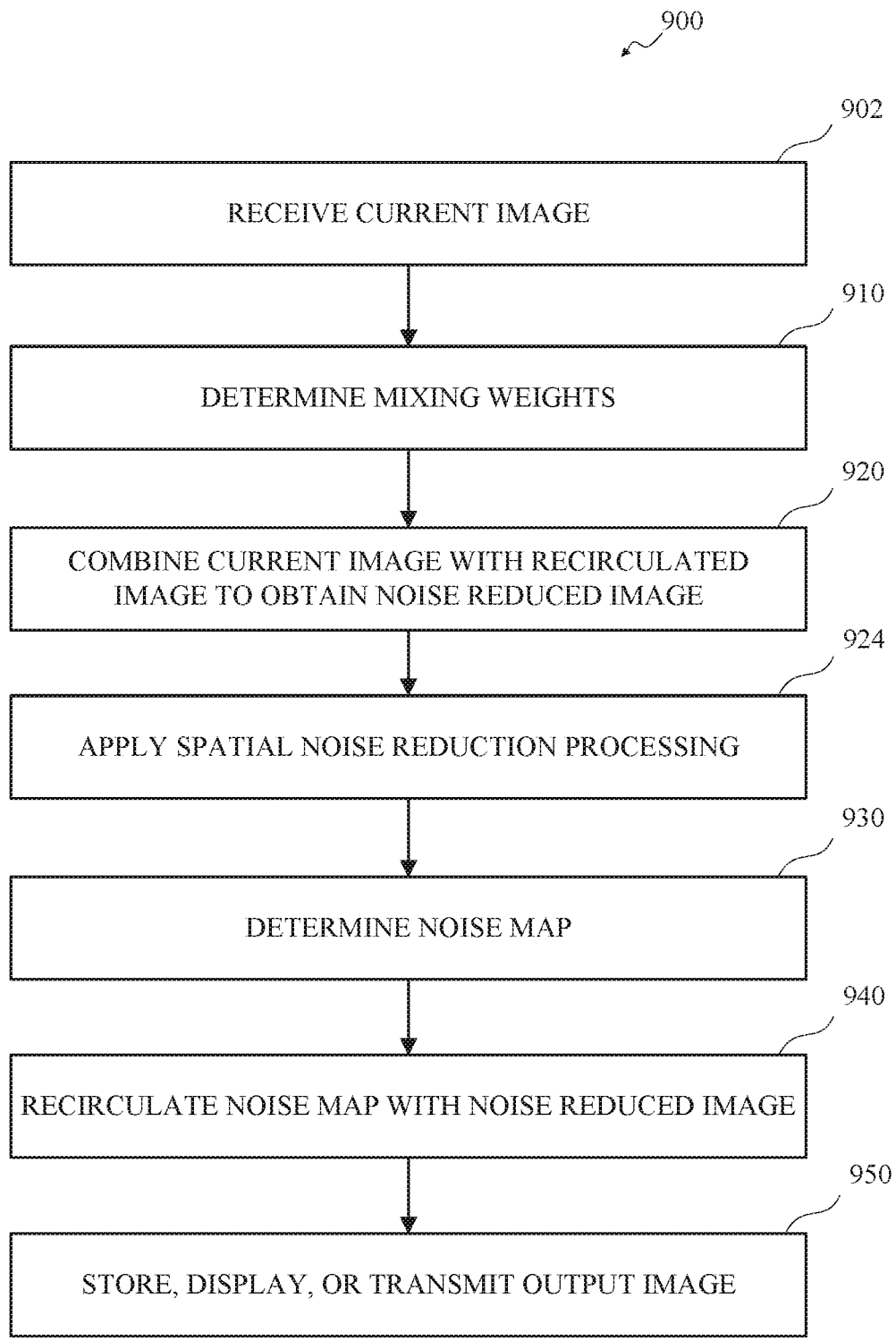
FIG. 9 is a flowchart of an example of a technique for applying three-dimensional noise reduction to captured images.

FIG. 9 is a flowchart of an example of a technique 900 for applying three-dimensional noise reduction to captured images. The technique 900 includes receiving 902 a current image from an image sensor; determining 910 mixing weights for recursively combining the current image with a recirculated image; combining 920 the current image with the recirculated image to obtain a noise reduced image; applying 924 spatial noise reduction processing to the noise reduced image; determining 930 a noise map for the noise reduced image; recirculating 940 the noise map with the noise reduced image; and storing, displaying, or transmitting an output image based on the noise reduced image. For example, the technique 900 may be implemented by the system 600 of FIG. 6A or the system 630 of FIG. 6B. For example, the technique 900 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 900 may be implemented by a personal computing device, such as the personal computing device 660. For example, the technique 900 may be implemented using a processing apparatus (e.g., the processing apparatus 612) that includes an image signal processor (e.g., the image signal processor 500).

The technique 900 includes receiving 902 a current image of a sequence of images (e.g., a current frame of video) from an image sensor. The image sensor may be part of an image capture apparatus (e.g., the image capture apparatus 110, the image capture apparatus 300, the image capture device 610, or the image capture device 640). For example, the current image may be received 902 from the image sensor via a bus (e.g., the bus 624 or image signal processor bus 590). In some implementations, the current image may be received 902 via a communications link (e.g., the communications link 650). For example, the current image may be received 902 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the current image may be received 902 via communications interface 666. For example, the current image may be received 902 via a front ISP (e.g., the front ISP 712 or the front ISP 812) that performs some initial processing on the received image. For example, the current image may represent each pixel value in a defined format, such as in a RAW image signal format. For example, the current image be stored in a format using the Bayer color mosaic pattern. In some implementations, the current image may be a current frame of video.

In some implementations, the current image may be a high dynamic range image that is received 902 as multiple constituent images and that is determined based on the multiple constituent images, which have been captured by the image sensor with different exposure times. For example, the current image may be determined by combining two images captured by the image sensor using different exposure times, such that the current image has a larger dynamic range than the two images. An input noise map for the current image may be determined based on noise level estimates for both of the two images. The input noise map may specify noise level estimates for respective image portions of the current image. For example, the current image and the input noise map may be determined using operations similar to those described in relation to the technique 1100 of FIG. 11. For example, the input noise map may be used by a temporal noise reduction module (e.g., the temporal noise reduction module 822) to determine (e.g., by reading from appropriate portions of the input noise map) the estimates of noise levels for pixels in the current image that are used to determine 930 a noise map for a noise reduced image determined (at operation 920) based on the current image.

The technique 900 includes determining 910 a set of mixing weights for combining the current image with a recirculated image that is based on one or more previous images in the sequence of images from the image sensor. The mixing weights for respective image components (e.g., pixels or blocks of pixels) of the recirculated image may be determined 910 based on estimates of noise levels for those image components and estimates of noise levels for corresponding image components of the current image. For example, estimates of noise levels (e.g., standard deviations or variances) for the recirculated image may be stored in a noise map for the recirculated image. For example, the noise map may be stored at the full resolution of the recirculated image (e.g., one estimate of noise level per pixel) or it may be stored at reduced resolution (e.g., one estimate of noise level per block of pixels). For example, the set of mixing weights may be determined 910 based on the noise map. For example, the mixing weight for a respective image portion may be determined 910 based on a ratio of an estimate of noise level (e.g., from a noise map) for the image portion of the recirculated image to an estimate of noise level (e.g., from a noise map) for a corresponding image portion of the current image. For example, the mixing weight for a respective image portion may be determined 910 as inversely proportional to an estimate of noise level (e.g., from a noise map) for the image portion of the recirculated image. For example, a mixing weight for an image component of the recirculated image may be determined 910 using the technique 1000 of FIG. 10. In some implementations, the mixing weight for a respective image portion may be determined 910 using Equation 1.1 and Equation 1.2 above.

The technique 900 includes combining 920 the current image (e.g. a current frame of video) with a recirculated image (e.g. a recirculated frame of video) to obtain a noise reduced image (e.g. a noise reduced frame of video). The recirculated image may be based on one or more previous images of the sequence of images from the image sensor. The current image may be combined 920 with the recirculated image using the set of mixing weights for respective image portions of the recirculated image. For example, current image may be combined 920 with recirculated image using the Equation 1 or the Equation 3 above.

The technique 900 includes applying 924 spatial noise reduction processing to the noise reduced frame after combining the current frame with the recirculated frame. Applying 924 spatial noise reduction processing may include applying a filter function to the current image. For example, applying 924 spatial noise reduction processing may include averaging nearby (e.g., for pixels within an 8 pixel radius or an 8×8 block of pixels) pixel values to determine a new value for a pixel at the center or the averaged area. In some implementations, pixels with pixel values that differ from the pixel value for the pixel being adjusted by more than a threshold amount are ignored and not included in the average used to the determine the new value of the pixel. In some implementations, estimates of noise level from a noise map for the noise reduced frame (e.g., the noise map 860) are used to determine a level of similarity between nearby pixel values. For example, the respective thresholds for determining whether pixels are similar and will be combined during spatial noise reduction processing may be determined based on respective noise level estimates corresponding to the pixels. A variety of spatial filter functions or kernels (e.g., a guassian kernel) may be used for spatial noise reduction processing. Averaging of similar nearby pixel values may reduce the noise levels for the pixels. In some implementations, the operations of combining 920 the current image with recirculated image and applying 924 spatial noise reduction processing can be performed together as a single operation.

The technique 900 includes determining 930 a noise map for the noise reduced image (e.g., a noise reduced frame of video), where the noise map is determined based on estimates of noise levels for pixels in the current image (e.g., a current frame of video), a noise map for the recirculated image (e.g., a recirculate frame of video), and the set of mixing weights. For example estimates of noise level (e.g., standard deviations or variance) in the noise map may be determined 930 based on a sum of squares of the mixing weights that have been used to determine a respective image portion of the noise reduced image. For example, estimates of noise level in the noise map may be determined 930 using the Equation 2 or the Equation 4 above.

In some implementations, the noise map is stored at a resolution that is lower than a full resolution of the current image (e.g., a current frame of video) from the image sensor. For example, the noise map may store estimates of noise level for 2×2, 4×4, 8×8, 16×16, or 32×32 blocks of pixels. For example, the estimate of noise level for a block of pixels may be an average of estimates of the noise level for pixels within the block. In some implementations, the current image (e.g., a current frame of video) from the image sensor is stored in a raw Bayer mosaic format, and the noise map is stored as an array of noise level estimates respectively corresponding to two-by-two Bayer blocks of pixels in the current image from the image sensor.

Determining 930 the noise map may include adjusting the noise map based on a filter function used for spatial noise reduction processing. For example, noise map values may be adjusted based on a squares of coefficients of the filter function.

The technique 900 includes recirculating 940 the noise map with the noise reduced image (e.g., a noise reduced frame of video) to combine the noise reduced image with a next image of the sequence of images (e.g., a next frame of video) from the image sensor. In some implementations, recirculated frames are passed directly back unchanged to be combined 920 with the next image by a temporal noise reduction module. In some implementations, recirculating 940 a noise reduced image may include applying motion compensation to the noise reduced image to better align pixels of the recirculated image with corresponding pixels of the next image. For example, a motion compensation transformation (e.g., a local motion compensation transformation or a global motion compensation transformation) that is used to determine the recirculated image may also be used to update the noise map for the recirculated image. For example, the technique 1300 of FIG. 13A may be implemented to recirculate the noise reduced image.

The technique 900 includes storing, displaying, or transmitting 950 an output image (e.g., and output frame of video) that is based on the noise reduced image (e.g., a noise reduced frame of video). For example, the output image may be transmitted 950 to an external device (e.g., a personal computing device) for display or storage. For example, the output image may be the same as the noise reduced image. For example, the output image may be a composite image determined by stitching an image based on the noise reduced image to one or more images from other image sensors with overlapping fields of view. For example, the output image may be compressed using an encoder (e.g., an MPEG encoder). For example, the output image may be transmitted 950 via the communications interface 618. For example, the output image may be displayed in the user interface 620 or in the user interface 664. For example, the output image may be stored in memory of the processing apparatus 612 or in memory of the processing apparatus 662.

The technique 900 may be applied recursively to the sequence of images (e.g., a sequence of frames of video) from the image sensor. For example, a next set of mixing weights may be determined 910 based on the noise map for the noise reduced image based on the current image. The noise reduced image (e.g., a noise reduced frame of video) may then be combined 920 with the next image (e.g., a next frame of video) using the next set of mixing weights.

In some implementations (not shown) the technique 900 may be modified to reverse the order in which spatial noise reduction processing and temporal noise reduction processing are applied to the current image. These implementations include applying spatial noise reduction processing to the current frame before combining the current frame with the recirculated frame. In these implementations, the estimates of noise levels for pixels in the current frame include a noise map for the current frame that is generated based on initial estimates of noise levels for pixels in the current frame and a filter function used for spatial noise reduction processing. The noise map determined 930 for the noise reduced image may then be determined based on the noise map for the current image after spatial noise reduction processing, the noise map for the recirculated image, and the set of mix weights used for temporal noise reduction processing.

Figure 10:
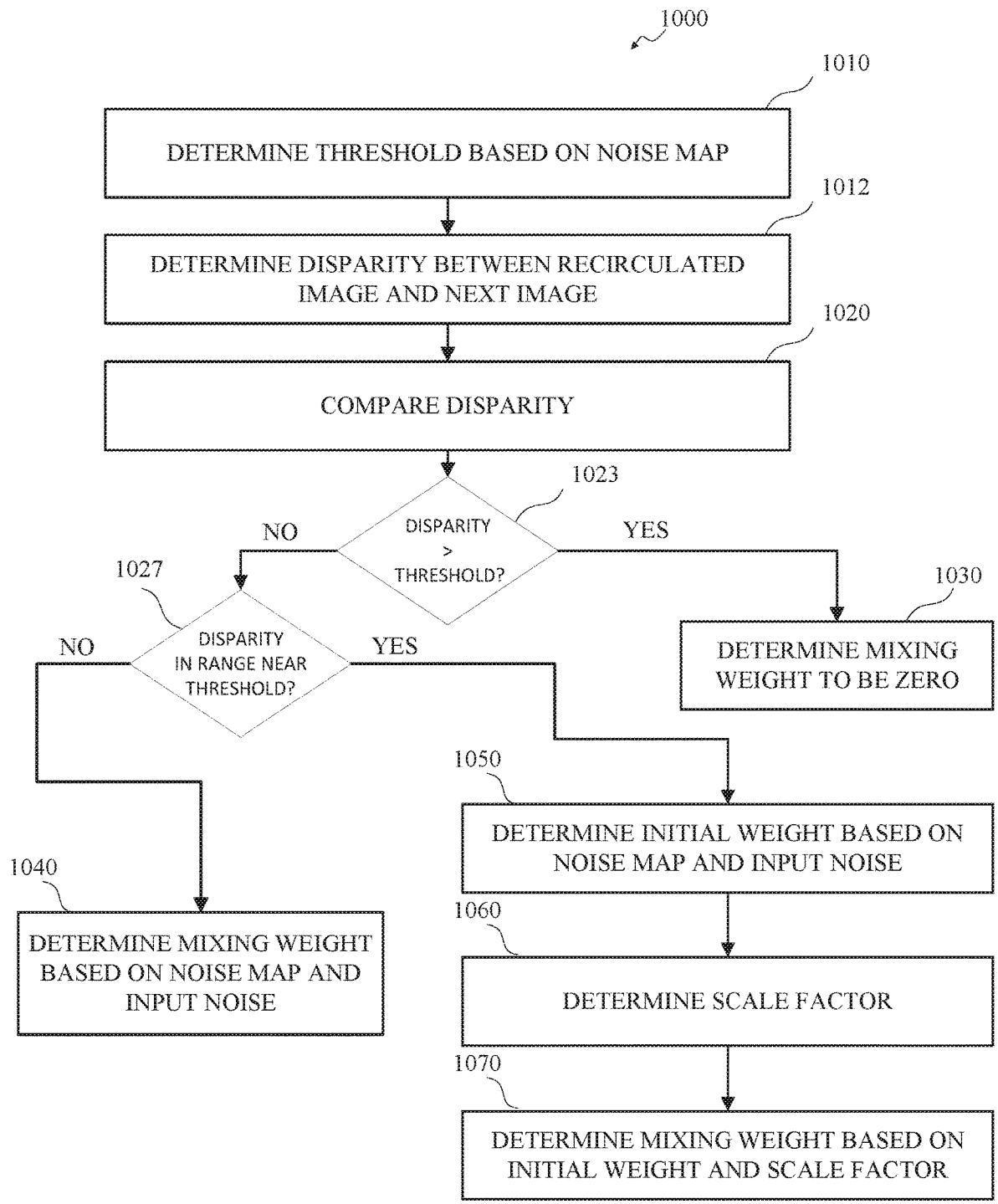
FIG. 10 is a flowchart of an example of a technique for determining mixing weights for temporal noise reduction.

FIG. 10 is a flowchart of an example of a technique 1000 for determining mixing weights for temporal noise reduction. The technique 1000 includes determining 1010 a threshold based on a noise map value for an image portion (e.g., a pixel or bloc of pixels) of a recirculated image; determining 1012 a disparity between the image portion of the recirculated image and a corresponding image portion of a current image; comparing 1020 the disparity to the threshold; and, if (at 1023) the disparity is larger than the threshold, determining 1030 a mixing weight for the image portion to be zero, or, if (at 1023 & 1027) the disparity is below the threshold and outside of a range near the threshold, determining 1040 the mixing weight based on the noise map, or, if (at 1023 & 1027) the disparity is within the range near the threshold, determining 1050 an initial mixing weight based on the noise map, determining 1060 a scale factor based on the disparity, and determining 1070 the mixing weight based on the initial mixing weight and the scale factor. For example, the technique 1000 may be implemented by the system 600 of FIG. 6A or the system 630 of FIG. 6B. For example, the technique 1000 may be implemented by an image capture device, such as the image capture device 610 shown in FIG. 6A, or an image capture apparatus, such as the image capture apparatus 110 shown in FIG. 1 or the image capture apparatus 300 of FIG. 3. For example, the technique 1000 may be implemented by a personal computing device, such as the personal computing device 660.

The technique 1000 includes determining 1010 a threshold for an image portion of the noise reduced image (e.g., a noise reduced frame) based on an estimate of noise level for the image portion of the noise reduced image from a noise map for the noise reduced image. For example, the threshold may be determined 1010 based on a sum of the estimate of noise level for the image portion of the noise reduced image and an estimate of noise level (e.g., a standard deviation or variance) for a corresponding image portion of the current image. For example, the threshold may be determined 1010 based on a maximum of the estimate of noise level for the image portion of the noise reduced image and an estimate of noise level (e.g., a standard deviation or variance) for a corresponding image portion of the current image.

The technique 1000 includes determining 1012 a disparity (e.g., a difference) between the image portion of the noise reduced image (e.g., a noise reduced frame of video) and a corresponding image portion of the current image (e.g., a current frame of video). For example, where the image portion is a pixel, the disparity may be determined 1012 as an absolute value of a difference between the value of the pixel in the recirculated image and the value of the corresponding pixel in the current image. For example, where the image portion is a block of pixels, the disparity may be determined 1012 as a maximum of the absolute values of differences between respective values of the pixels in the block of the recirculated image and the respective values of the corresponding pixels in the current image. For example, where the image portion is a block of pixels, the disparity may be determined 1012 as a sum of the absolute values of differences between respective values of the pixels in the block of the recirculated image and the respective values of the corresponding pixels in the current image.

The technique 1000 includes comparing 1020 the disparity to the threshold. If (at 1023) the disparity is greater than the threshold, then the mixing weight for the image portion of the recirculated image may be determined 1030 to be zero. For example, responsive to the disparity exceeding the threshold, a weight from the set of mixing weights corresponding to the image portion of the noise reduced image may be determined 1030 to be zero. Thus, in effect, this image portion of the recirculated image will be ignored or discarded when combining the recirculated image with the current image to obtain the noise reduced image. For example, the disparity exceeding a threshold based on the estimates of noise for the image portions may indicate that the scene has changed in a way that this image portion does not correspond to the same object in the two frames being combined. Combing the image portions when the viewed objects do not match can introduce errors and distortion. Selectively zeroing the mixing weight in this circumstance may improve image quality of the resulting noise reduced image.

If (at 1023 & 1027) the disparity is less than the threshold and outside of a range near the threshold (e.g., within 5% or 10% of the threshold), then the mixing weight for the image portion of the recirculated image may be determined 1040 based on the noise map for recirculated image. For example, the mixing weight for the image portion may be determined 1040 based on a ratio of an estimate of noise level from the noise map for the image portion of the recirculated image to an estimate of noise level (e.g., from a noise map) for a corresponding image portion of the current image. For example, the mixing weight for the image portion may be determined 1040 as inversely proportional to an estimate of noise level from the noise map for the image portion of the recirculated image.

If (at 1023 & 1027) the disparity is less than the threshold and within of a range near the threshold (e.g., within 5% or 10% of the threshold), then an initial weight may be determined 1050 based on the estimate of noise level (e.g., from the noise map) for the image portion of the recirculated image (e.g., a noise reduced frame of video) and an estimate of noise level for the corresponding image portion of the current image (e.g., a current frame of video). For example, the initial weight may be determined in the same manner as a weight is determined 1040 when the disparity is outside of the range. A scale factor is determined 1060 based on a difference between the disparity and the threshold. For example, one end of the range near the threshold may be the threshold, and the scale factor may be determined 1060 to vary linearly (e.g., taking values between zero and one) between endpoints of the range. The mixing weight for the image portion of the recirculated image may then be determined 1070 based on the initial weight and the scale factor. For example, responsive to the disparity being in a range near the threshold (e.g., within 5% or 10% of the threshold), a weight from the set of mixing weights corresponding to the image portion of the recirculated image (e.g., a noise reduced frame for video) may be determined 1070 to be the initial weight multiplied by a scale factor between zero and one.

Figure 11:
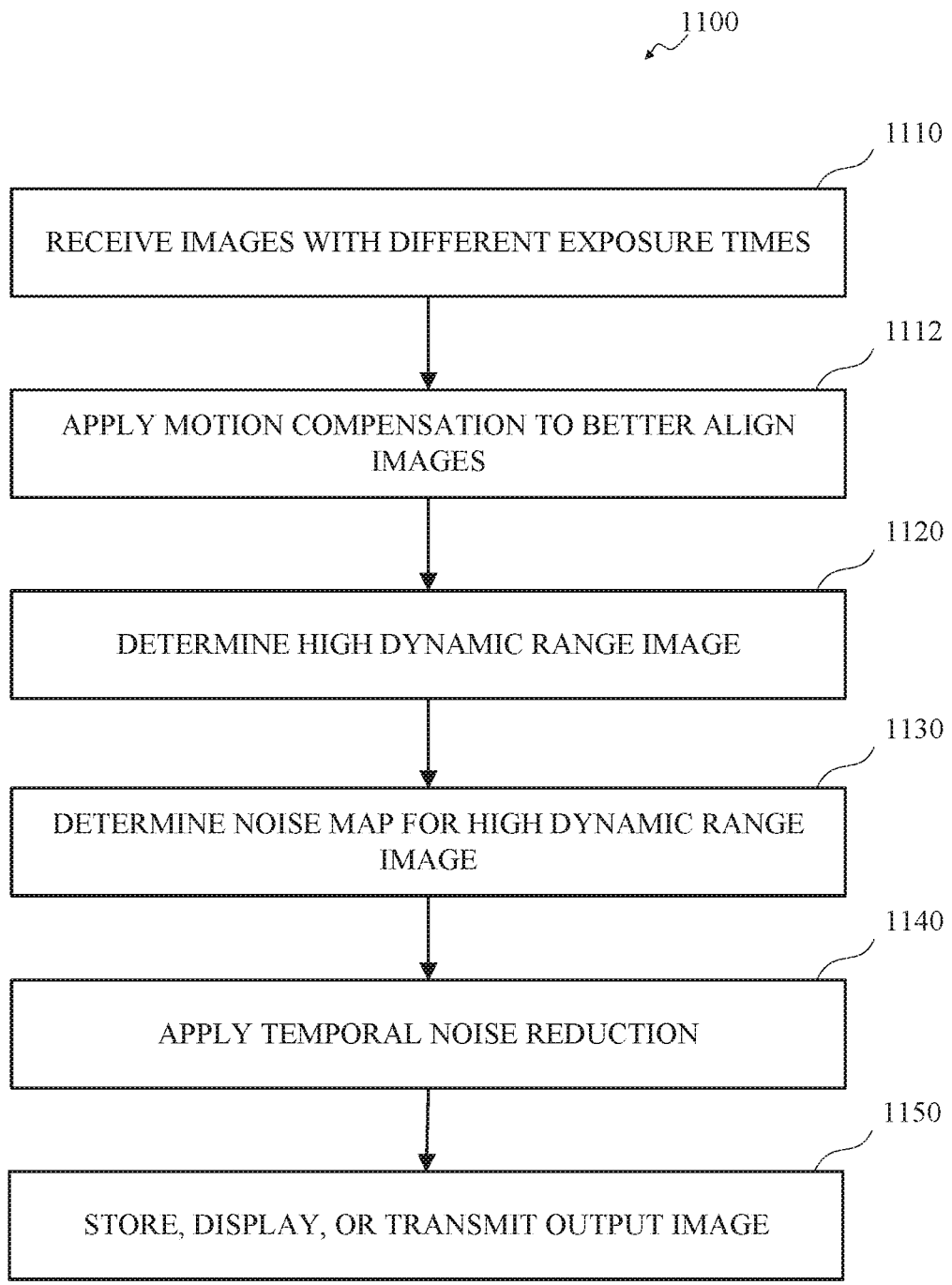
FIG. 11 is a flowchart of an example of a technique for applying temporal noise reduction to high dynamic range images.

FIG. 11 is a flowchart of an example of a technique 1100 for applying temporal noise reduction to high dynamic range images. The technique 1100 includes receiving 1110 images captured using different exposure times; applying 1112 motion compensation to better align corresponding pixels of the images; determining 1120 a high dynamic range image based on the images captured with different exposure times; determining 1130 a noise map for the high dynamic range image; applying 1140 temporal noise reduction processing to the high dynamic range image based on the noise map; and store, display, or transmit an output image that is based on the high dynamic range image. For example, the technique 1100 may be implemented by the system 600 of FIG. 6A or the system 630 of FIG. 6B. For example, the technique 1100 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 1100 may be implemented by a personal computing device, such as the personal computing device 660. For example, the technique 1100 may be implemented using a processing apparatus (e.g., the processing apparatus 612) that includes an image signal processor (e.g., the image signal processor 500) that is configured to perform image processing operations on the high dynamic range image.

The technique 1100 includes receiving 1110 a two or more images (e.g., frames of video) captured using different exposure times. For example, a first image and a second image may be received 1110 from an image sensor, where the first image is captured with a first exposure time and the second image is captured with a second exposure time that is less than the first exposure time. The image sensor may be part of an image capture apparatus (e.g., the image capture apparatus 110, the image capture apparatus 300, the image capture device 610, or the image capture device 640). For example, the two or more images may be received 1110 from the image sensor via a bus (e.g., the bus 624 or image signal processor bus 590). In some implementations, the two or more images may be received 1110 via a communications link (e.g., the communications link 650). For example, the two or more images may be received 1110 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the two or more images may be received 1110 via communications interface 666. For example, the two or more images may be received 1110 via a front ISP (e.g., the front ISP 812) that performs some initial processing on the received images. For example, the two or more images may represent each pixel value in a defined format, such as in a RAW image signal format. For example, the two or more images be stored in a format using the Bayer color mosaic pattern. In some implementations, the two or more images may be frames of video.

The technique 1100 includes applying 1112 motion compensation to better align corresponding pixels of the images. For example, one of the two or more images may be used as a target image and motion compensation processing may be applied 1112 to the other images to better align pixels of the other images with corresponding pixels of the target image. In some implementations, one of the images captured with the longest exposure time may be used as the target image. In some implementations, one of the images captured with the shortest exposure time may be used as the target image. For example, the technique 1350 of FIG. 13B may be implemented to apply 1112 motion compensation to one of the two or more images. For example, the techniques described in relation to FIGS. 14-20 may be implemented to apply 1112 motion compensation to one of the two or more images. For example, the motion compensation module 730 of FIG. 7 may be used to apply 1112 motion compensation to better align corresponding pixels of the images. For example, the motion compensation module 830 of FIG. 8 may be used to apply 1112 motion compensation to better align corresponding pixels of the images.

The technique 1100 includes determining 1120 a high dynamic range image based on the two or more images captured with different exposure times. For example, image portions (e.g., pixels or blocks of pixels) of the high dynamic range image may be determined 1120 by selecting respective image portions from among the two or more images with the longest exposure time that do not exhibit pixel value saturation. For example, a high dynamic range image may be determined 1120 based on the first image (e.g., with a long exposure time) in a raw format and the second image (e.g., with a short exposure time) in a raw format, in which an image portion of the high dynamic range image is based on a corresponding image portion of the second image when a pixel of a corresponding image portion of the first image is saturated. For example, determining 1120 the high dynamic range image may include determining a blending ratio map that specifies how image portions of the two or more images will be combined to determine 1120 the high dynamic range image. In some implementations, a blending ratio map may be binary (e.g., specifying for an image portion that either the short exposure image portion will be used or a long exposure image portion will be used). In some implementations, spatial low-pass filtering may be applied to an initial blending ratio map to obtain a smoothed blending ration map. For example, the technique 1200 of FIG. 12A may be implemented to determine 1120 the high dynamic range image. In some implementations, image portions from more than one of the two or more images are blended together to determine 1120 a respective image portion of the high dynamic range image when a pixel value of the image portion is in a range near a saturation level. For example, the technique 1250 of FIG. 12B may be implemented to determine blending ratios for respective image portions of the high dynamic range image, and the blending ratios may be used to determine 1120 the high dynamic range image based on the two or more images captured with different exposure times.

The technique 1100 includes determining 1130 a noise map for the high dynamic range image. Because noise levels can vary with exposure time, the two or more images may be associated with different estimates of noise level for corresponding image portions (e.g., pixels or blocks of pixels). The noise map may include estimates of noise level for respective image portions of the high dynamic range image. The value of the noise map for a particular image portion may depend on which of the two or more images were selected as source for that image portion. For example, a noise map for the high dynamic range image may be determined 1130 based on noise level estimates for pixels of the first image (e.g., a long exposure image), noise level estimates for pixels of the second image (e.g., a short exposure image), and a blending ratio map that specifies how image components of the first image and the second image are combined to form the high dynamic range image. In some implementations, the blending ratio map may be binary, specifying whether an image portion from a long exposure image or an image portion from a short exposure image is used to determine 1120 the respective image portion of the high dynamic range image, and determining 1130 the noise map may include selecting amongst estimates of noise level for the long exposure image and the short exposure image for image portions based on the respective values of the blending ratio map. In some implementations, the blending ratio map may take on non-integer values, specifying blending image portions from a long exposure image and a short exposure image to determine 1120 a respective image component of the high dynamic range image, and determining 1130 the noise map may include calculating an estimate of noise level for an image portion based on the respective blending ratio and the corresponding estimates of noise level for the long exposure image and the short exposure image. For example, an estimate of noise level in the noise map for an image portion of the high dynamic range image may be determined as:

$$SHDR\_n = \text{sqrt}(b\_n^2 * SS\_n^2 + (1-b\_n)^2 * SL\_n^2) \quad \text{[Equation 5]}$$

where SHDR_n is an estimate of noise level (e.g., a standard deviation) for an nth image portion of the high dynamic range image, b_n is a blending ratio for an nth image portion of the high dynamic range image, SS_n is an estimate of noise level (e.g., a standard deviation) for the nth image portion of a short exposure image, and SL_n is an estimate of noise level (e.g., a standard deviation) for the nth image portion of a long exposure image.

The technique 1100 includes applying 1140 temporal noise reduction processing to the high dynamic range image based on the noise map. For example, the technique 900 of FIG. 9 may be implemented to apply 1140 temporal noise reduction processing to the high dynamic range image using the noise map as an input noise map for the high dynamic range image.

The technique 1100 includes storing, displaying, or transmitting 1150 an output image (e.g., an output frame of video) that is based on the high dynamic range image (e.g., a high dynamic range frame of video). For example, the output image may be transmitted 1150 to an external device (e.g., a personal computing device) for display or storage. For example, the output image may be the same as the high dynamic range image. For example, the output image may be a composite image determined by stitching an image based on the high dynamic range image to one or more images from other image sensors with overlapping fields of view. For example, the output image may be compressed using an encoder (e.g., an MPEG encoder). For example, the output image may be transmitted 1150 via the communications interface 618. For example, the output image may be displayed in the user interface 620 or in the user interface 664. For example, the output image may be stored in memory of the processing apparatus 612 or in memory of the processing apparatus 662.

Figure 12A:
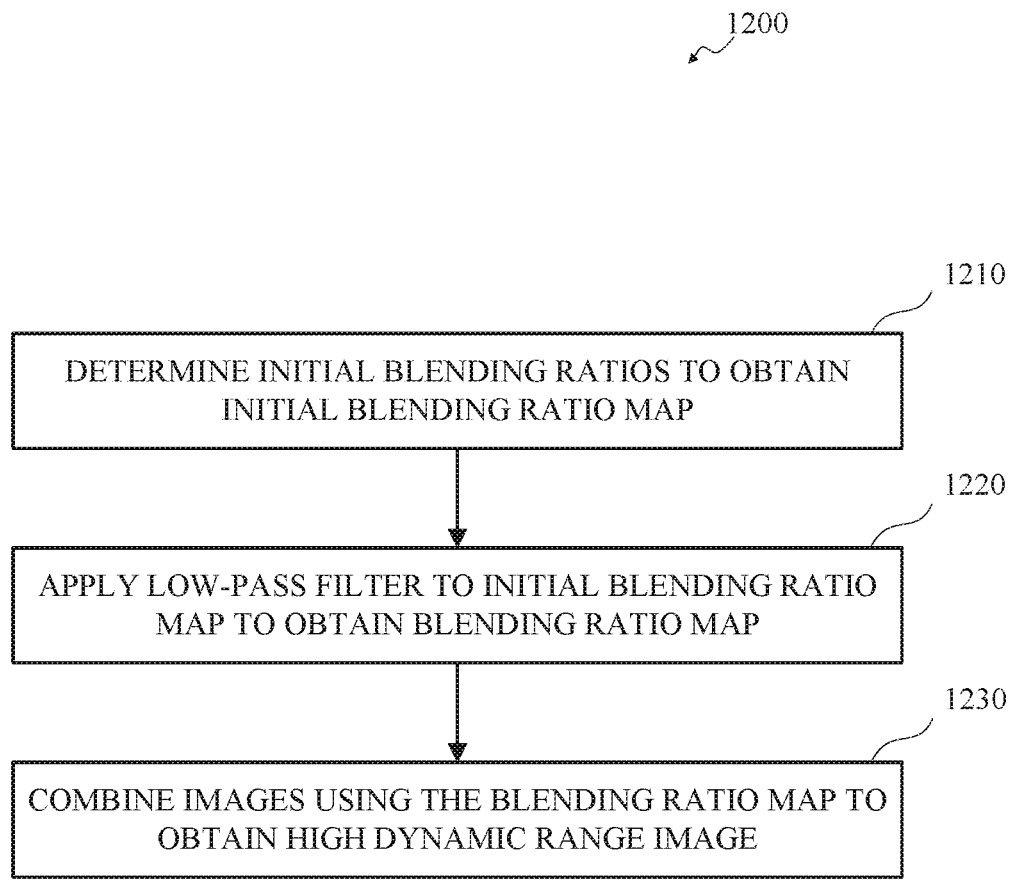
FIG. 12A is a flowchart of an example of a technique for determining a high dynamic range image based on images captured with different exposure times.

FIG. 12A is a flowchart of an example of a technique 1200 for determining a high dynamic range image based on images captured with different exposure times. The technique 1200 includes determining 1210 initial blending ratios for respective image portions of the high dynamic range image to obtain an initial blending ratio map; applying 1220 a low-pass spatial filter to the initial blending ratio map to obtain a blending ratio map; and combining 1230 the first image and the second image using the blending ratio map to obtain the high dynamic range image. For example, the technique 1200 may be implemented by the system 600 of FIG. 6A or the system 630 of FIG. 6B. For example, the technique 1200 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 1200 may be implemented by a personal computing device, such as the personal computing device 660. For example, the technique 1200 may be implemented using a processing apparatus (e.g., the processing apparatus 612) that includes an image signal processor (e.g., the image signal processor 500) that is configured to perform image processing operations on the high dynamic range image.

The technique 1200 includes determining 1210 initial blending ratios for respective image portions of the high dynamic range image (e.g., a current image to be input to a temporal noise reduction module) to obtain an initial blending ratio map. In some implementations, the initial blending ratios are binary, specifying from which of two constituent images from the two or more images (e.g., a long exposure image and a short exposure image) the respective image portion (e.g., pixel or block of pixels) will be drawn. For example, blending ratios for image portions may be set to one (specifying that the short exposure image will be used for a respective image portion) if the corresponding image portion of a long exposure image has a saturated value and set to zero (specifying that the long exposure image will be used for a respective image portion) otherwise. In some implementations, the two or more images include N images with N>2, where each of the N images is captured with a different exposure time. For example, the initial blending ratios may be dimension N vectors of binary variables having a single one (indicating one of the N images for the respective image portion) and the rest of the variables set to zero (indicating the other N-1 images are unused for the respective image portion). For an image portion, one of the N corresponding image portions with the longest exposure time that does not include a pixel with a saturated pixel value may be selected and have its respective element in the initial blending ratio vector set to one. Equivalently, the initial blending ratios may be dimension N-1 vectors of binary variables, and an Nth binary value for the blend of the Nth image (e.g., the image captured with the longest exposure time) may be implicitly specified as the compliment of the N-1 variables in the vector blending ratio.

In some implementations, the initial blending ratios may be allowed to take on values between zero and one and specify blending of two or more image portions from different images captured with different exposure times to obtain a respective image portion of the high dynamic range image. For example, the technique 1250 of FIG. 12B may be implemented to determine 1210 an initial blending ratio for a respective image portion (e.g., a pixel or block of pixels) of the high dynamic range image. For example, where N images captured with N different exposure times are used to obtain the high dynamic range image, the initial blending ratios may be vectors of dimension N or, equivalently, the initial blending ratios may be vectors of dimension N-1 and an Nth value for the blend of the Nth image (e.g., the image captured with the longest exposure time) may be implicitly specified as the compliment of the N-1 variables in the vector blending ratio.

The technique 1200 includes applying 1220 a low-pass spatial filter to the initial blending ratio map to obtain a blending ratio map. For example, the low-pass spatial filter may be specified to calculate an average blending ratios over a block (e.g., a 9×9 block) from the initial blending ratio map. For example, the low-pass filter may be specified based on a radial basis function (e.g., a guassian function, an inverse quadratic function, or a polyharmonic spline function). In some implementations, an initial blending ratio map that includes blending ratios that are binary or vectors of binary variables may be mapped to integer values (e.g., zero or one) when the low-pass spatial filter is applied 1220 and the blending ratios of the obtained blending ration map may be allowed to take values between zero and one to specify blending of more than one image portion from different images captured with different exposure times to determine a respective image portion of the high dynamic range image.

The technique 1200 includes combining 1230 constituent images captured with different exposure times using the blending ratio map to obtain the high dynamic range image (e.g., a current image to be input to a temporal noise reduction module). For example, the technique 1200 may include combining 1230 the first image (e.g., a long exposure image) and the second image (e.g., a short exposure image) using the blending ratio map to obtain the high dynamic range image. For example, the first image and the second image may be combined 1230 using the blending ratio map according to:

$$HDR\_n = b\_n * S\_n + (1-b\_n) * L\_n \qquad \text{[Equation 6]}$$

where HDR_n is an nth image portion of the high dynamic range image, b_n is a blending ratio for an nth image portion of a short exposure image captured with a short exposure time, S_n is the nth image portion of the short exposure image, and L_n is the nth image portion of a long exposure image captured with a long exposure time. For example, combining 1230 constituent images may include scaling (e.g., multiplying by a scale factor proportional to a respective exposure time for a constituent image) pixel values captured with different exposure times to occupy a common wider dynamic range for the high dynamic range image.

In some implementations, an input noise map may be determined 1130 based on the blending ratio map. For example, the input noise map may be determined 1130 using the Equation 5 above.

Figure 12B:
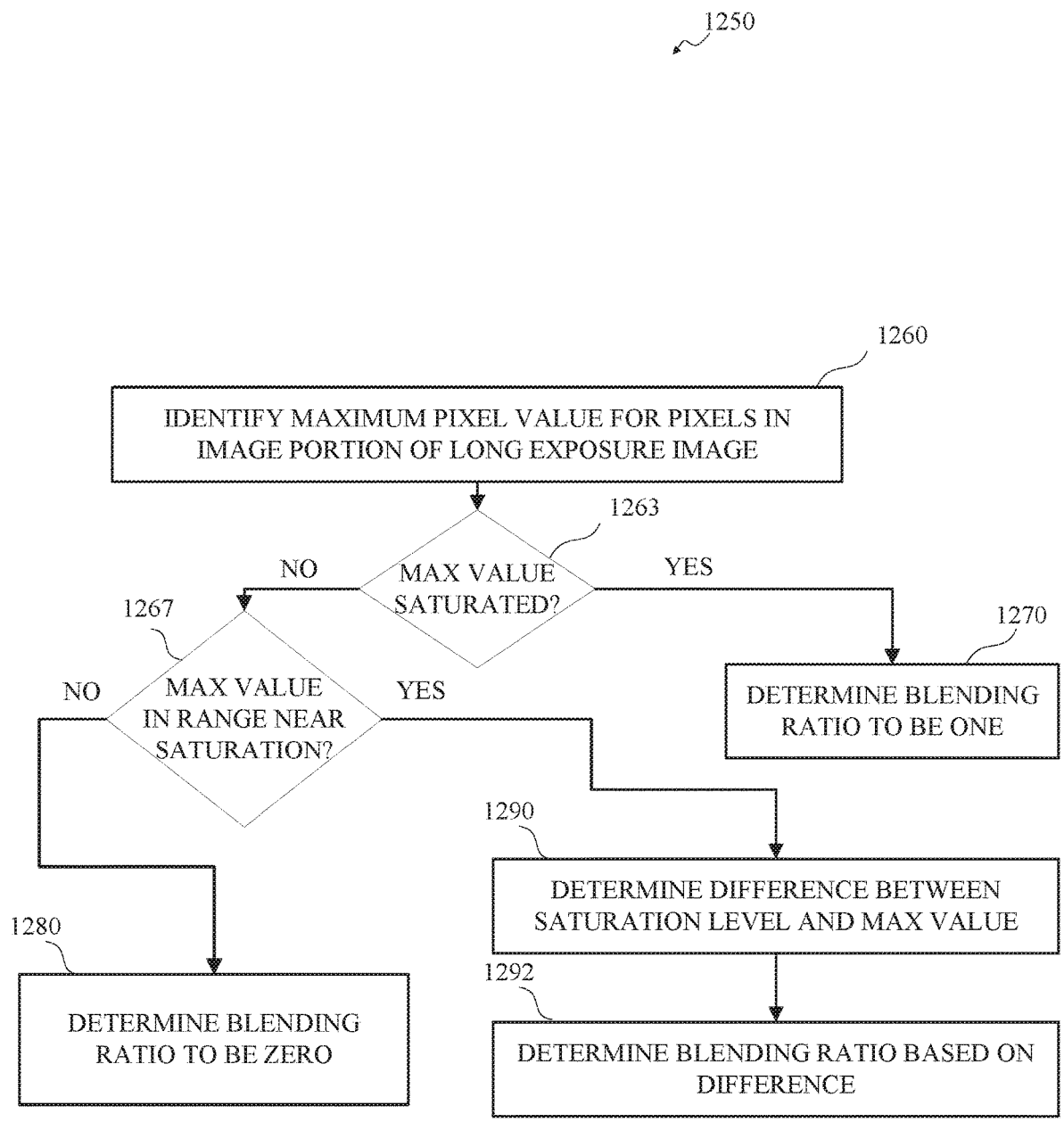
FIG. 12B is a flowchart of an example of a technique for determining a blending ratio for an image portion of a high dynamic range image.

FIG. 12B is a flowchart of an example of a technique 1250 for determining a blending ratio for an image portion of a high dynamic range image. The technique 1250 includes identifying 1260 a maximum pixel value for pixels in an image portion (e.g., a Bayer block of four pixels (one red, two green, one blue)) of a long exposure image, which was captured using a long exposure time; if (at 1263) the maximum pixel value is saturated, determining 1270 the blending ratio to be one (specifying that a corresponding image portion from a short exposure image will be used to determine the respective image component of the high dynamic range image); if (at 1263 & 1267) the maximum pixel value is not saturated and is outside of a range near a saturation level, determining 1280 the blending ratio to be zero (specifying that a corresponding image portion from the long exposure image will be used to determine the respective image component of the high dynamic range image); and, if (at 1263 & 1267) the maximum pixel value is not saturated and is within a range near the saturation level, determining 1290 a difference between the saturation level and the maximum pixel value and determining 1292 the blending ratio based on the difference. For example, the technique 1250 may be implemented by the system 600 of FIG. 6A or the system 630 of FIG. 6B. For example, the technique 1250 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 1250 may be implemented by a personal computing device, such as the personal computing device 660. For example, the technique 1250 may be implemented using a processing apparatus (e.g., the processing apparatus 612) that includes an image signal processor (e.g., the image signal processor 500) that is configured to perform image processing operations on the high dynamic range image.

The technique 1250 includes, responsive to a value of a pixel of an image component of the first image being in a range near a saturation level, determining 1292 a blending ratio based on the difference between the saturation level and the value of the pixel. For example, one end of the range near the saturation level may be the saturation level, and the blending ratio may be determined 1292 to vary (e.g., linearly) based on the difference (e.g., taking values between zero and one) between endpoints of the range. In some implementations, a corresponding image component of the high dynamic range image may be determined 1120 based on a weighted sum, using the blending ratio as a weight, of the image component of the first image and a corresponding image component of the second image.

Figure 13A:
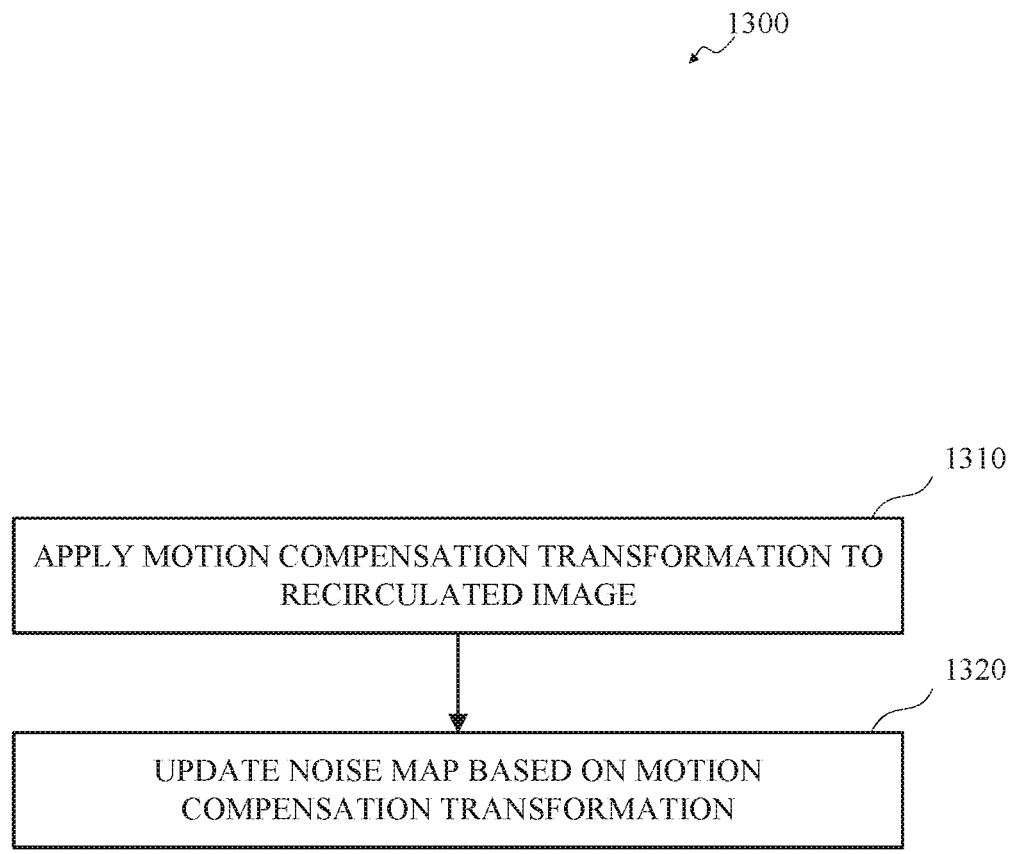
FIG. 13A is a flowchart of an example of a technique for recirculating a noise map with a noise reduced image.

FIG. 13A is a flowchart of an example of a technique 1300 for recirculating a noise map with a noise reduced image. The technique 1300 includes applying 1310 a motion compensation transformation to the recirculated image; and updating 1320 the noise map based on the motion compensation transformation. For example, the technique 1300 may be implemented by the system 600 of FIG. 6A or the system 630 of FIG. 6B. For example, the technique 1300 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 1300 may be implemented by a personal computing device, such as the personal computing device 660. For example, the technique 1300 may be implemented using a processing apparatus (e.g., the processing apparatus 612) that includes an image signal processor (e.g., the image signal processor 500).

The technique 1300 includes applying 1310 a motion compensation transformation to the recirculated image (e.g., a noise reduced frame). The motion compensation transformation may include a local motion transformation (e.g., as described in relation to the local motion compensation module 732) and/or a global motion transformation (e.g., as described in relation to the global motion compensation module 734). For example, the technique 1350 of FIG. 13B may be implemented to select a motion compensation transformation that is applied 1310 to the recirculated image. In some implementations, the technique 1370 of FIG. 13C may be implemented to obtain local motion information that may be used for applying 1310 the motion compensation transformation to the recirculated image. For example, the motion compensation module 730 of FIG. 7 may be used to apply 1310 the motion compensation transformation to the recirculated image. For example, the motion compensation module 830 of FIG. 8 may be used to apply 1310 the motion compensation transformation to the recirculated image.

The technique 1300 includes updating 1320 the noise map based on the motion compensation transformation. For example, the noise map for the recirculated image may be updated 1320 by applying the motion compensation transformation to the noise map. For example, estimates of noise level in the noise map corresponding to respective image portions (e.g., pixels or blocks of pixels) of the recirculated image (e.g., a noise reduced frame) may be translated within the noise map in the same way that the corresponding image portions are translated within the recirculated image when the motion compensation transformation is applied 1310, such that a correspondence between estimates of noise level in the noise map and pixel values in the recirculated image (e.g., a noise reduced frame) may be preserved.

Figure 13B:
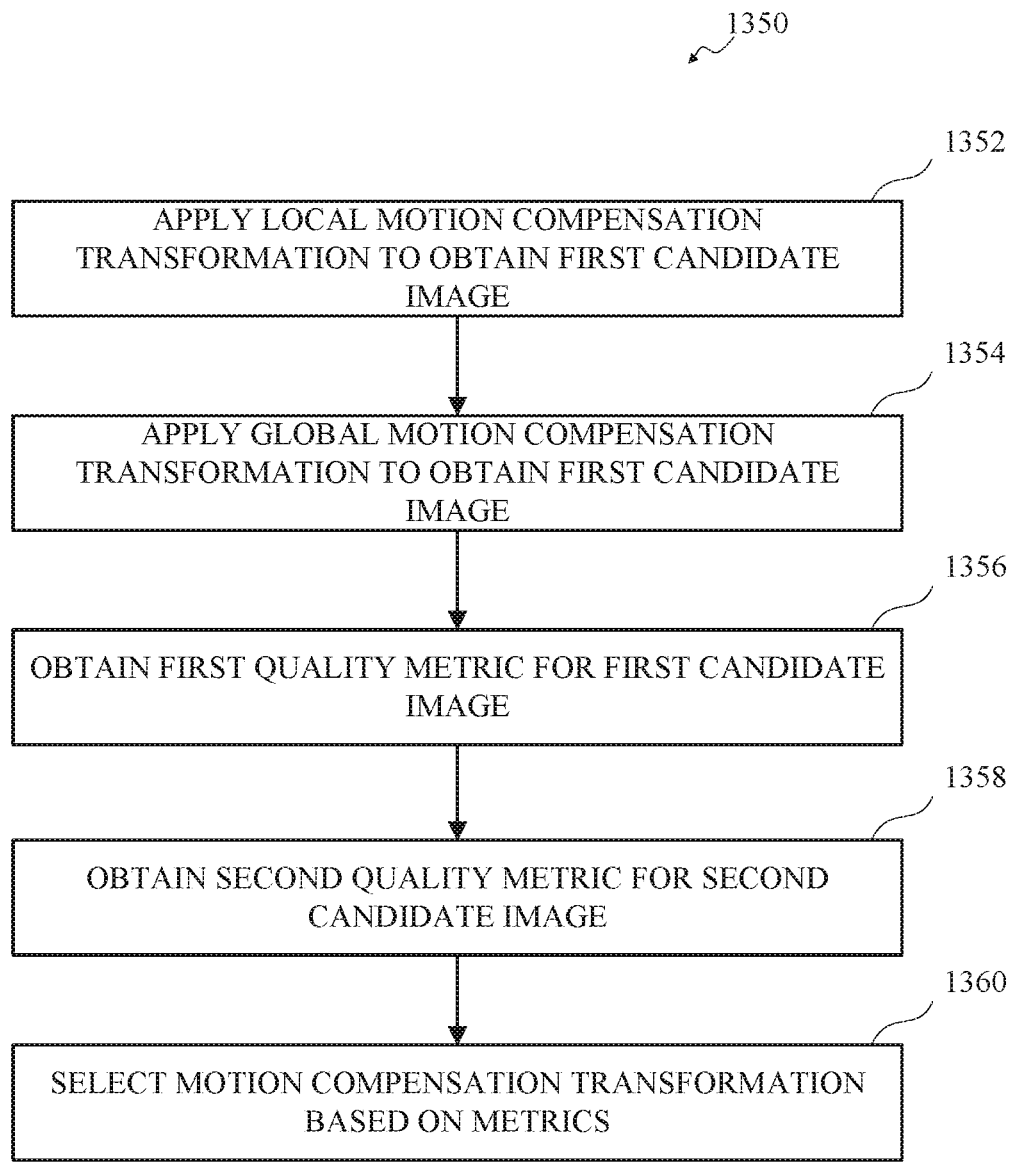
FIG. 13B is a flowchart of an example of a technique for applying motion compensation to a recirculated image.

FIG. 13B is a flowchart of an example of a technique 1350 for applying motion compensation to a recirculated image. The technique 1350 includes applying 1352 a local motion compensation transformation to the reference image to obtain a first candidate image; applying 1354 a global motion compensation transformation to the reference image to obtain a second candidate frame; obtaining 1356 a first quality metric based on the first candidate image and the target image; obtaining 1358 a second quality metric based on the second candidate image and the target image; and based on the first quality metric and the second quality metric, selecting 1360 the motion compensation transformation from among the local motion compensation transformation and the global motion compensation transformation. For example, the technique 1350 may be implemented by the system 600 of FIG. 6A or the system 630 of FIG. 6B. For example, the technique 1350 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 1350 may be implemented by a personal computing device, such as the personal computing device 660. For example, the technique 1350 may be implemented using a processing apparatus (e.g., the processing apparatus 612) that includes an image signal processor (e.g., the image signal processor 500).

The technique 1350 includes applying 1352 a local motion compensation transformation to the reference image (e.g., a recirculated, noise reduced frame) to obtain a first candidate image (e.g., a first candidate frame). The local motion compensation transformation may be determined based on local motion information (e.g., a set of motion vectors) from a local motion estimation module (e.g., the local motion estimation unit 520). For example, the technique 1370 of FIG. 13C may be implemented to obtain local motion information that may be used for applying 1352 the local motion compensation transformation to the reference image. For example, the local motion compensation transformation may be applied 1352 by the local motion compensation unit 522. For example the local motion compensation transformation may be applied 1352 by the local motion compensation module 732.

The technique 1350 includes applying 1354 a global motion compensation transformation to the reference image (e.g., a recirculated, noise reduced frame) to obtain a second candidate image (e.g., second candidate frame). For example, the global motion compensation transformation may be determined based on angular rate measurements (e.g., from a gyroscope) for an image capture apparatus used to capture a sequence of images being processed (e.g., a video). The angular rate measurements may be used to estimate a change in the orientation of the image capture apparatus between a time associated with the reference image and a time associated with a target image. For example, the global motion compensation transformation may affect a rotation of the scene that is determined based on angular rate measurements. For example, the global motion compensation transformation may be applied 1354 by the global motion compensation unit 524. For example the global motion compensation transformation may be applied 1354 by the global motion compensation module 734.

The technique 1350 includes obtaining 1356 a first quality metric based on the first candidate image (e.g., a first candidate frame of video) and the target image (e.g., next frame to be input to a temporal noise reduction unit). For example, the first quality metric may be a mean square pixel value of a difference between the target image and the first candidate image. For example, the first quality metric may be a perceptually weighted (e.g., using a pixel value mapping that models human perception) mean square error between target image and the first candidate image. In some implementations, the first quality metric may be based on a hit rate for image portions (e.g., pixels or blocks of pixels) of the first candidate image to be used by a temporal noise reduction module (e.g., the temporal noise reduction module 722). For example, the first metric may be based on a sum of mixing weights the image portions of the first candidate image that are to be used to combine the first candidate image with the target image (e.g., a current image being processed by a temporal noise reduction module).

The technique 1350 includes obtaining 1358 a second quality metric based on the second candidate image (e.g., a second candidate frame of video) and the target image (e.g., a next frame to be input to a temporal noise reduction unit). For example, the second quality metric may be a mean square pixel value of a difference between the target image and the second candidate image. For example, the second quality metric may be a perceptually weighted (e.g., using a pixel value mapping that models human perception) mean square error between target image and the second candidate image. In some implementations, the second quality metric may be based on a hit rate for image portions (e.g., pixels or blocks of pixels) of the second candidate image to be used by a temporal noise reduction module (e.g., the temporal noise reduction module 722). For example, the second metric may be based on a sum of mixing weights the image portions of the second candidate image that are to be used to combine the second candidate image with the target image (e.g., a current image being processed by a temporal noise reduction module).

The technique 1350 includes, based on the first quality metric and the second quality metric, selecting 1360 the motion compensation transformation from among the local motion compensation transformation and the global motion compensation transformation. The motion transformation corresponding to the best quality metric (e.g., the lowest mean square error metric or the highest sum of mixing weights) may be selected 1360. For example, a noise map for the reference image may be updated 1320 based on the selected 1360 motion compensation transformation.

In some implementations (not shown in FIG. 13B), a third quality metric is obtained based on the reference image (e.g., a recirculated, noise reduced frame) and the target image (e.g., a next frame to be input to a temporal noise reduction unit). This third quality metric may be associated with an identity transformation, i.e., passing reference image through unchanged. This modified technique may include; based on the first quality metric, the second quality metric, and the third quality metric; selecting the motion compensation transformation from among the local motion compensation transformation, the global motion compensation transformation, and an identity transformation.

Figure 13C:
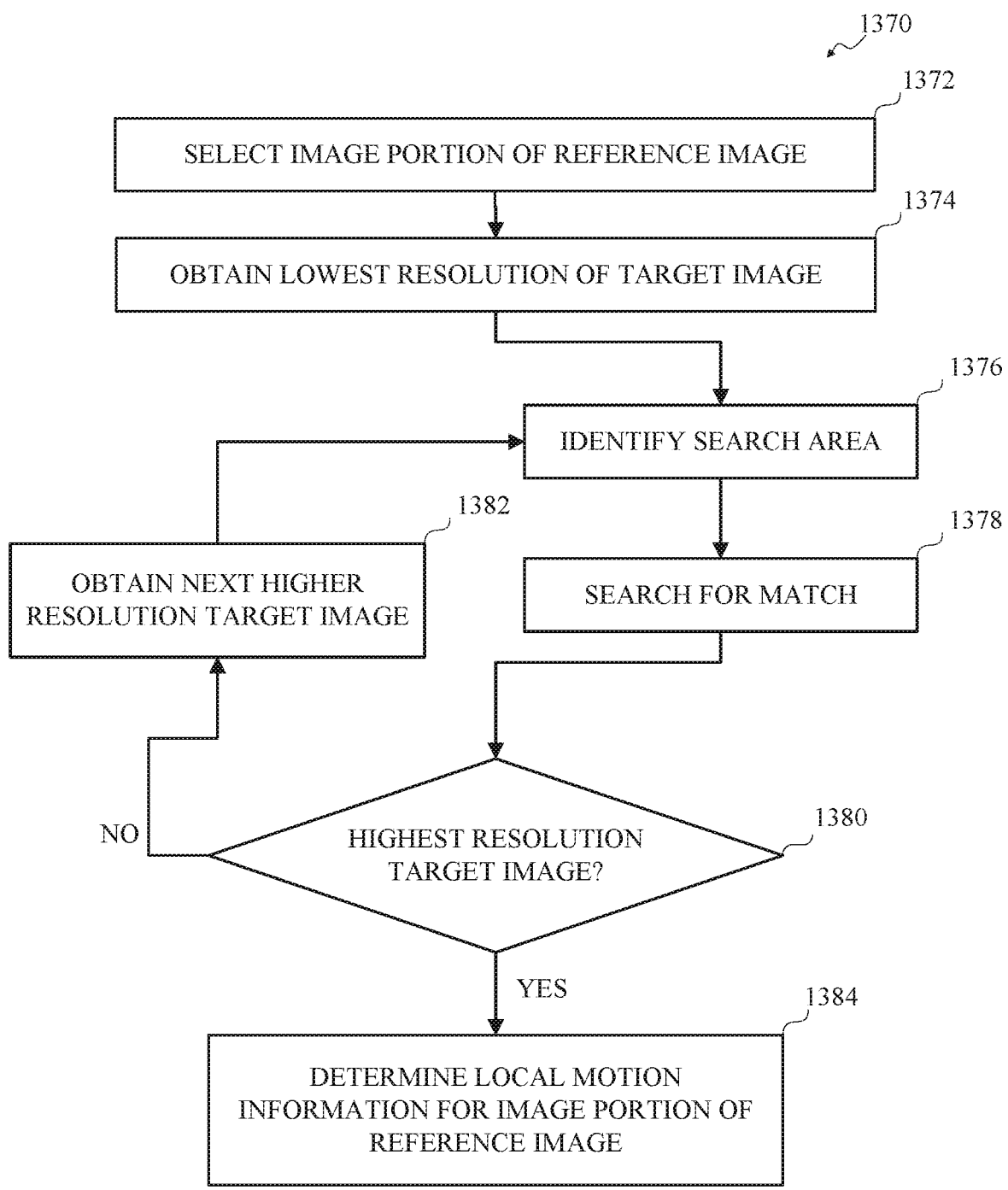
FIG. 13C is a flowchart of an example of a technique for obtaining local motion information for a reference image and a target image.

FIG. 13C is a flowchart of an example of a technique 1370 for obtaining local motion information for a reference image and a target image. The technique 1370 includes selecting 1372 an image portion of a reference frame; obtaining 1374 a lowest resolution copy of the target image; identifying 1376 a search area in target image at the obtained resolution; searching 1378 for a match for the selected image portion within the identified search area; checking 1380 whether a highest resolution copy of the target image has been searched; if not, obtaining 1382 the next higher resolution copy of target image for performing a refined search by identifying 1376 a search in the higher resolution image near an area corresponding to a match found at the previous lower resolution and searching 1378 within the refined search area; and, if the highest resolution copy of the target image has been searched, then determining 1384 local motion information for the image portion of the reference image based a match found in the highest resolution copy of the target image. For example, the technique 1370 may be used to iteratively apply a multi-scale block matching approach to determine local motion information for a reference image (e.g., a recirculated image from a three-dimensional noise reduction module, a short exposure image, or a long exposure image and a target image (e.g., a current image to be input to a temporal noise reduction module, a long exposure image, or a short exposure image). In some implementations, the technique 1370 may repeated for multiple image portions of the reference image to generate a set of motion vectors for the reference image that can be returned as local motion information. For example, the technique 1370 may be implemented by the system 600 of FIG. 6A or the system 630 of FIG. 6B. For example, the technique 1370 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the technique 1370 may be implemented by a personal computing device, such as the personal computing device 660. For example, the technique 1370 may be implemented using a processing apparatus (e.g., the processing apparatus 612) that includes an image signal processor (e.g., the image signal processor 500).

The technique 1370 includes identifying 1376 a search area in target image at the obtained resolution. For example, the search area may be block within the target image at the obtained resolution that includes an image portion at a location corresponding to the selected 1372 image portion of the reference image and additional image portions in the vicinity of (e.g., within a radius from) the image portion at the corresponding location. For example, where the obtained image is at the lowest available resolution, the search area may include the entire target image at the lowest resolution. For example, where the obtained image is at higher resolution than a downscaled image previously searched 1378, the search area may be identified 1376 based on the location of the matching portion found at the lower resolution. For example, the new search area may be identified 1376 to include image portions at a higher resolution within the matching portion found at the lower resolution. In some implementations, a next search area may be identified 1376 as extending slightly beyond (e.g., one image portion at the higher resolution beyond) the boundaries of the matching portion found at the lower resolution. In this manner a search area for a matching block at the full resolution may be iteratively narrowed as the resolution of the target image copies searched is increased.

FIG. 14 is a diagram of an example of a target image 1400 and an example of a corresponding one-half resolution downscaled image 1410. The target image 1400 may be an input image, such as an input image received by an image signal processor, such as the image signal processor 410 shown in FIG. 4 or the image signal processor 500 shown in FIG. 5, from an image sensor, such as the image sensor 230 shown in FIG. 2, or from a front image signal processor, such as the front image signal processors 510 shown in FIG. 5. Receiving the input image may include reading the input image, or a portion thereof, from a memory, such as the electronic storage unit 224.

The target image 1400 is represented as a 64×64 matrix of image portions (e.g., pixels or blocks of pixels). For simplicity and clarity, eight rows and eight columns of the 64×64 matrix representing the target image 1400 are shown in FIG. 14. The fourth column from the left and the fifth column from the left represent the fifty-six omitted rows and the fourth row from the top and the fifth row from the top represent the fifty-six omitted columns. Each location in the 64×64 matrix representing the target image 1400 corresponds with a respective spatial portion of the target image 1400. For example, each location in the 64×64 matrix representing the target image 1400 may represent a pixel in the target image 1400.

The one-half resolution downscaled image 1410 may be an input image, such as an input image received by an image signal processor, such as the image signal processor 410 shown in FIG. 4 or the image signal processor 500 shown in FIG. 5, from an image sensor, such as the image sensor 230 shown in FIG. 2, or from a front image signal processor, such as the front image signal processors 510 shown in FIG. 5. Receiving the input image may include reading the input image, or a portion thereof, from a memory, such as the electronic storage unit 224. The one-half resolution downscaled image 1410 may be an image generated based on the target image 1400 by downscaling, or sub-sampling, the target image 1400. For example, the one-half resolution downscaled image 1410 may be a ½×½ resolution frame corresponding to the target image.

In some implementations, the target image 1400 and the one-half resolution downscaled image 1410 may be may be obtained, such as generated, created, read, or otherwise accessed concurrently, or substantially concurrently. For example, a front image signal processor may concurrently, or substantially concurrently, output the target image 1400 and the one-half resolution downscaled image 1410.

The one-half resolution downscaled image 1410 is represented as a 32×32 matrix of image portions (e.g., pixels or blocks of pixels). For simplicity and clarity, seven rows and seven columns of the 32×32 matrix representing the one-half resolution downscaled image 1410 are shown in FIG. 14. The fourth column from the left represents the twenty-five omitted rows and the fourth row from the top represents the twenty-five omitted columns. Each location in the 32×32 matrix representing the one-half resolution downscaled image 1410 corresponds with a respective spatial portion of the one-half resolution downscaled image 1410. For example, each location in the 32×32 matrix representing the one-half resolution downscaled image 1410 may represent a pixel in the one-half resolution downscaled image 1410.

The size of the 32×32 matrix representing the one-half resolution downscaled image 1410 is equivalent to size of the 64×64 matrix representing the target image 1400 to indicate that the field-of-view of the one-half resolution downscaled image 1410 is equivalent to the field-of-view of the 64×64 matrix representing the target image 1400. The locations in the 32×32 matrix representing the one-half resolution downscaled image 1410 are larger than the locations in the 64×64 matrix representing the target image 1400 to indicate that a pixel from the one-half resolution downscaled image 1410 represents a larger, such as twice as large, spatial area than a pixel of the 64×64 matrix representing the target image 1400.

FIG. 15 is a diagram of an example of a one-quarter resolution downscaled image 1500 and an example of a one-eighth resolution downscaled image 1510. The one-quarter resolution downscaled image 1500 may be an input image, such as an input image received by an image signal processor, such as the image signal processor 410 shown in FIG. 4 or the image signal processor 500 shown in FIG. 5, from an image sensor, such as the image sensor 230 shown in FIG. 2, or from a front image signal processor, such as the front image signal processors 510 shown in FIG. 5. Receiving the input image may include reading the input image, or a portion thereof, from a memory, such as the electronic storage unit 224.

The one-quarter resolution downscaled image 1500 may be an image generated based on a target image, such as the target image 1400 shown in FIG. 14, by downscaling, or sub-sampling, the target image. For example, the one-quarter resolution downscaled image 1500 may be a ¼×¼ resolution frame corresponding to the target image.

In some implementations, the target image and the one-quarter resolution downscaled image 1500 may be may be obtained, such as generated, created, read, or otherwise accessed concurrently, or substantially concurrently. For example, a front image signal processor may concurrently, or substantially concurrently, output the target image, a one-half resolution downscaled image, such as the one-half resolution downscaled image 1410 shown in FIG. 14, the one-quarter resolution downscaled image 1500, or a combination thereof.

The one-quarter resolution downscaled image 1500 is represented as a 16×16 matrix of image portions (e.g., pixels or blocks of pixels). For simplicity and clarity, six rows and six columns of the 16×16 matrix representing the one-quarter resolution downscaled image 1500 are shown in FIG. 15. The third column from the left and the fourth column from the left represent the ten omitted rows and the third row from the top and the fourth row from the top represent the ten omitted columns. Each location in the 16×16 matrix representing the one-quarter resolution downscaled image 1500 corresponds with a respective spatial portion of the one-quarter resolution downscaled image 1500. For example, each location in the 16×16 matrix representing the one-quarter resolution downscaled image 1500 may represent a pixel in the one-quarter resolution downscaled image 1500.

The size of the 16×16 matrix representing the one-quarter resolution downscaled image 1500 is equivalent to the size of the 64×64 matrix representing the target image 1400 shown in FIG. 14 and the size of the 32×32 matrix representing the one-half resolution downscaled image 1410 shown in FIG. 14 to indicate that the field-of-view of the one-quarter resolution downscaled image 1500 is equivalent to the field-of-view of the 64×64 matrix representing the target image 1400 shown in FIG. 14 and the field-of-view of the 32×32 matrix representing the one-half resolution downscaled image 1410 shown in FIG. 14. The locations in the 16×16 matrix representing the one-quarter resolution downscaled image 1500 are larger than the locations in the 32×32 matrix representing the one-half resolution downscaled image 1410 shown in FIG. 14 to indicate that a pixel from the one-quarter resolution downscaled image 1500 represents a larger, such as twice as large, spatial area than a pixel of the 32×32 matrix representing the one-half resolution downscaled image 1410 shown in FIG. 14.

The one-eighth resolution downscaled image 1510 may be an input image, such as an input image received by an image signal processor, such as the image signal processor 410 shown in FIG. 4 or the image signal processor 500 shown in FIG. 5, from an image sensor, such as the image sensor 230 shown in FIG. 2, or from a front image signal processor, such as the front image signal processors 510 shown in FIG. 5. Receiving the input image may include reading the input image, or a portion thereof, from a memory, such as the electronic storage unit 224.

The one-eighth resolution downscaled image 1510 may be an image generated based on a target image, such as the target image 1400 shown in FIG. 14, by downscaling, or sub-sampling, the target image. For example, the one-eighth resolution downscaled image 1510 may be a ⅛×⅛ resolution frame corresponding to the target image.

In some implementations, the target image and the one-eighth resolution downscaled image 1510 may be may be obtained, such as generated, created, read, or otherwise accessed concurrently, or substantially concurrently. For example, a front image signal processor may concurrently, or substantially concurrently, output the target image, a one-half resolution downscaled image, such as the one-half resolution downscaled image 1410 shown in FIG. 14, the one-quarter resolution downscaled image 1500, the one-eighth resolution downscaled image 1510, or a combination thereof.

The one-eighth resolution downscaled image 1510 is represented as an 8×8 matrix of image portions (e.g., pixels or blocks of pixels). For simplicity and clarity, five rows and five columns of the 8×8 matrix representing the one-eighth resolution downscaled image 1510 are shown in FIG. 15. The third column from the left represents the four omitted rows and the third row from the top represents the four omitted columns. Each location in the 8×8 matrix representing the one-eighth resolution downscaled image 1510 corresponds with a respective spatial portion of the one-eighth resolution downscaled image 1510. For example, each location in the 8×8 matrix representing the one-eighth resolution downscaled image 1510 may represent a pixel in the one-eighth resolution downscaled image 1510.

The size of the 8×8 matrix representing the one-eighth resolution downscaled image 1510 is equivalent to the size of the 64×64 matrix representing the target image 1400 shown in FIG. 14, the size of the 32×32 matrix representing the one-half resolution downscaled image 1410 shown in FIG. 14, and the size of the 16×16 matrix representing the one-quarter resolution downscaled image 1500 to indicate that the field-of-view of the one-eighth resolution downscaled image 1510 is equivalent to the field-of-view of the 64×64 matrix representing the target image 1400 shown in FIG. 14, the field-of-view of the 32×32 matrix representing the one-half resolution downscaled image 1410 shown in FIG. 14, and the field-of-view of the 16×16 matrix representing the one-quarter resolution downscaled image 1500. The locations in the 8×8 matrix representing the one-eighth resolution downscaled image 1510 are larger than the locations in the 16×16 matrix representing the one-quarter resolution downscaled image 1500 to indicate that a pixel from the one-eighth resolution downscaled image 1510 represents a larger, such as twice as large, spatial area than a pixel of the 16×16 matrix representing the one-quarter resolution downscaled image 1500.

Figure 16:
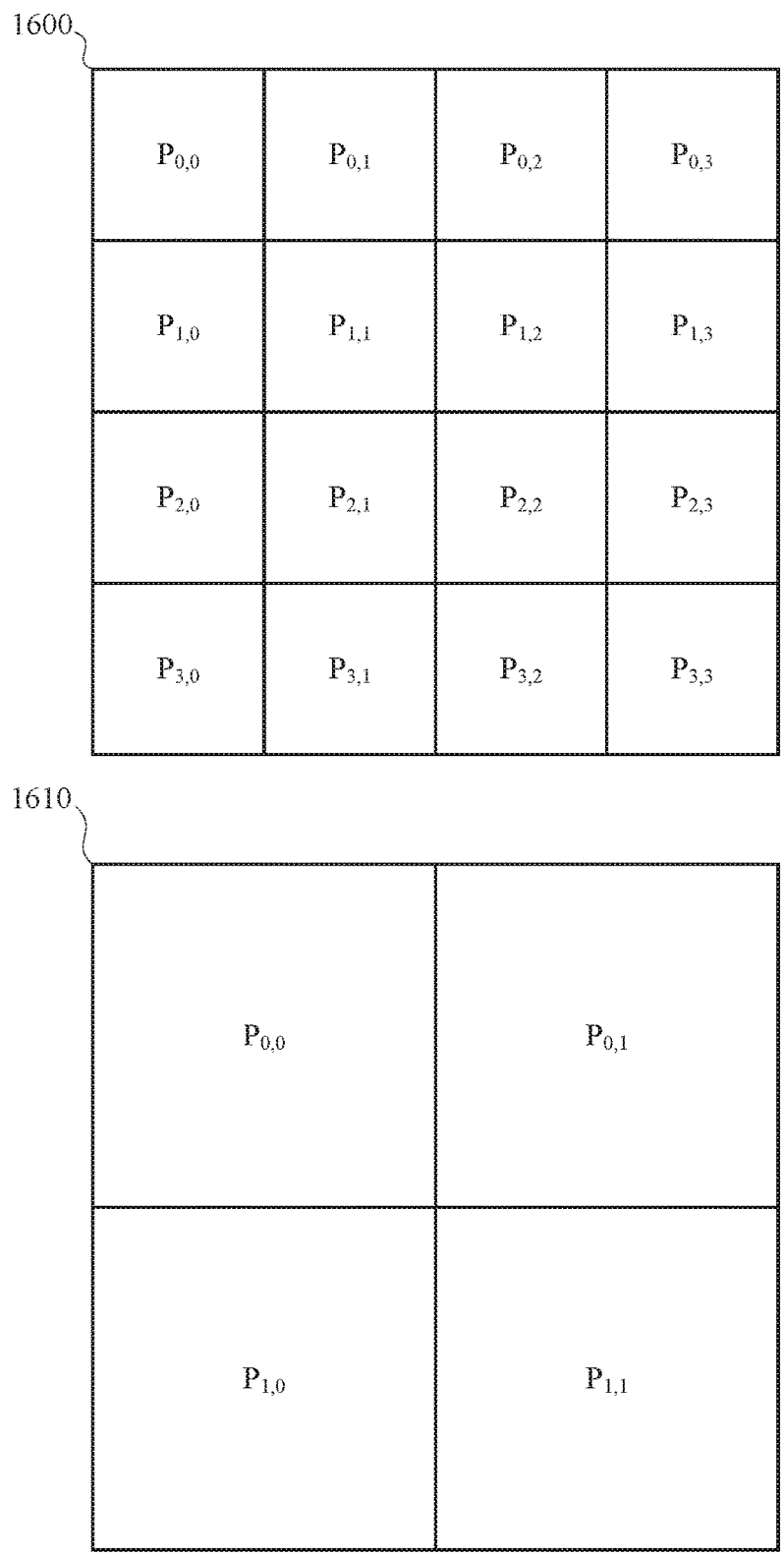
FIG. 16 is a diagram of an example of a one-sixteenth resolution downscaled image and an example of a one-thirty-second resolution downscaled image.

FIG. 16 is a diagram of an example of a one-sixteenth resolution downscaled image 1600 and an example of a one-thirty-second resolution downscaled image 1610. The one-sixteenth resolution downscaled image 1600 may be an input image, such as an input image received by an image signal processor, such as the image signal processor 410 shown in FIG. 4 or the image signal processor 500 shown in FIG. 5, from an image sensor, such as the image sensor 230 shown in FIG. 2, or from a front image signal processor, such as the front image signal processors 510 shown in FIG. 5. Receiving the input image may include reading the input image, or a portion thereof, from a memory, such as the electronic storage unit 224.

The one-sixteenth resolution downscaled image 1600 may be an image generated based on a target image, such as the target image 1400 shown in FIG. 14, by downscaling, or sub-sampling, the target image. For example, the one-sixteenth resolution downscaled image 1600 may be a ¹⁄₁₆×¹⁄₁₆ resolution frame corresponding to the target image.

In some implementations, the target image and the one-sixteenth resolution downscaled image 1600 may be may be obtained, such as generated, created, read, or otherwise accessed concurrently, or substantially concurrently. For example, a front image signal processor may concurrently, or substantially concurrently, output the target image, a one-half resolution downscaled image, such as the one-half resolution downscaled image 1410 shown in FIG. 14, a one-quarter resolution downscaled image, such as the one-quarter resolution downscaled image 1500 shown in FIG. 15, a one-eighth resolution downscaled image, such as the one-eighth resolution downscaled image 1510 shown in FIG. 15, the one-sixteenth resolution downscaled image 1600, or a combination thereof.

The one-sixteenth resolution downscaled image 1600 is represented as a 4×4 matrix of image portions (e.g., pixels or blocks of pixels). Each location in the 4×4 matrix representing the one-sixteenth resolution downscaled image 1600 corresponds with a respective spatial portion of the one-sixteenth resolution downscaled image 1600. For example, each location in the 4×4 matrix representing the one-sixteenth resolution downscaled image 1600 may represent a pixel in the one-sixteenth resolution downscaled image 1600.

The size of the 4×4 matrix representing the one-sixteenth resolution downscaled image 1600 is equivalent to the size of the 64×64 matrix representing the target image 1400 shown in FIG. 14, the size of the 32×32 matrix representing the one-half resolution downscaled image 1410 shown in FIG. 14, the size of the 16×16 matrix representing the one-quarter resolution downscaled image 1500 shown in FIG. 15, and the size of the 8×8 matrix representing the one-eighth resolution downscaled image 1510 shown in FIG. 15 to indicate that the field-of-view of the one-sixteenth resolution downscaled image 1600 is equivalent to the field-of-view of the 64×64 matrix representing the target image 1400 shown in FIG. 14, the field-of-view of the 32×32 matrix representing the one-half resolution downscaled image 1410 shown in FIG. 14, the field-of-view of the 16×16 matrix representing the one-quarter resolution downscaled image 1500 shown in FIG. 15, and the field-of-view of the 8×8 matrix representing the one-eighth resolution downscaled image 1510 shown in FIG. 15. The locations in the 4×4 matrix representing the one-sixteenth resolution downscaled image 1600 are larger than the locations in the 8×8 matrix representing the one-eighth resolution downscaled image 1510 shown in FIG. 15 to indicate that a pixel from the one-sixteenth resolution downscaled image 1600 represents a larger, such as twice as large, spatial area than a pixel of the 8×8 matrix representing the one-eighth resolution downscaled image 1510 shown in FIG. 15.

The one-thirty-second resolution downscaled image 1610 may be an input image, such as an input image received by an image signal processor, such as the image signal processor 410 shown in FIG. 4 or the image signal processor 500 shown in FIG. 5, from an image sensor, such as the image sensor 230 shown in FIG. 2, or from a front image signal processor, such as the front image signal processors 510 shown in FIG. 5. Receiving the input image may include reading the input image, or a portion thereof, from a memory, such as the electronic storage unit 224.

The one-thirty-second resolution downscaled image 1610 may be an image generated based on a target image, such as the target image 1400 shown in FIG. 14, by downscaling, or sub-sampling, the target image. For example, the one-thirty-second resolution downscaled image 1610 may be a $\frac{1}{32} \times \frac{1}{32}$ resolution frame corresponding to the target image.

In some implementations, the target image and the one-thirty-second resolution downscaled image 1610 may be may be obtained, such as generated, created, read, or otherwise accessed concurrently, or substantially concurrently. For example, a front image signal processor may concurrently, or substantially concurrently, output the target image, a one-half resolution downscaled image, such as the one-half resolution downscaled image 1410 shown in FIG. 14, a one-quarter resolution downscaled image, such as the one-quarter resolution downscaled image 1500 shown in FIG. 15, a one-eighth resolution downscaled image, such as the one-eighth resolution downscaled image 1510 shown in FIG. 15, the one-sixteenth resolution downscaled image 1600, the one-thirty-second resolution downscaled image 1610, or a combination thereof.

The one-thirty-second resolution downscaled image 1610 is represented as a 2×2 matrix of image portions (e.g., pixels or blocks of pixels). Each location in the 2×2 matrix representing the one-thirty-second resolution downscaled image 1610 corresponds with a respective spatial portion of the one-thirty-second resolution downscaled image 1610. For example, each location in the 2×2 matrix representing the one-thirty-second resolution downscaled image 1610 may represent a pixel in the one-thirty-second resolution downscaled image 1610.

The size of the 2×2 matrix representing the one-thirty-second resolution downscaled image 1610 is equivalent to the size of the 64×64 matrix representing the target image 1400 shown in FIG. 14, the size of the 32×32 matrix representing the one-half resolution downscaled image 1410 shown in FIG. 14, the size of the 16×16 matrix representing the one-quarter resolution downscaled image 1500 shown in FIG. 15, the size of the 8×8 matrix representing the one-eighth resolution downscaled image 1510 shown in FIG. 15, and the size of the 4×4 matrix representing the one-sixteenth resolution downscaled image 1600 to indicate that the field-of-view of the one-thirty-second resolution downscaled image 1610 is equivalent to the field-of-view of the 64×64 matrix representing the target image 1400 shown in FIG. 14, the field-of-view of the 32×32 matrix representing the one-half resolution downscaled image 1410 shown in FIG. 14, the field-of-view of the 16×16 matrix representing the one-quarter resolution downscaled image 1500 shown in FIG. 15, the field-of-view of the 8×8 matrix representing the one-eighth resolution downscaled image 1510 shown in FIG. 15, and the field-of-view of the 4×4 matrix representing the one-sixteenth resolution downscaled image 1600. The locations in the 2×2 matrix representing the one-thirty-second resolution downscaled image 1610 are larger than the locations in the 4×4 matrix representing the one-sixteenth resolution downscaled image 1600 to indicate that a pixel from the one-thirty-second resolution downscaled image 1610 represents a larger, such as twice as large, spatial area than a pixel of the 4×4 matrix representing the one-sixteenth resolution downscaled image 1600.

Figure 17:
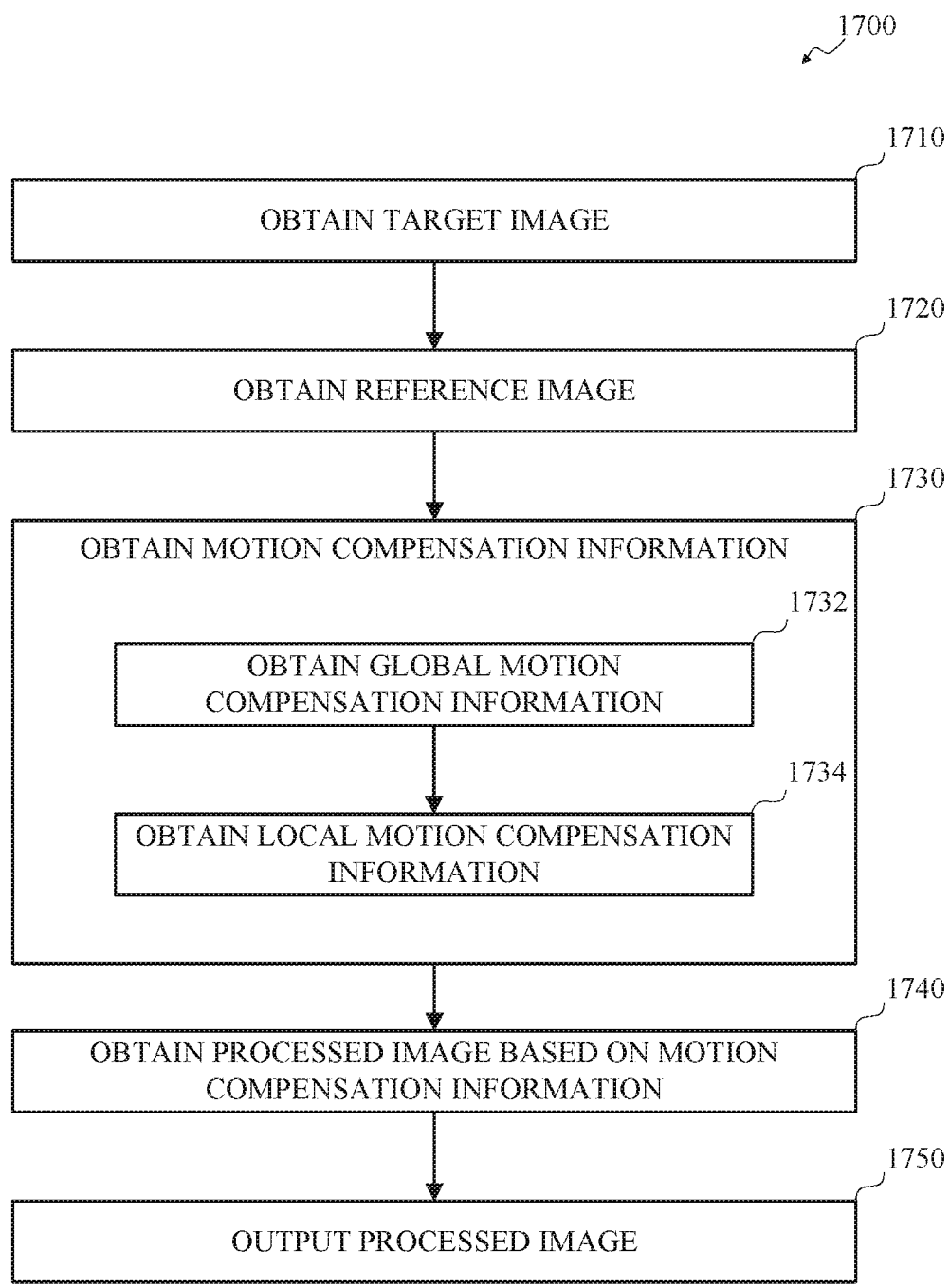
FIG. 17 is a flowchart of an example of a technique for motion compensation.

FIG. 17 is a flowchart of an example of a technique 1700 for motion compensation. In some implementations, the technique 1700 may be implemented in an image capture apparatus, such as the image capture apparatus 110 shown in FIG. 1, or the image capture apparatus 300 shown in FIG. 3. For example, aspects of motion compensation included in the technique 1700 may be implemented by one or more of a local motion estimation unit, such as the local motion estimation unit 520 shown in FIG. 5, a local motion compensation unit, such as the local motion compensation unit 522 shown in FIG. 5, a global motion compensation unit, such as the global motion compensation unit 524 shown in FIG. 5, a temporal noise reduction unit, such as the temporal noise reduction unit 542 of the image signal processor 500 shown in FIG. 5, a high dynamic range unit, such as the high dynamic range unit 530 of the image signal processor 500 shown in FIG. 5, or a combination thereof.

The technique 1700 may include obtaining a target image at 1710, obtaining a reference image at 1720, obtaining motion compensation information at 1730, obtaining a processed image at 1740, outputting the processed image at 1750, or a combination thereof. In some implementations, one or more aspects of motion compensation described in relation to the technique 1700 may be omitted or combined, and one or more other aspects, not shown in FIG. 17, may be included.

A target image may be obtained at 1710. Obtaining the target image at 1710 may include receiving, such as by an image signal processor, such as the image signal processor 410 shown in FIG. 4 or the image signal processor 500 shown in FIG. 5, which may be included in an image capture apparatus, one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, and identifying one or more input images, or frames, from the input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and each input image or frame may be associated with respective temporal information. In some implementations, such as implementations including high dynamic range processing, the target image may be a long exposure frame. In some implementations, such as implementations including high dynamic range processing, the target image may be a short exposure frame.

The target image may have a full size or resolution, which may be the resolution of the image as captured. For example, the target image, or frame, may be a 3840×2160 image, which may include 3840 columns (W=3840), or pixels per row, and 2160 rows (H=2160). In some implementations, obtaining the target image at 1710 may include obtaining one or more downscaled target images corresponding to the target image. For example, an image signal processor, such as the image signal processor 410 shown in FIG. 4 or the image signal processor 500 shown in FIG. 5, may obtain the target image from a front image signal processor, such as the front image signal processor 510 shown in FIG. 5, may include obtaining the target image at a full resolution as captured, one or more downscaled, or reduced, resolution frames, such as a one-half resolution frame, a one-quarter resolution frame, a one-eighth resolution frame, a one-sixteenth resolution frame, a one-thirty-second resolution frame, or any combination thereof. Other resolutions may be used.

A reference image may be obtained at 1720. In some implementations, such as implementations including temporal noise reduction, the reference frame may be a previously processed frame, such as reconstructed or recirculated frame, which may be a frame temporally preceding the target image obtained at 1710. In some implementations, such as implementations including high dynamic range processing, the reference image may be a short exposure frame corresponding to the target image (e.g., a long exposure frame) obtained at 1710. In some implementations, such as implementations including high dynamic range processing, the reference image may be a long exposure frame corresponding to the target image (e.g., a short exposure frame) obtained at 1710.

Motion compensation information may be obtained at 1730. Obtaining the motion compensation information may include obtaining global motion compensation information at 1732, obtaining local motion compensation information at 1734, or a combination thereof.

Global motion compensation information may be obtained at 1732. For example, a global motion compensation unit, such as the global motion compensation unit 524 shown in FIG. 5, may obtain or generate the global motion compensation information.

Obtaining the global motion compensation information at 1732 may include receiving, or otherwise accessing, the reference image, or one or more portions thereof. In some implementations, such as implementations implementing high dynamic range image processing, the reference image may be the short exposure input frame.

Obtaining the global motion compensation information at 1732 may include receiving, or otherwise accessing, global motion information, such as global motion information from a gyroscopic unit of the image capture apparatus, such as a gyroscopic sensor included in the metadata unit 232 shown in FIG. 2, corresponding to the target image. For example, the global motion information may indicate global motion detected or determined between capturing the reference image and capturing the target image.

Obtaining the global motion compensation information at 1732 may include generating or obtaining a global motion prediction frame or image, or a portion thereof, such as a prediction block, which may be a prediction of the target image, or a portion thereof, such as a target block of the target image, based on the reference image, or a portion thereof, and the global motion information. Obtaining the global motion compensation information at 1732 may include outputting, or otherwise producing, global motion compensation information, such as a global motion compensated prediction image, or one or more portions thereof, which may be referred to herein as a global motion compensated frame or image.

Local motion compensation information may be obtained at 1734. For example, a local motion compensation unit, such as the local motion compensation unit 522 shown in FIG. 5, may obtain or generate the local motion compensation information.

Obtaining the local motion compensation information at 1734 may include receiving, or otherwise accessing, the reference image, or one or more portions thereof. In some implementations, such as implementations implementing high dynamic range image processing, the reference image may be the short exposure input frame.

Obtaining the local motion compensation information at 1734 may include receiving, or otherwise accessing, local motion information, such as local motion information from a local motion estimation unit, such as the local motion estimation unit 520 shown in FIG. 5, corresponding to the target image. For example, the local motion information may indicate local motion identified between the reference image and the target image.

Figure 19:
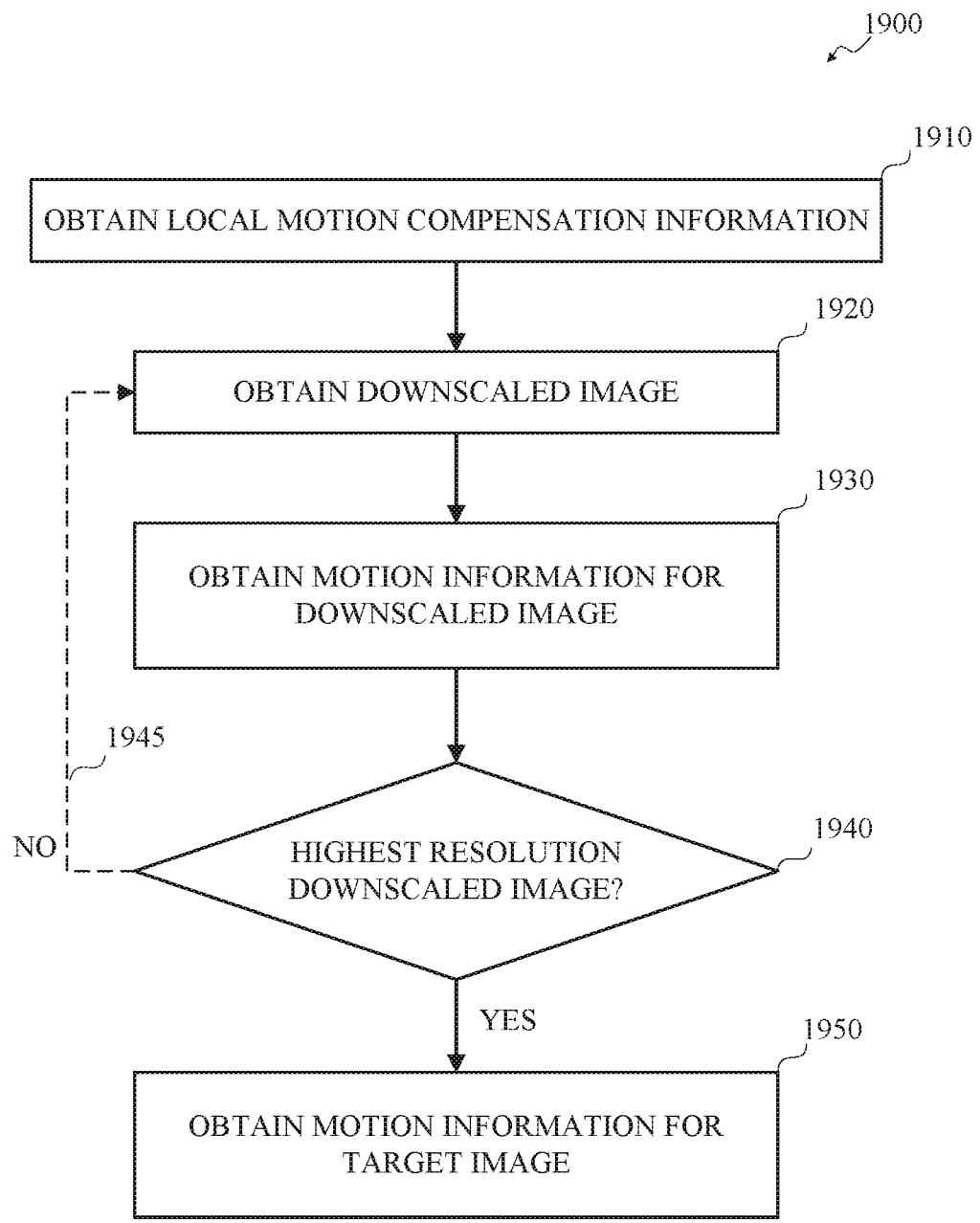
FIG. 19 is a flowchart of an example of a technique for obtaining local motion information.
Figure 20:
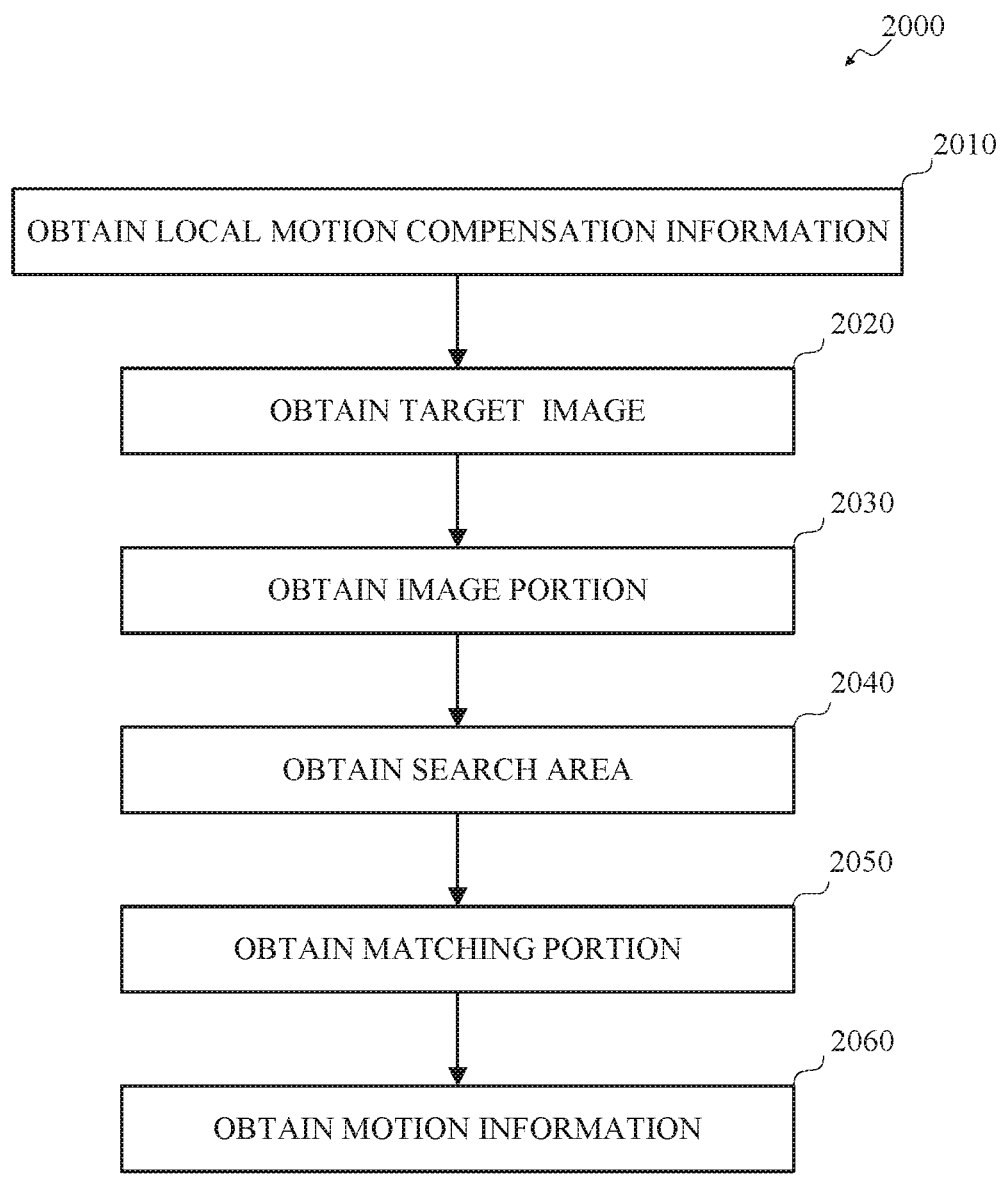
FIG. 20 is a flowchart of an example of a technique for obtaining local motion information for a current image.

Obtaining the local motion compensation information at 1734 may include generating or obtaining a local motion prediction frame or image, or a portion thereof, such as a prediction block, which may be a prediction of the target image, or a portion thereof, such as a target block of the target image, based on the reference image, or a portion thereof, and the local motion information. Obtaining the local motion compensation information at 1734 may include outputting, or otherwise producing, local motion compensation information, such as a local motion compensated prediction image, or one or more portions thereof, which may be referred to herein as a local motion compensated frame or image. Examples of generating local motion compensation information are shown in FIGS. 19-20.

A processed image may be obtained or generated at 1740. Obtaining the processed image at 1740 may include obtaining, such as by receiving, the target image, obtaining, such as by receiving, the local motion compensation information, obtain, such as by receiving, the global motion compensation information, or a combination thereof. For example, a temporal noise reduction unit, such as the temporal noise reduction unit 542 shown in FIG. 5, may obtain the target image, the location motion compensation information, and the global motion compensation information, and may determine whether to use the local motion compensation information, the global motion compensation information, or both, to generate the processed image (e.g., a temporal noise reduced image) at 1740. In another example, a high dynamic range unit, such as the high dynamic range unit 530 shown in FIG. 5, may obtain the target image, the location motion compensation information, and the global motion compensation information, and may determine whether to use the local motion compensation information, the global motion compensation information, or both, to generate the processed image (e.g., a high dynamic range image) at 1740. An example of determining whether to use the local motion compensation information, the global motion compensation information, or both, to generate the processed image is shown in FIG. 18.

The processed image, or a portion thereof, such as a block of the processed image, may be output at 1750. For example, outputting the processed image at 1750 may include storing the processed image in a memory (e.g., the electronic storage unit 224), or outputting the processed image directly to another image signal processing unit, such as the temporal noise reduction unit 542 shown in FIG. 5. In some implementations, such as implementations including high dynamic range processing, outputting the processed image at 1750 may include outputting a high dynamic range image. In some implementations, outputting the processed image at 1750 may include outputting a noise reduced image.

Figure 18:
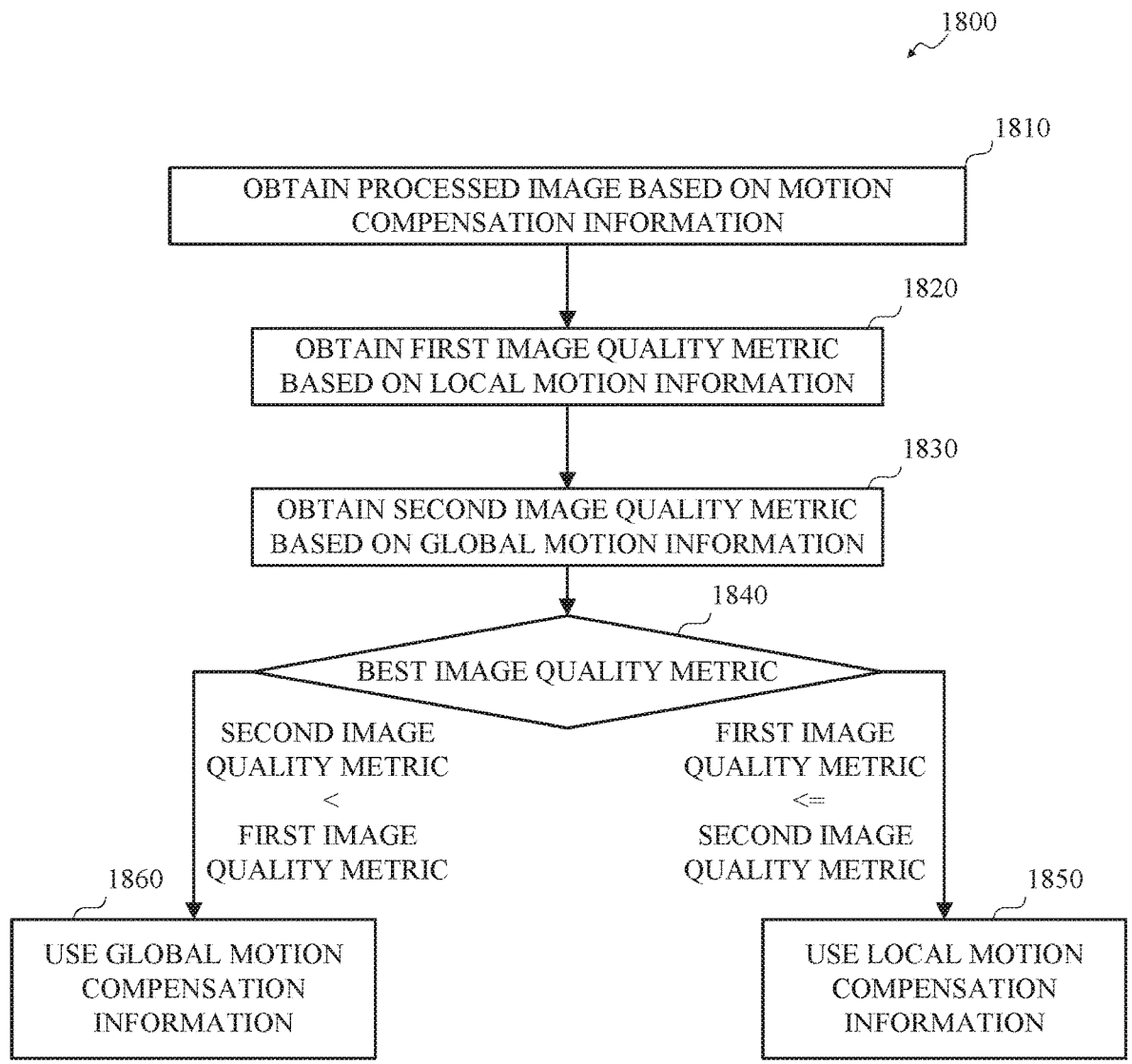
FIG. 18 is a flowchart of an example of a technique for determining whether to use local motion compensation information or global motion compensation information.

FIG. 18 is a flowchart of an example of a technique for 1800 determining whether to use local motion compensation information or global motion compensation information. In some implementations, determining whether to use local motion compensation information or global motion compensation information 1800 may be implemented in an image capture apparatus, such as the image capture apparatus 110 shown in FIG. 1, or the image capture apparatus 300 shown in FIG. 3. For example, a temporal noise reduction unit, such as the temporal noise reduction unit 542 of the image signal processor 500 shown in FIG. 5, may implement determining whether to use local motion compensation information or global motion compensation information 1800, or a high dynamic range unit, such as the high dynamic range unit 530 of the image signal processor 500 shown in FIG. 5, may implement determining whether to use local motion compensation information or global motion compensation information 1800.

Image signal processing may include obtaining a processed image (e.g., a noise reduced image or a high dynamic range image) at 1810, which may be similar to obtaining a processed image as show at 1740 in FIG. 17, and which may implement determining whether to use local motion compensation information or global motion compensation information 1800. Obtaining the processed image at 1810 may include obtaining a first, or local prediction, image quality metric at 1820, obtaining a second, or global prediction, image quality metric at 1830, identifying a best, or optimal, image quality metric at 1840, obtaining local motion compensation information at 1850, obtaining global motion compensation information at 1860, or a combination thereof. Although not shown separately in FIG. 18, obtaining a processed image at 1810 may include obtaining the target image, obtaining the local motion compensated image, and obtaining the global motion compensated image.

A first image quality metric, such as a local prediction image quality metric, may be obtained at 1820. Obtaining the local prediction image quality metric at 1820 may include determining a difference, such as a sum of absolute differences, between the target image, or a portion thereof, such as a target block of the target image, and a corresponding local motion compensated image, or a portion thereof, such as a corresponding local motion compensated prediction block.

A second image quality metric, such as a global prediction image quality metric, may be obtained at 1830. Obtaining the global prediction image quality metric at 1830 may include determining a difference, such as a sum of absolute differences, between the target image, or a portion thereof, such as a target block of the target image, and a corresponding global motion compensated image, or a portion thereof, such as a corresponding global motion compensated prediction block.

A best, minimal, or optimal, image quality metric may be obtained, or identified, at 1840. Obtaining the best image quality metric at 1840 may include determining whether the local prediction image quality metric obtained at 1820 is within the global prediction image quality metric obtained at 1830. For example, obtaining the best image quality metric at 1840 may include determining whether the local prediction image quality metric obtained at 1820 is less than or equal to the global prediction image quality metric obtained at 1830.

Obtaining the best image quality metric at 1840 may include determining that the local prediction image quality metric obtained at 1820 is within, such as is less than or equal to, the global prediction image quality metric obtained at 1830, which may indicate that the local motion compensation information more accurately, or more efficiently, predicts the target image, or the target portion of the target image, than the global motion compensation information, and the local motion compensation information may be used for generating or obtaining the processed image at 1850.

In another example, the local prediction image quality metric obtained at 1820 may exceed the global prediction image quality metric obtained at 1830, which may indicate that the global motion compensation information more accurately, or more efficiently, predicts the target image, or the target portion of the target image, than the local motion compensation information, and the global motion compensation information may be used for generating or obtaining the processed image at 1860.

FIG. 19 is a flowchart of an example of a technique 1900 for obtaining local motion information. In some implementations, the technique 1900 may be implemented in an image capture apparatus, such as the image capture apparatus 110 shown in FIG. 1, or the image capture apparatus 300 shown in FIG. 3. For example, a local motion estimation unit, such as the local motion estimation unit 520 of the image signal processor 500 shown in FIG. 5, may implement the technique 1900.

Image signal processing may include obtaining location motion compensation information at 1910, which may be similar to obtaining location motion compensation information as shown at 1734 in FIG. 17, and which may implement the technique 1900. The technique 1900 may include obtaining a downscaled image at 1920, obtaining motion information for the downscaled image at 1930, determining whether the downscaled image is the highest resolution downscaled image available at 1940, obtaining motion information for the target image at 1950, or a combination thereof.

A downscaled image may be obtained at 1920. For example, the technique 1900 may be implemented in an image signal processor, such as the image signal processor 500 shown in FIG. 5, of an image capture apparatus, such as the image capture apparatus 110 shown in FIG. 1, or the image capture apparatus 300 shown in FIG. 3, which may include one or more front image signal processors, such as the front image signal processor 510 shown in FIG. 5, which may output the target image and one or more downscaled, or reduced, resolution images based on the target image, such as a ½×½ resolution frame, a ¼×¼ resolution frame, a ⅛×⅛ resolution frame, a ¹⁄₁₆×¹⁄₁₆ resolution frame, a ¹⁄₃₂×¹⁄₃₂ resolution frame, or any combination thereof, and obtaining the downscaled image at 1920 may include obtaining the downscaled image from the downscaled images generated by the front image signal processor in order of increasing resolution.

For example, obtaining the downscaled images at 1920 may include obtaining a lowest resolution downscaled image, such as by reading the lowest resolution downscaled image from a memory. For example, the lowest resolution downscaled image may be a one-thirty-second resolution downscaled image, such as the one-thirty-second resolution downscaled image 1610 shown in FIG. 16.

Motion information for the downscaled image may be obtained at 1930. An example of obtaining motion information for a target image, such as the downscaled image is shown in FIG. 20.

Whether the downscaled image obtained at 1920 is the highest resolution downscaled image for the target image may be determined at 1940. For example, one downscaled image may be available for local motion compensation, and determining whether the downscaled image is the highest resolution downscaled image for the target image at 1940 may include determining that the downscaled image is the highest resolution downscaled image for the target image. In another example, a downscaled image having a higher resolution than the downscaled image identified at 1920 may be available for local motion compensation, and determining whether the downscaled image is the highest resolution downscaled image for the target image may at 1940 may include determining that the downscaled image is not the highest resolution downscaled image for the target image.

The downscaled image may not be the highest resolution downscaled image for the target image, a downscaled image having a higher resolution than the downscaled image identified at 1920 may be available for local motion compensation, and obtaining the downscaled image at 1920, obtaining motion information for the downscaled image at 1930, and determining whether a higher resolution downscaled image is available at 1940 may be performed using the higher resolution downscaled image as the downscaled image as indicated by the broken line at 1945.

For example, the downscaled images may include a one-half resolution image, a one-quarter resolution image, a one-eighth resolution image, a one-sixteenth resolution image, and a one-thirty-second resolution image, and the technique 1900 may include obtaining the one-thirty-second resolution downscaled image at 1920, obtaining motion information for the one-thirty-second resolution downscaled image at 1930, and determining that a higher resolution downscaled image is available at 1940, obtaining the one-sixteenth resolution downscaled image at 1920, obtaining motion information for the one-sixteenth resolution downscaled image at 1930, and determining that a higher resolution downscaled image is available at 1940, obtaining the one-eighth resolution downscaled image at 1920, obtaining motion information for the one-eighth resolution downscaled image at 1930, and determining that a higher resolution downscaled image is available at 1940, obtaining the one-quarter resolution downscaled image at 1920, obtaining motion information for the one-quarter resolution downscaled image at 1930, and determining that a higher resolution downscaled image is available at 1940, and obtaining the one-half resolution downscaled image at 1920, obtaining motion information for the one-half resolution downscaled image at 1930, and determining that a higher resolution downscaled image is unavailable at 1940.

Motion information for the target image may be obtained at 1950. An example of obtaining motion information for a target image is shown in FIG. 20.

FIG. 20 is a flowchart of an example of a technique 2000 for obtaining local motion information for a target image. In some implementations, the technique 2000 may be implemented in an image capture apparatus, such as the image capture apparatus 110 shown in FIG. 1, or the image capture apparatus 300 shown in FIG. 3. For example, a local motion estimation unit, such as the local motion estimation unit 520 of the image signal processor 500 shown in FIG. 5, may implement the technique 2000.

Image signal processing may include obtaining location motion compensation information at 2010, which may be similar to obtaining location motion compensation information as shown at 1734 in FIG. 17, and which may implement the technique 2000. The technique 2000 may include obtaining a target image at 2020, obtaining an image portion at 2030, obtaining a search area in a reference image at 2040, obtaining a matching portion at 2050, obtaining the motion information at 2060, or a combination thereof.

A target image may be obtained at 2020. For example, the technique 2000 may be implemented in an image signal processor, such as the image signal processor 500 shown in FIG. 5, of an image capture apparatus, such as the image capture apparatus 110 shown in FIG. 1, or the image capture apparatus 300 shown in FIG. 3, which may include one or more front image signal processors, such as the front image signal processor 510 shown in FIG. 5, which may output the target image, which may be a current input frame and/or downscaled, or reduced, resolution frames, such as a ½×½ resolution frame, a ¼×¼ resolution frame, a ⅛×⅛ resolution frame, a ¹⁄₁₆×¹⁄₁₆ resolution frame, a ¹⁄₃₂×¹⁄₃₂ resolution frame, and obtaining the target image at 2020 may include obtaining the target image from the images generated by the front image signal processor.

The target image obtained at 2020 may be a lowest resolution downscaled image for a target image, such as a one-thirty-second resolution downscaled image, such as the one-thirty-second resolution downscaled image 1610 shown in FIG. 16, and obtaining the target image may omit obtaining motion information corresponding to a lower resolution downscaled image.

The target image obtained at 2020 may be a higher resolution downscaled image, having a higher resolution than the lowest resolution downscaled image, or may be the target image, and obtaining the target image at 2020 may include obtaining motion information, such as motion vectors, previously generated or identified based on a lower resolution downscaled image for the target image. For example, the target image obtained at 2020 may be a one-sixteenth resolution downscaled image and obtaining the target image at 2020 may include obtaining previously generated motion information for a lower resolution downscaled image, such as the one-thirty-second resolution downscaled image.

The technique 2000 may include obtaining 2030 an input image portion. For example, a first input portion from a downscaled target image may be obtained 2030, wherein the first input portion has a first input portion location in the downscaled target image and a first input portion size. For example, a second input portion may be obtained 2030 from the target image, wherein the second input portion has the first input portion location in the target image and a second input portion size.

The technique 2000 may include obtaining 2040 a search area in a reference image. For example, a first search area portion may be obtained 2040 from the reference image, wherein the first search area portion is centered on a first location in the reference image that corresponds with the first input portion location, and wherein the first search area portion has a first search area portion size that exceeds the first input portion size by a first defined search area amount associated with the resolution of the downscaled target image. For example, a second search area portion may be obtained 2040 from the reference image, wherein the second search area portion is centered on a second location in the reference image that is indicated by the first input portion location and the first local motion vector, and wherein the first search area portion has a first search area portion size that exceeds the first input portion size by a first defined search area amount associated with the resolution of the downscaled target image. For example, a search area portion may be obtained 2040 from the reference image, wherein the search area portion is centered on a location in the reference image indicated by the input portion location and a candidate local motion information corresponding to a next lower resolution downscaled target image, and wherein the search area portion has a search area portion size that exceeds the input portion size by a defined search area amount associated with the resolution of the downscaled target image.

The technique 2000 may include obtaining 2050 a matching portion. For example, a first matching portion may be obtained 2050 from the first search area portion by searching the first search area portion based on the first input portion, wherein the first matching portion has the first input portion size. For example, a second matching portion may be obtained 2050 from the second search area portion by searching the second search area portion based on the second input portion, wherein the second matching portion has the second input portion size.

The technique 2000 may include obtaining 2060 the motion information. For example, a first local motion vector may be obtained 2060 that indicates a spatial difference between the first input portion location and a location of the first matching portion in the reference image as the first local motion estimation information. For example, a second local motion vector may be obtained 2060 that indicates a spatial difference between the second input portion location and a location of the second matching portion in the reference image as the second local motion estimation information. For example, a local motion vector may be obtained 2060 that indicates a spatial difference between the input portion location and a location of the matching portion in reference image as a candidate local motion information for the downscaled target image.

For example, a first implementation may include a non-transitory computer-readable storage medium, comprising executable instructions that, when executed by a processor, facilitate performance of operations, comprising: obtaining, by an image signal processor, a target image; obtaining, by the image signal processor, a reference image; obtaining motion compensation information indicating motion identified between the target image and the reference image, wherein obtaining the motion compensation information includes obtaining local motion compensation information and obtaining global motion compensation information; obtaining a processed image by updating the target image based on the motion compensation information; and outputting the processed image.

For example, in the first implementation, obtaining the motion compensation information may include determining whether to use the local motion compensation information or the global motion compensation information.

For example, in the first implementation, determining whether to use the local motion compensation information or the global motion compensation information may include: obtaining a first image quality metric based on the local motion compensation information; obtaining a second image quality metric based on the global motion compensation information; identifying the local motion compensation information as the motion compensation information on a condition that the second image quality metric exceeds the first image quality metric; and identifying the global motion compensation information as the motion compensation information on a condition that the first image quality metric exceeds the second image quality metric.

For example, in the first implementation, obtaining the local motion compensation information may include: obtaining a first local motion estimation information based on the target image and the reference image; and obtaining a second local motion estimation information based on the target image, the reference image, and the first local motion estimation information. For example, obtaining the first local motion estimation information may include: obtaining a downscaled target image corresponding to the target image, wherein a resolution of the target image exceeds a resolution of the downscaled target image; obtaining a first input portion from the downscaled target image, wherein the first input portion has a first input portion location in the downscaled target image and a first input portion size; obtaining a first search area portion from the reference image, wherein the first search area portion is centered on a first location in the reference image that corresponds with the first input portion location, and wherein the first search area portion has a first search area portion size that exceeds the first input portion size by a first defined search area amount associated with the resolution of the downscaled target image; obtaining a first matching portion from the first search area portion by searching the first search area portion based on the first input portion, wherein the first matching portion has the first input portion size; and obtaining a first local motion vector indicating a spatial difference between the first input portion location and a location of the first matching portion in the reference image as the first local motion estimation information. For example, obtaining the second local motion estimation information may include: obtaining a second input portion from the target image, wherein the second input portion has the first input portion location in the target image and a second input portion size; obtaining a second search area portion from the reference image, wherein the second search area portion is centered on a second location in the reference image that is indicated by the first input portion location and the first local motion vector, and wherein the first search area portion has a first search area portion size that exceeds the first input portion size by a first defined search area amount associated with the resolution of the downscaled target image; obtaining a first matching portion from the first search area portion by searching the first search area portion based on the first input portion, wherein the first matching portion has the first input portion size; and obtaining a first local motion vector indicating a spatial difference between the first input portion location and a location of the first matching portion in the reference image as the first local motion estimation information.

For example, in the first implementation, the target frame may be a long exposure frame, and the reference frame is a short exposure frame corresponding to the long exposure frame for high dynamic range processing.

For example, in the first implementation, the target frame may be a first frame from a sequence of frames; the target frame may have a first location in the sequence of frames; the reference frame may be a second frame from the sequence of frames; and the reference frame may have a second location in the sequence of frames preceding the first location in the sequence of frames.

For example, a second implementation may include a non-transitory computer-readable storage medium, comprising executable instructions that, when executed by a processor, facilitate performance of operations, comprising: obtaining, by an image signal processor, a target image; obtaining, by the image signal processor, a reference image; obtaining motion compensation information indicating motion identified between the target image and the reference image, wherein obtaining the motion compensation information includes obtaining local motion compensation information and obtaining global motion compensation information; obtaining a processed image by updating the target image based on the motion compensation information; outputting the processed image; and wherein obtaining the local motion compensation information may include obtaining the local motion compensation information using multiscale local motion estimation, wherein multiscale local motion estimation includes: obtaining downscaled target images corresponding to the target image, wherein a resolution of the target image exceeds a respective resolution of each downscaled target image from the downscaled target images, and wherein the respective resolution of each downscaled target image from the downscaled target images differs from the respective resolution of each other downscaled target image from the downscaled target images; for each downscaled target image from the downscaled target images in order of increasing resolution: obtaining candidate local motion information for the downscaled target image, wherein obtaining the candidate local motion information for the downscaled target image includes: on a condition that a resolution of the downscaled target image is a lowest resolution among the downscaled target images, obtaining the candidate local motion information for the downscaled target image based on the downscaled target image and the reference image; and on a condition that a resolution of the downscaled target image is greater than the lowest resolution among the downscaled target images, obtaining the candidate local motion information for the downscaled target image based on the downscaled target image, the reference image, and candidate local motion information corresponding to a next lower resolution downscaled target image from the downscaled target images; and obtaining local motion estimation information based on the target image, the reference image, and candidate local motion estimation information corresponding to a downscaled target image from the downscaled target images that has a highest resolution among the downscaled target images.

For example, in the second implementation, on the condition that the resolution of the downscaled target image is the lowest resolution among the downscaled target images, obtaining the candidate local motion information for the downscaled target image based on the downscaled target image and the reference image includes: obtaining an input portion from the downscaled target image, wherein the input portion has an input portion location in the downscaled target image and an input portion size; obtaining a search area portion from the reference image, wherein the search area portion is centered on a location in the reference image that corresponds with the input portion location, and wherein the search area portion has a search area portion size that exceeds the input portion size by a defined search area amount associated with the resolution of the downscaled target image; obtaining a matching portion from the search area portion by searching the search area portion based on the input portion, wherein the matching portion has the input portion size; and obtaining a local motion vector indicating a spatial difference between the input portion location and a location of the matching portion in reference image as the candidate local motion information for the downscaled target image.

For example, in the second implementation, on the condition that the resolution of the downscaled target image is greater than the lowest resolution among the downscaled target images, obtaining the candidate local motion information for the downscaled target image based on the downscaled target image, the reference image, and the candidate local motion information corresponding to the next lower resolution downscaled target image may include: obtaining an input portion from the downscaled target image, wherein the input portion has an input portion location in the downscaled target image and an input portion size; obtaining a search area portion from the reference image, wherein the search area portion is centered on a location in the reference image indicated by the input portion location and the candidate local motion information corresponding to the next lower resolution downscaled target image, and wherein the search area portion has a search area portion size that exceeds the input portion size by a defined search area amount associated with the resolution of the downscaled target image; obtaining a matching portion from the search area portion by searching the search area portion based on the input portion, wherein the matching portion has the input portion size; and obtaining a local motion vector indicating a spatial difference between the input portion location and a location of the matching portion in reference image as the candidate local motion information for the downscaled target image.

For example, in the second implementation, obtaining local motion estimation information based on the target image, the reference image, and the candidate local motion estimation information corresponding to the downscaled target image from the downscaled target images that has the highest resolution among the downscaled target images may include: obtaining an input portion from the target image, wherein the input portion has an input portion location in the target image and an input portion size; obtaining a search area portion from the reference image, wherein the search area portion is centered on a location in the reference image indicated by the input portion location and the candidate local motion information corresponding to the downscaled target image from the downscaled target images that has the highest resolution among the downscaled target images, and wherein the search area portion has a search area portion size that exceeds the input portion size by a defined search area amount associated with the resolution of the target image; obtaining a matching portion from the search area portion by searching the search area portion based on the input portion, wherein the matching portion has the input portion size; and obtaining a local motion vector indicating a spatial difference between the input portion location and a location of the matching portion in reference image as the local motion information for the target image.

For example, in the second implementation, multiscale local motion estimation may include: obtaining the downscaled target images by generating the downscaled target images by a front image signal processor concurrent with generating the target image by the front image signal processor.

Figure 21:
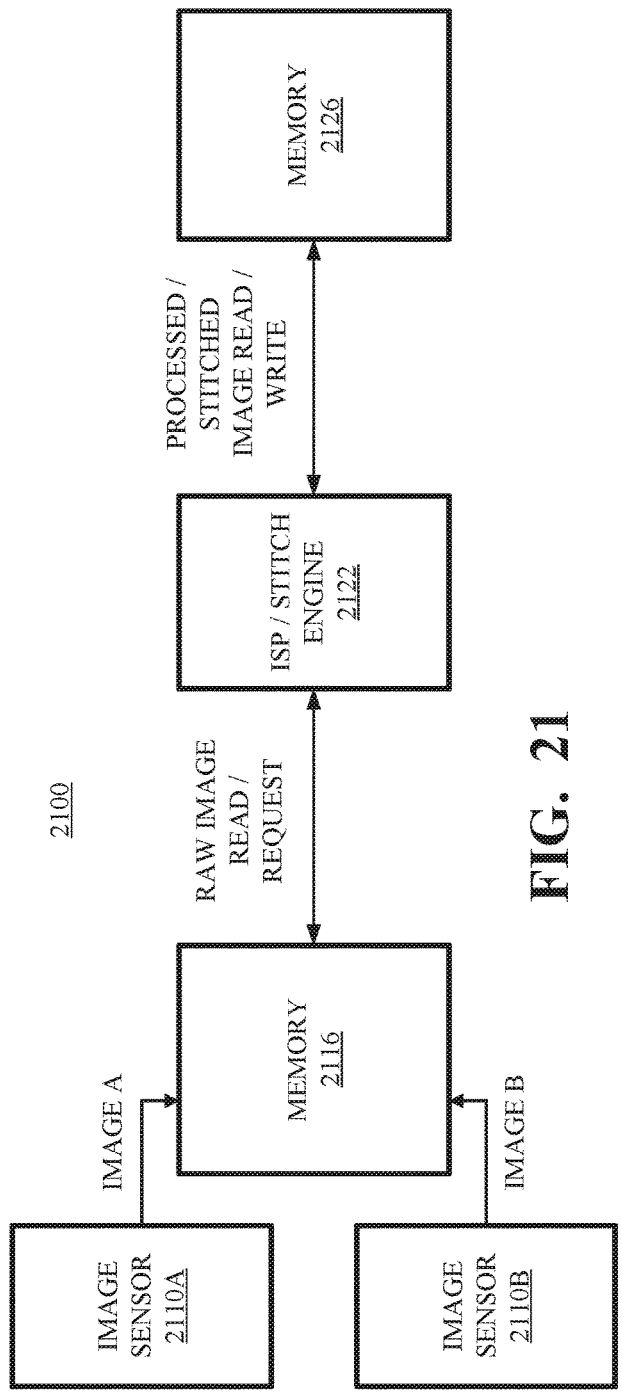
FIG. 21 illustrates an example of an architecture for processing and stitching images captured with multiple image sensors.

FIG. 21 illustrates an example of an architecture 2100 for processing and stitching images captured with multiple image sensors. The architecture 2100 includes two image sensors (2110A and 2110B) configured to capture two images (image A and image B, respectively) with at least partially overlapping fields of view. The architecture 2100 further includes a memory 2116, configured to store the raw (or unprocessed) images (e.g., the image A and the image B). In addition, the architecture 2100 includes an image signal processor ("ISP")/stitch engine 2122, configured to request (via read/request signal) access to the raw images (e.g., the image A and the image B) from the memory 2116, to process and stitch the images (e.g., the image A and the image B), and to store the processed and stitched images (via write signal) in a memory 2126 of the architecture 2100. For example, the architecture 2100 may be implemented by an image capture apparatus (e.g., the image capture apparatus 110 of FIG. 1 or the image capture apparatus 300 of FIG. 3).

For example, the architecture 2100 may be implemented within one camera system, such as, a singular device having two capture mechanisms (e.g., two lenses, two image sensors, two capture controllers, etc.) but having one ISP/stitching engine 2122. In some implementations, the architecture 2100 includes two separate camera systems. For example, either an ISP of one of the cameras or an external ISP or processing system can perform the functions of the ISP/stitch engine 2122. In some implementations, the ISP/stitch engine 2122 is a standalone integrated circuit or processor chip. In some implementations, the ISP/stitch engine 2122 includes two or more hardware chips (such as an ISP and a dedicated stitching IC) configured to perform image processing and stitching operations in tandem.

Figure 24A:
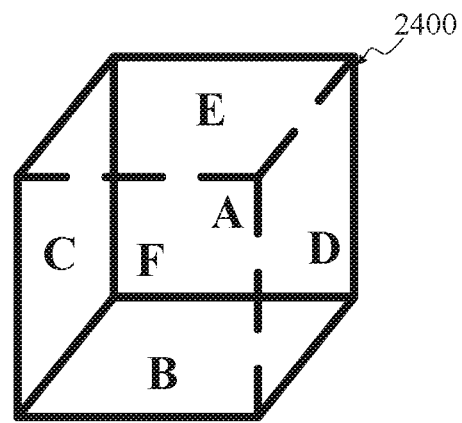
FIG. 24A illustrates images captured with a cubic array of image sensors.

Although the architecture 2100 of FIG. 21 only includes two image sensors (and although the stitching embodiments described herein are limited to embodiments in which two images are captured and stitched), it should be noted that the principles described herein equally apply to embodiments in which more than two images are captured and stitched. For example, in some implementations, the architecture 2100 can include six cameras arranged in a cubic camera array (e.g., as illustrated in FIG. 1 and FIG. 24A). In some implementations, the image sensors 2110A and 2110B face in substantially opposite directions (e.g., as in image capture apparatus 300 of FIG. 3) such that one or more portions of the boundaries of image A overlap with one or more portions of the boundaries of image B, and such that the collective field of view of both image sensors 2110A and 2110B is substantially spherical.

In some implementations, the memory 2116 and the memory 2126 may be the same memory. In some implementations, the memories 2116 and 2126 are separate memories. In some implementations, the memory 2116 includes a first memory in which the image sensor 2110A writes image A, and includes a separate second memory in which the image sensor 2110B writes image B. In some implementations, one or both of memory 2116 and memory 2126 is located externally to the camera systems in the architecture 2100.

The ISP/stitch engine 2122 may be configured to read the raw image A from the memory 2116, and perform one or more image processing operations on the raw image A. For example, the ISP/stitch engine 2122 can apply a warp operation to the raw image A selected to convert the overlapping fields of view of the image sensors 2110A and 2110B and the resulting fields of view of image A and image B into a single two dimensional stitched image representative of the overlapping fields of view. The ISP/stitch engine 2122 may then write the processed image A to the memory 2126.

The ISP/stitch engine 2122 may be configured to then read the raw image B from the memory 2116, and perform one or more image processing operations on the raw image B. As noted above, one such processing operation is the warp operation applied to covert overlapping fields of view into a two dimensional image. The ISP/stitch engine 2122 may then write the portion of the processed image B that does not overlap with any portion of the processed image A to the memory 2126.

Figure 22:
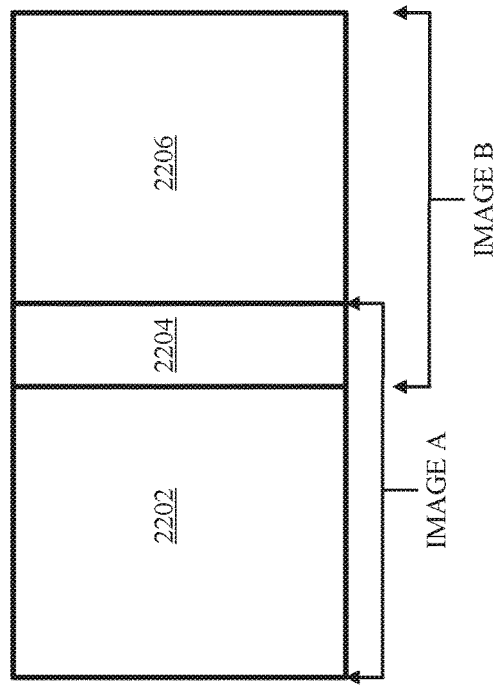
FIG. 22 illustrates overlapping images captured with multiple image sensors.

FIG. 22 illustrates overlapping images captured with multiple image sensors. In the example of FIG. 22, image A includes the image portion 2202 and the image portion 2204, and image B includes the image portion 2204 and the image portion 2206. For example, the image portion 2204 may be representative of the overlapping fields of view of the image sensor 2110A and the image sensor 2110B.

Returning to the description of FIG. 21, the ISP/stitch engine 2122, after processing raw image B, writes only the portion of the processed image B that does not overlap with any portion of the processed image A (image portion 2206) to the memory 2126. The ISP/stitch engine 2122 maintains (e.g., in an internal buffer) the portion of the processed image B that does overlap with processed image A (image portion 2204). It should be noted that although reference is made to portions of the processed image that overlap with other portions, in practice, the portion of processed image that are accessed for use in stitching operations can extend beyond the boundaries of the portions of the images representative of an overlapping field of view (e.g., by one or two pixels or more) to better enable the performance of the stitching operations.

The ISP/stitch engine 2122 then accesses the portion of processed image A that does overlap with processed image B (image portion 2204), and combines or blends (1) the maintained portion of the processed image B that does overlap with processed image A, and (2) the accessed portion of processed image A that does overlap with processed image B. Examples of such blending operations include averaging pixel values (e.g., chroma or luma values), smooth pixel values based on the values of neighboring pixels, or any other suitable stitching operation. The ISP/stitch engine 2122 then writes the combined or blended overlapping portions of processed image A and processed image B to the memory 2126 (e.g., within the location in which the accessed portion of processed image A that does overlap with processed image B was stored). The resulting image stored in the memory 2126 is a stitched representation of processed image A and processed image B.

The ISP/stitch engine 2122 can identify overlapping portions of images using any suitable method. In some implementations, the overlapping portions of the fields of view of the image sensors 2110A and 2110B are predetermined or known in advance. For example, in implementations in which the image sensors 2110A and 2110B are secured within a housing or frame such that the image sensors 2110A and 2110B do not move relative to each other, the locations of portions of images representative of the overlapping portions of the fields of view of the image sensors can be determined and stored, and the ISP/stitch engine 2122 can access the stored locations of the images representative of the overlapping portions of the fields of view of the image sensors to determine which portions of the processed images should be maintained for combination/blending, and to determine which portions of the process images are not representative of overlapping fields of view (and thus can be written to the memory 2126).

In some implementations, the ISP/stitch engine 2122 can perform one or more preprocessing operations on the captured images to determine the portions of the images that are representative of overlapping fields of view. For example, the ISP/stitch engine 2122 can perform edge detection, texture analysis, color analysis, depth analysis, and/or any other suitable operations in order to identify the portions of the images representative of the same field of view. In some implementations, a controller or pre-processor (not shown in FIG. 21) can perform one or more pre-processing operations on the raw image data to identify the portions of the images that are representative of overlapping fields of view. For example, a controller or preprocessor can perform the pre-processing operations before image A and image B are written to the memory 2116. In such implementations, one or more controllers or pre-processors can be coupled between the image sensors 2110A and 2110B and the memory 2116. In some implementations, a controller or pre-processor can be coupled to the memory 2116, can access the raw image A or raw image B from the memory 2116, can perform one or more pre-processing operations on the images to determine the locations of the images representative of overlapping fields of view, and can provide the determined locations to the ISP/stitch engine 2122 for use in stitching the images together.

Figure 23:
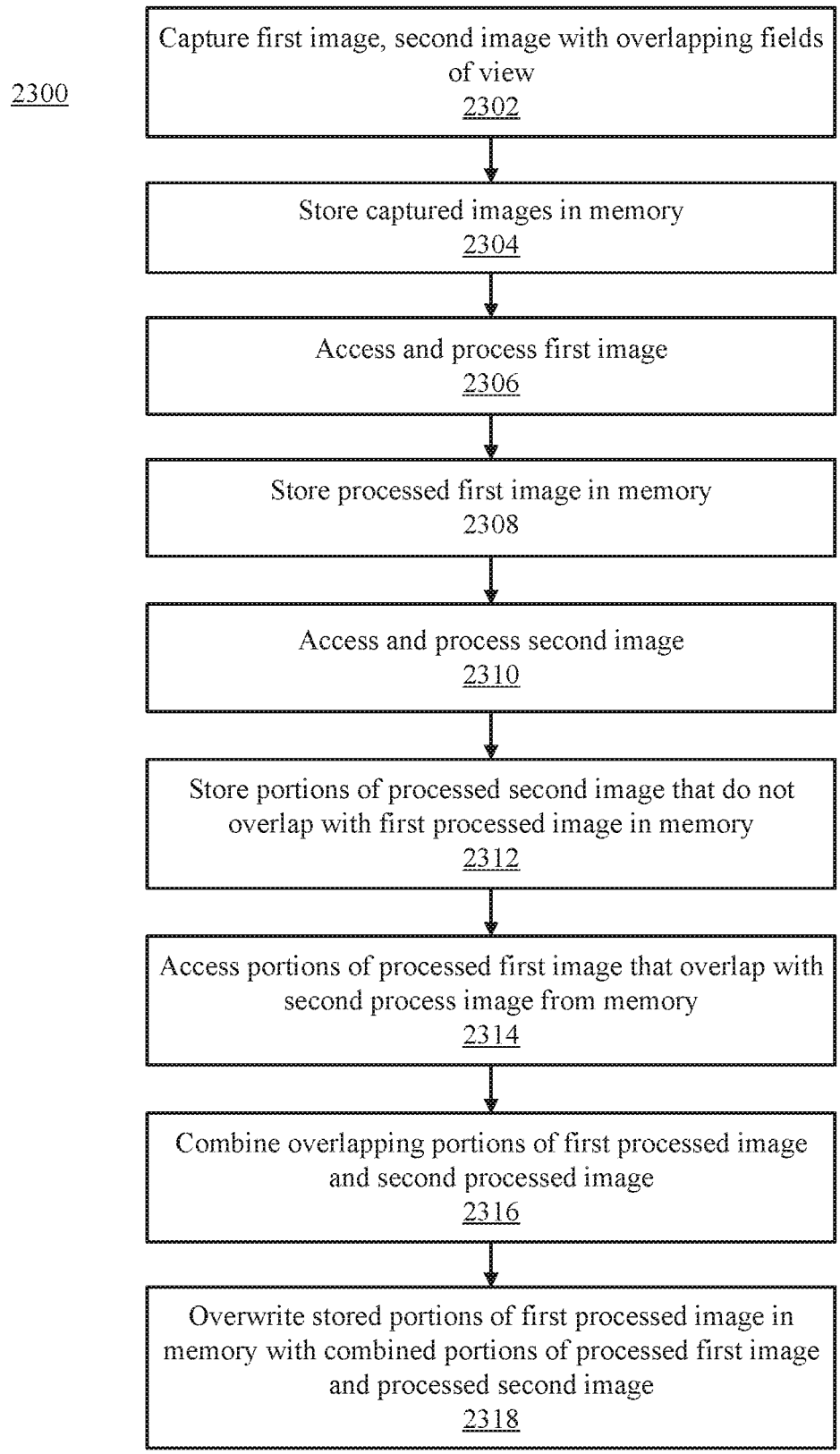
FIG. 23 illustrates an example of a technique for stitching images captured with multiple image sensors.

FIG. 23 illustrates an example of a technique 2300 for stitching images captured with multiple image sensors. A first image and a second image with overlapping fields of view are captured 2302. The captured images are stored 2304 in memory. A first of the images is accessed and processed 2306, and stored 2308 in memory. A second of the images is accessed and processed 2310, and portions of the processed second image that do not overlap with the processed first image are stored 2312 in memory. The portions of the processed first image that do overlap with portions of the second processed image are accessed 2314 from memory. The overlapping portions of the processed first image and the processed second image are combined 2316, and the location in the memory storing the portion of the processed first image that overlaps with the processed second image is overwritten 2318 with the combined portions of the processed first image and the processed second image.

The architecture 2100 of FIG. 21 beneficially reduces the required bandwidth to perform image stitching operations relative to conventional stitching systems. For example, in some conventional systems, stitching two images together requires capturing and processing both images, storing both processed images completely to memory, accessing both stored processed images from memory, stitching the processed images together, and storing the stitched image to memory. In contrast, the architecture 2100 may reduce the amount of processed image data that is read from memory to the portion of the processed image A that overlaps with processed image B. The remaining portions of processed image A, and the entirety of processed image B are written to memory only once during the course of stitching images A and B together.

FIG. 24A illustrates images 2400 captured with a cubic array of image sensors. In the example of FIG. 24A, a first camera A faces the viewer, a second camera B faces downward, a third camera C faces leftward, a fourth camera D faces rightward, a fifth camera E faces upward, and a sixth camera F faces away from the viewer. In some implementations, each of the six cameras capturing the images 2400 is a separate modular camera plugged into a cubic camera array housing. In some implementations, the cubic array of cameras used to capture the images 2400 is a singular camera system with six capture mechanisms (e.g., image sensors, lenses, etc.).

Figure 24B:
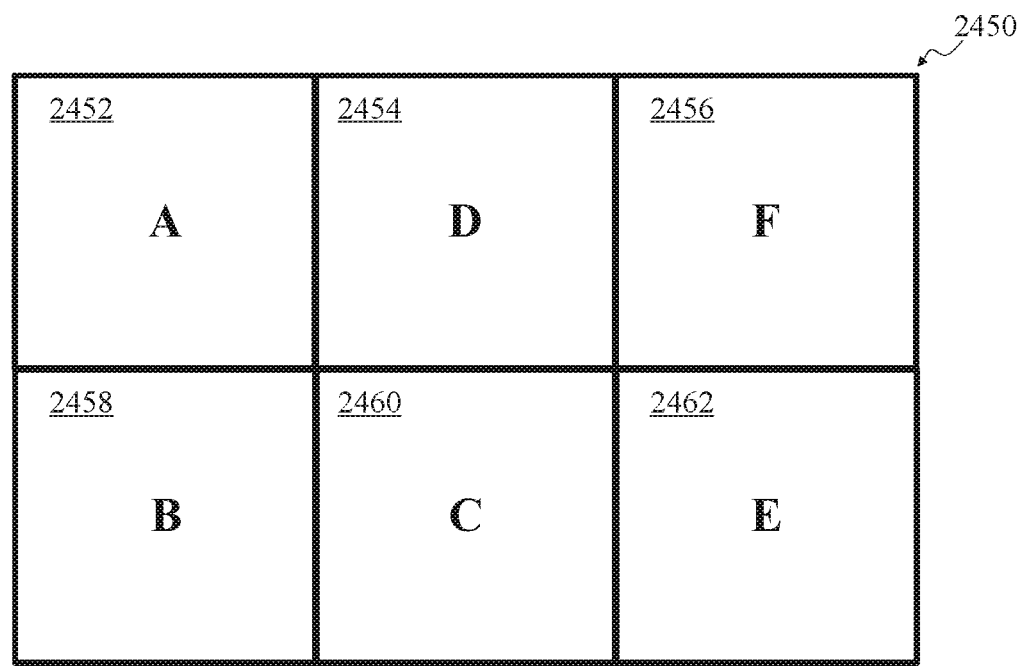
FIG. 24B illustrates a two dimensional grid of images captured by a cubic array of image sensors.

Prior to the stitching of images 2400 captured by the cubic array of FIG. 24A, the images may be stored in a two dimensional image grid. FIG. 24B illustrates a two dimensional grid of images 2450 captured by a cubic array of image sensors. In the example of FIG. 24B, the grid of images 2450 is two images tall by three images wide. In order to improve the performance of stitching the images within the grid of FIG. 24B together, the images 2400 captured by the cameras of the array of FIG. 24A can be stored within the grid of images 2450 of FIG. 24B in a particular order.

In the top left of the grid of images 2450 of FIG. 24B, the image A 2452 captured by the camera A of FIG. 24A is stored. Likewise, in the top middle of the grid of images 2450 of FIG. 24B, the image D 2454 captured by camera D is stored, and in the top right of the grid, the image F 2456 captured by camera F is stored. In the bottom row of the grid of images 2450 of FIG. 24B, the image B 2458, the image C 2460, and the image E 2462 (captured respectively by the cameras B, C, and E of the array of FIG. 24A) are stored, in order. In some implementations, the grid of images 2450 of FIG. 24B is stored as a single image file, composed of images A through F (2452-2462), prior to the stitching together of the images. For example, an image stitching engine can access the image file, divide the image file into two components (a top component including images A, D, and F and a bottom component including images B, C, and E), and can perform two groups of stitching operations. The first group of stitching operations includes:

1. Stitching image A 2452 to image D 2454 to produce stitched image AD;
2. Stitching stitched image AD to image F 2456 to produce stitched image ADF;
3. Stitching image B 2458 to image C 2460 to produce stitched image BC; and
4. Stitching stitched image BC to image E 2462 to produce stitched image BCE.

The second group of stitching operations can include:
1. Stitching an edge of stitched image ADF associated with image A 2452 to an edge of stitched image BCE associated with image B 2458;
2. Stitching an edge of stitched image ADF associated with image A 2452 to an edge of stitched image BCE associated with image C 2460;
3. Stitching an edge of stitched image ADF associated with image A 2452 to an edge of stitched image BCE associated with image E 2462;
4. Stitching an edge of stitched image ADF associated with image D 2454 to an edge of stitched image BCE associated with image B 2458;
5. Stitching an edge of stitched image ADF associated with image D 2454 to an edge of stitched image BCE associated with image E 2462;
6. Stitching an edge of stitched image ADF associated with image F 2456 to an edge of stitched image BCE associated with image B 2458;
7. Stitching an edge of stitched image ADF associated with image F 2456 to an edge of stitched image BCE associated with image C 2460; and
8. Stitching an edge of stitched image ADF associated with image F 2456 to an edge of stitched image BCE associated with image E 2462.

The end result of the two groups of stitching operations may be a spherical image including image data representative of the collective fields of view of cameras A, B, C, D, E, and F.

By storing the images 2400 captured by the cameras of the array of FIG. 24A as illustrated in the grid of images 2450 of FIG. 24B, four borders between images (the border between image A 2452 and image D 2454, the border between image D 2454 and image F 2456, the border between image B 2458 and image C 2460, and the border between image C 2460 and image E 2462) are representative of overlapping fields of view between adjacent cameras in the array of FIG. 24A. Such borders can beneficially improve the performance of stitching operations, as two images associated with such a border do not need to be rotated prior to the performance of the stitching operations. The grid of images 2450 of FIG. 24B can thus be stored in a memory (e.g., within a device housing the camera array of FIG. 24A or within an external memory) prior to the performance of stitching operations such that when the stitching operations are performed, the performance of the stitching operations is improved.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A system, comprising:
an image sensor configured to capture image data using a plurality of selectable exposure times; and
a processing apparatus configured to:
receive a first image from the image sensor, wherein the first image is captured with a first exposure time;
receive a second image from the image sensor, wherein the second image is captured with a second exposure time that is less than the first exposure time;
determine a high dynamic range image based on the first image and the second image, wherein determining the high dynamic range image includes using a blending ratio map to specify how an image portion of the second image is combined with a corresponding image portion of the first image to determine a corresponding image portion of the high dynamic range image; and
store, display, or transmit an output image that is based on the high dynamic range image.

2. The system of claim 1, wherein the processing apparatus is further configured to determine the high dynamic range image by performing operations to:
responsive to a value of a pixel of an image component of the first image being in a range near a saturation level, determine a blending ratio based on a difference between the saturation level and the value of the pixel; and
determine a corresponding image component of the high dynamic range image based on a weighted sum, using the blending ratio as a weight, of the image component of the first image and a corresponding image component of the second image.

3. The system of claim 1, wherein the processing apparatus is further configured to determine the high dynamic range image by performing operations to:
determine initial blending ratios for respective image portions of the high dynamic range image to obtain an initial blending ratio map;
apply a low-pass spatial filter to the initial blending ratio map to obtain the blending ratio map; and
combine the first image and the second image using the blending ratio map to obtain the high dynamic range image.

4. The system of claim 1, wherein the processing apparatus is further configured to:
determine a noise map for the high dynamic range image based on noise level estimates for pixels of the first image, noise level estimates for pixels of the second image, and a blending ratio map that specifies how image components of the first image and the second image are combined to form the high dynamic range image; and
apply temporal noise reduction processing to the high dynamic range image based on the noise map.

5. The system of claim 1, wherein the processing apparatus comprises an image signal processor that is configured to perform image processing operations on the high dynamic range image.

6. The system of claim 1, wherein the first image is in a raw format and the second image is in a raw format.

7. The system of claim 1, wherein the processing apparatus is further configured to:

apply motion compensation to align corresponding pixels of the first image and the second image when determining the high dynamic range image.

8. A method comprising:
receiving a first image from an image sensor, wherein the first image is captured with a first exposure time;
receiving a second image from the image sensor, wherein the second image is captured with a second exposure time that is less than the first exposure time;
determining a high dynamic range image based on the first image and the second image, wherein determining the high dynamic range image includes, responsive to a value of a pixel of an image component of the first image being in a range near a saturation level, determining a blending ratio based on a difference between the saturation level and the value of the pixel, and determining a corresponding image component of the high dynamic range image based on a weighted sum, using the blending ratio as a weight, of the image component of the first image and a corresponding image component of the second image; and
storing, displaying, or transmitting an output image that is based on the high dynamic range image.

9. The method of claim 8, wherein the first image is in a raw format and the second image is in a raw format.

10. The method of claim 8, wherein determining the high dynamic range image includes:
determining initial blending ratios for respective image portions of the high dynamic range image to obtain an initial blending ratio map;
applying a low-pass spatial filter to the initial blending ratio map to obtain a blending ratio map; and
combining the first image and the second image using the blending ratio map to obtain the high dynamic range image.

11. The method of claim 10, wherein determining the initial blending ratio includes:
identifying a maximum pixel value for pixels in an image portion of the first image;
if the maximum pixel value is saturated, determining the initial blending ratio to be one, wherein an image portion of the second image is used to determine a corresponding image portion of the high dynamic range image;
if the maximum pixel value is not saturated and the maximum pixel value is outside of a range near a saturation level, determining the initial blending ratio to be zero, wherein an image portion of the first image is used to determine the corresponding image portion of the high dynamic range image; and
if the maximum pixel value is not saturated and the maximum pixel value is in the range near the saturation level, determining the initial blending ratio based on a difference between the saturation level and the maximum pixel value, wherein the image portion of the first image and the corresponding image portion of the second image are combined using the initial blending ratio to determine the corresponding image portion of the high dynamic range image.

12. The method of claim 8, comprising:
applying motion compensation to align corresponding pixels of the first image and the second image when determining the high dynamic range image.

13. The method of claim 12, in which applying motion compensation comprises:
applying a local motion compensation transformation to the first image to obtain a first candidate image;
applying a global motion compensation transformation to the first image to obtain a second candidate image;
obtaining a first quality metric based on the first candidate image and the second image;
obtaining a second quality metric based on the second candidate image and the second image; and
based on the first quality metric and the second quality metric, selecting the motion compensation transformation from among the local motion compensation transformation and the global motion compensation transformation.

14. The method of claim 8, comprising:
determining a noise map for the high dynamic range image based on noise level estimates for pixels of the first image, noise level estimates for pixels of the second image, and a blending ratio map that specifies how image components of the first image and the second image are combined to form the high dynamic range image; and
applying temporal noise reduction processing to the high dynamic range image based on the noise map.

15. A non-transitory computer-readable storage medium storing executable instructions that, when executed by a processor, facilitate performance of operations, comprising:
receiving a first image from an image sensor, wherein the first image is captured with a first exposure time;
receiving a second image from the image sensor, wherein the second image is captured with a second exposure time that is less than the first exposure time;
determining a high dynamic range image based on the first image and the second image, wherein determining the high dynamic range image includes, responsive to a value of a pixel of an image component of the first image being in a range near a saturation level, determining a blending ratio based on a difference between the saturation level and the value of the pixel, and determining a corresponding image component of the high dynamic range image based on a weighted sum, using the blending ratio as a weight, of the image component of the first image and a corresponding image component of the second image; and
storing, displaying, or transmitting an output image that is based on the high dynamic range image.

16. The non-transitory computer-readable storage medium of claim 15, wherein determining the high dynamic range image includes:
determining initial blending ratios for respective image portions of the high dynamic range image to obtain an initial blending ratio map;
applying a low-pass spatial filter to the initial blending ratio map to obtain a blending ratio map; and
combining the first image and the second image using the blending ratio map to obtain the high dynamic range image.

17. The non-transitory computer-readable storage medium of claim 16, wherein determining the initial blending ratio includes:
identifying a maximum pixel value for pixels in an image portion of the first image;
if the maximum pixel value is saturated, determining the initial blending ratio to be one, wherein an image portion of the second image is used to determine a corresponding image portion of the high dynamic range image;
if the maximum pixel value is not saturated and the maximum pixel value is outside of a range near a saturation level, determining the initial blending ratio to be zero, wherein an image portion of the first image is used to determine the corresponding image portion of the high dynamic range image; and if the maximum pixel value is not saturated and the maximum pixel value is in the range near the saturation level, determining the initial blending ratio based on a difference between the saturation level and the maximum pixel value, wherein the image portion of the first image and the corresponding image portion of the second image are combined using the initial blending ratio to determine the corresponding image portion of the high dynamic range image.

18. The non-transitory computer-readable storage medium of claim 15, wherein the operations comprise:

applying motion compensation to align corresponding pixels of the first image and the second image when determining the high dynamic range image.

19. The non-transitory computer-readable storage medium of claim 18, in which applying motion compensation comprises:

applying a local motion compensation transformation to the first image to obtain a first candidate image;

applying a global motion compensation transformation to the first image to obtain a second candidate image;

obtaining a first quality metric based on the first candidate image and the second image;

obtaining a second quality metric based on the second candidate image and the second image; and based on the first quality metric and the second quality metric, selecting the motion compensation transformation from among the local motion compensation transformation and the global motion compensation transformation.

20. The non-transitory computer-readable storage medium of claim 15, wherein the operations comprise:

determining a noise map for the high dynamic range image based on noise level estimates for pixels of the first image, noise level estimates for pixels of the second image, and a blending ratio map that specifies how image components of the first image and the second image are combined to form the high dynamic range image; and applying temporal noise reduction processing to the high dynamic range image based on the noise map.

* * * * *